United States Patent
Aoki

(10) Patent No.: US 9,261,125 B2
(45) Date of Patent: Feb. 16, 2016

(54) STAPLE STRIP AND STAPLE CARTRIDGE

(75) Inventor: Akira Aoki, Gunma (JP)

(73) Assignee: MAX Co., Ltd., Tokyo (JP)

( * ) Notice: Subject to any disclaimer, the term of this patent is extended or adjusted under 35 U.S.C. 154(b) by 933 days.

(21) Appl. No.: 13/205,537

(22) Filed: Aug. 8, 2011

(65) Prior Publication Data

US 2011/0284408 A1 Nov. 24, 2011

Related U.S. Application Data

(62) Division of application No. 12/377,092, filed as application No. PCT/JP2007/065544 on Aug. 8, 2007.

(30) Foreign Application Priority Data

| Aug. 11, 2006 | (JP) | 2006-220744 |
| Aug. 11, 2006 | (JP) | 2006-220745 |
| Aug. 11, 2006 | (JP) | 2006-220746 |

(51) Int. Cl.
*B25C 5/00* (2006.01)
*B25C 5/16* (2006.01)
(Continued)

(52) U.S. Cl.
CPC . *F16B 15/08* (2013.01); *B27F 7/21* (2013.01); *B27F 7/38* (2013.01); *B42B 4/00* (2013.01); *F16B 15/0015* (2013.01); *B42P 2241/28* (2013.01)

(58) Field of Classification Search
CPC .................................. B25C 5/00; B25C 5/16
USPC ............... 227/120, 135–136, 76–77, 156, 82, 227/119; 411/905, 920, 457, 487, 488–489
See application file for complete search history.

(56) References Cited

U.S. PATENT DOCUMENTS

| 1,407,709 A * | 2/1922 | Tibbals .................... 411/444 |
| 2,202,905 A | 3/1937 | Goodstein |

(Continued)

FOREIGN PATENT DOCUMENTS

| CN | 2097087 U | 2/1992 |
| CN | 1316339 A | 2/2001 |

(Continued)

OTHER PUBLICATIONS

Chinese Office action for CN 200910261897.2, Apr. 14, 2011.
(Continued)

*Primary Examiner* — Michelle Lopez
(74) *Attorney, Agent, or Firm* — Chernoff, Vilhauer, McClung & Stenzel, LLP

(57) ABSTRACT

To provide interlinked staples which are made possible to be fed accurately in the inside of a stapler and a staple cartridge which houses these interlinked staples.
The interlinked staples 1a are constituted by interlinking a plurality of staples 2a each of which has an elongated and straight-formed shape. The vicinities of the edge portions in the longitudinal direction of the each staple 2a are formed in trapezoidal shapes, and the widths are tapered toward the tips thereof. Also, adhesion portions 31 coated with adhesive agent are provided on the rear surfaces of the vicinities of both the edge portions in the longitudinal direction of the each staple 2a. Also, there are provided elliptical feeding holes 32 at predetermined positions from both the edge portions of the side by which each staple 2a is interlinked. A portion between two feeding holes 32 is made to be a slit portion 33 and the respective staples 2a are cut off perfectly thereby. Portions on the outside of the two feeding holes 32 and until both the edge portions of the side by which each staple 2a is interlinked are operated as staple interlinking portions 34 and the respective staples 2a become in a state of being interlinked.

3 Claims, 50 Drawing Sheets

(51) Int. Cl.
  *F16B 15/08* (2006.01)
  *B27F 7/21* (2006.01)
  *B27F 7/38* (2006.01)
  *B42B 4/00* (2006.01)
  *F16B 15/00* (2006.01)

(56) References Cited

U.S. PATENT DOCUMENTS

| | | | |
|---|---|---|---|
| 2,174,708 A * | 10/1939 | Rothenberg et al. | 227/86 |
| 2,606,320 A * | 8/1952 | Reece et al. | 227/85 |
| 3,610,087 A | 10/1971 | Dritz | |
| 4,220,070 A * | 9/1980 | Anstett | 411/444 |
| 4,382,326 A | 5/1983 | Rabuse | |
| 4,588,121 A * | 5/1986 | Olesen | 227/120 |
| 6,913,181 B2 | 7/2005 | Mochizuki | |
| 7,021,512 B1 | 4/2006 | Nakamura | |
| 2004/0049144 A1 | 3/2004 | Cea | |
| 2006/0151347 A1 | 7/2006 | Grossman | |

FOREIGN PATENT DOCUMENTS

| | | |
|---|---|---|
| EP | 0695648 A2 | 2/1996 |
| JP | 51006619 Y1 | 2/1976 |
| JP | 54051634 A | 4/1979 |
| JP | 11-347966 A | 12/1999 |
| JP | 2000-190928 | 7/2000 |
| JP | 2000220617 A | 8/2000 |
| JP | 2001212774 A | 7/2001 |
| JP | 2002168216 A | 6/2002 |
| JP | 2006-205262 | 8/2006 |
| JP | 2006-212731 | 8/2006 |
| WO | 2005072978 A1 | 8/2005 |

OTHER PUBLICATIONS

Chinese Office action for CN 200910261898.7, Nov. 17, 2010.
Kebemou, Augustin, European Search Report for EP 07792211, Nov. 26, 2010.
Chinese Office Action for CN 200780029901.1, Jul. 28, 2010.
International Search Report for PCT/JP2007/065544, Nov. 5, 2007.
Augustin Kebemou, Extended European Search Report for EP 11167849.6, Oct. 31, 2011.
Yasumasa Morimoto, Notice of Rejection Reasons for Japanese Patent Application No. 2006-220744, Sep. 6, 2011 (with English translation).
Chinese Secondary Examination Report for CN 200910261898.7, Feb. 13, 2012.
Patent Reexamination Board of the Chinese Patent Office, Notification of Reexamination issued re: application No. 200780029901.1, Apr. 4, 2014, Beijing, China (translation included).
European Office action for Application No. 07 792 211.0-1755, issued Jun. 12, 2013, 5 pages.

* cited by examiner

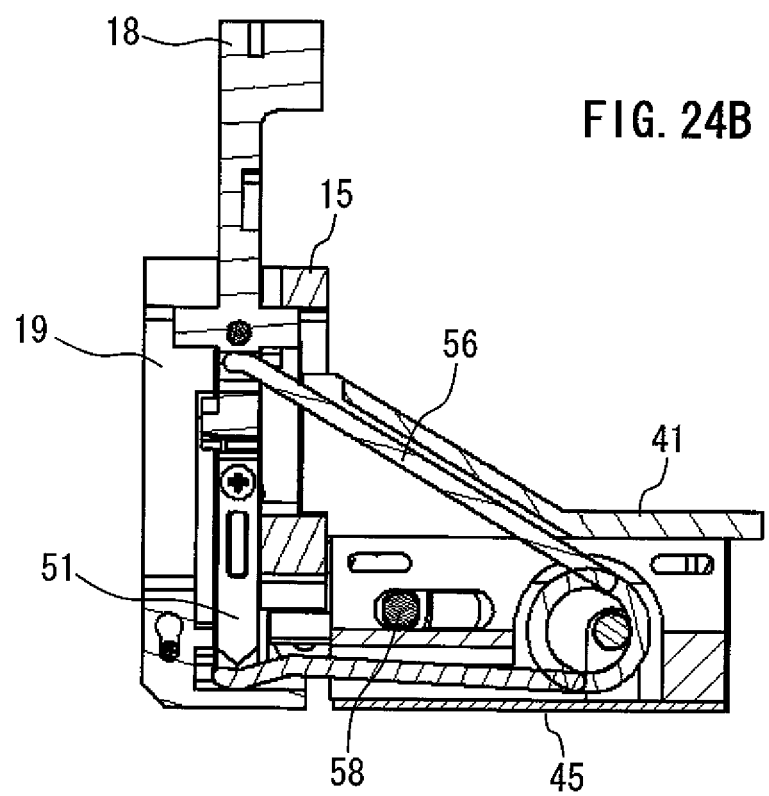

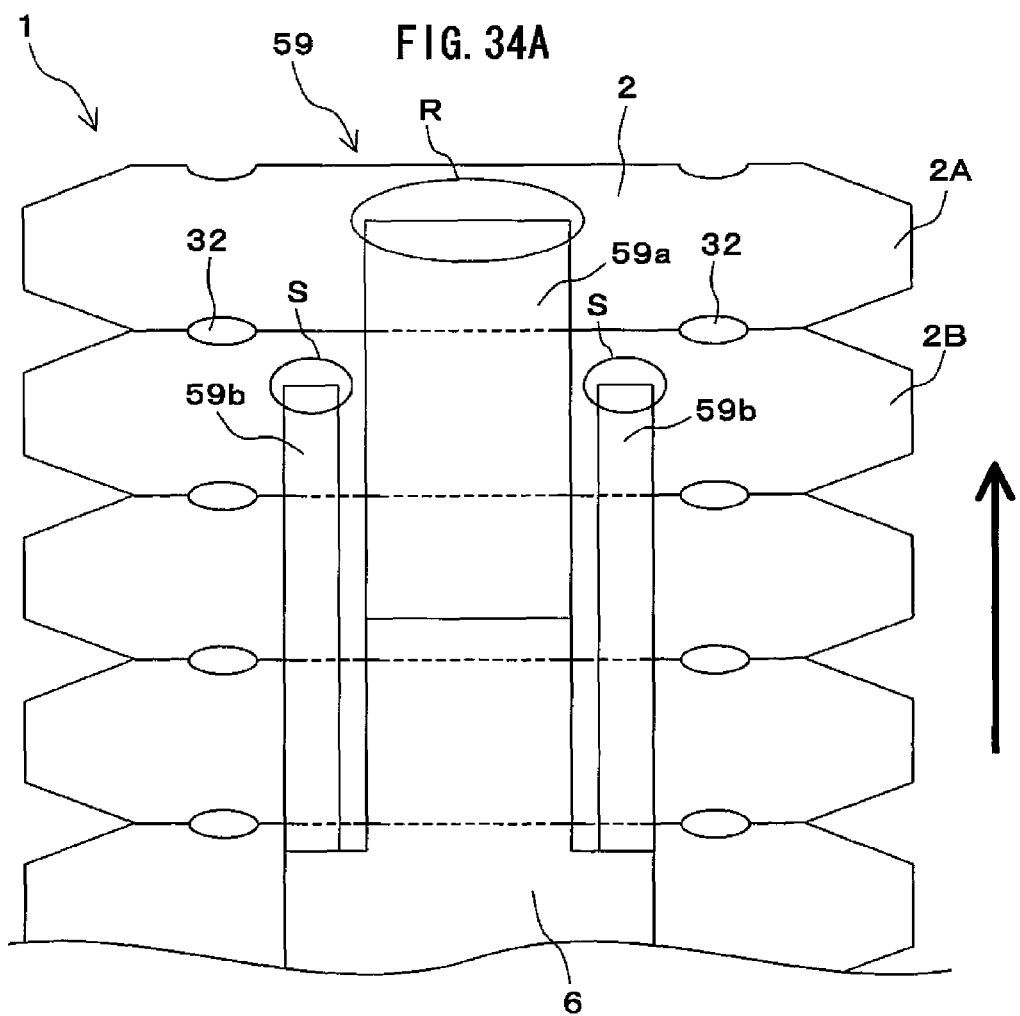

STAPLE STRIP AND STAPLE CARTRIDGE

CROSS-REFERENCE TO RELATED APPLICATION

This is a division of co-pending patent application Ser. No. 12/377,092 filed Feb. 10, 2009, which is a national stage application filed under 35 USC 371 based on International Application No. PCT/JP2007/065543 filed Aug. 8, 2007, and claims priority under 35 USC 119 of Japanese Patent Application Nos. JP 2006-220744 filed Aug. 11, 2006, JP 2006-220745 filed Aug. 11, 2006 and JP 2006-220746 filed Aug. 11, 2006.

TECHNICAL FIELD

The present invention relates to interlinked staples in which a plurality of approximately straight lined staples are provided concurrently in parallel and mutually interlinked and relates to a staple cartridge which houses these interlinked staples and which is provided detachably with respect to a stapler. In more detail, it is made possible for the interlinked staples to be accurately fed into the inside of the stapler by providing for every staple with an engaged portion with which an engagement unit of feeding means engages.

BACKGROUND ART

From the past, there has been used a stapler that binds binding-sheets by means of a metal-made staple (needle). In case of binding paper-sheets by using such a stapler by means of the metal-made staple, there sometimes happens a case in which it is requested to separate the paper-sheets and the staple when the paper-sheets are processed by a paper shredder or for the reason of recycling. Also, in view of the safety problem, it is not preferable to bind documents used in a work section handling food articles by means of a metal-made staple.

Also, differently from the above description, there have been proposed staples each formed by a soft raw material of paper or the like (for example, see Japanese Patent Application Publication No. H11-347966). The staples disclosed in the Japanese Patent Application Publication No. H11-347966 are ones formed by a soft raw material of paper or the like and interlinked with them being shaped into a shape in which both the edges thereof are bent beforehand to one direction. The staples disclosed in the Japanese Patent Application Publication No. H11-347966 are ones that bind the binding sheets by passing both the leg portions thereof through notches provided at the binding sheets by a cutter and then, by bending them along the binding sheets to bond them mutually.

DISCLOSURE OF THE INVENTION

However, the above-mentioned staples disclosed in the Japanese Patent Application Publication No. H11-347966 have problems as follows. The staples disclosed in the Japanese Patent Application Publication No. H11-347966 are formed by a soft raw material of paper or the like, so that they are subject to deformation. Also, the staples disclosed in the Japanese Patent Application Publication No. H11-347966 are ones fed to a predetermined direction inside a stapler caused by an operation in which the rear edge portion of the interlinked staples which are interlinked is depressed by a compressed spring or the like. Consequently, the staples disclosed in the Japanese Patent Application Publication No. H11-347966 have a problem such that they are deformed in the inside of the stapler, thereby preventing them from being accurately fed to a predetermined position thereof.

The present invention is one solving such a problem and has an object to provide interlinked staples in which paper-made staples are interlinked and a staple cartridge housing these interlinked staples detachably with respect to a stapler, by which they are able to be accurately fed inside the stapler, it is possible to execute the cutoff of the staple and pass through the binding sheets accurately, it is possible to make the posture-by-load small, and it is possible to prevent adhesion degradation of adhesion portions for mutually bonding both the leg portions.

In order to solve the above-mentioned problem, the interlinked staples relating to the present invention in which a plurality of paper-made staples, each of which is formed approximately in straight line, and, on both the edges thereof in a longitudinal direction thereof, is provided with leg portions, which are bent by a predetermined length in a first direction, pass through the binding sheets, and are bent in a second direction along the binding sheet to be mutually bonded, are provided concurrently in parallel with the longitudinal direction of each of the staples and are mutually interlinked, are characterized in that an engaged portion with which an engagement unit of feeding means of a stapler which binds the binding sheets by the staple engages to feed the interlinked staples to the interlinking direction of the respective staples inside the stapler is provided for every staple.

The interlinked staples relating to the present invention are fed by the feeding means of the stapler to the interlinking direction of the staples inside the stapler. At that time, the engagement unit of the feeding means engages with a predetermined engaged portion provided for every staple.

In order to solve the above-mentioned problem, the interlinked staples relating to the present invention in which a plurality of paper-made staples, each of which is formed approximately in straight line, and, on both the edges thereof in a longitudinal direction thereof, is provided with leg portions, which are bent by a predetermined length in a first direction, pass through the binding sheets, and are bent in a second direction along the binding sheet to be mutually bonded, are provided concurrently in parallel with the longitudinal direction of each of the staples and are mutually interlinked, are characterized in that each of the staples has a shape in which both the edges thereof are tapered to their tips.

With respect to the interlinked staples relating to the present invention, a staple positioned at a leading portion is cut off by the stapler. Both the edge portions in the longitudinal direction in connection with the cut-off staple are bent by the stapler to the first direction by a predetermined length.

Both the leg portions of the staple which are bent to the first direction are passed through the binding sheets by the stapler. Both the passed-through leg portions are bent to a second direction along the binding sheets and are bonded mutually.

Here, for example, if each of the interlinked staples is mutually interlinked at the respective interlinking portions provided in the vicinity of each of the edge portions and the respective interlinking portions are cut off from the center side toward the external side along the longitudinal direction of the interlinked staples, the staple that is positioned at the leading portion of the interlinked staples is cut off in a state in which a tension directed from the center side toward the outward direction along the longitudinal direction of both of the staple positioned at the leading portion of the interlinked staples and the staple adjacent to the staple positioned at the leading portion acts on both the staples as a tension applied simultaneously on both the leg portions of both the staples to the opposite directions.

In order to solve the above-mentioned problem, interlinked staples relating to the present invention in which a plurality of paper-made staples, each of which is formed approximately in straight line, and, on both the edges thereof in a longitudinal direction thereof, is provided with leg portions, which are bent by a predetermined length in a first direction, pass through the binding sheets, and are bent in a second direction along the binding sheet to be mutually bonded, are characterized in that an adhesion portion for both the leg portions for mutually bonding both the leg portions, which is provided in the vicinity of one edge portion of a longitudinal direction on the rear surface of the each staple, and a first release coated paper attached peelably at the adhesion portion for both the leg portions are provided.

Also, the interlinked staples relating to the present invention are characterized in that a binding sheet adhesion portion for mutually bonding the leg portions and the binding sheets, which is provided in the vicinity of the other edge portion on the rear surface of each staple, and a second release coated paper attached peelably on the binding sheet adhesion portion are provided. Preferably, it is excellent if the first release coated paper and the second release coated paper are provided integrally.

The interlinked staples relating to the present invention are attached with the release coated paper at the adhesion portion for both the leg portions on the rear surface of each staple, which causes a state in which each adhesion portion for both the leg portions is protected.

Also, in the interlinked staples relating to the present invention, binding sheets are bound by a stapler as follows. First, the first release coated paper is peeled from the adhesion portion for both the leg portions on the rear surface of both the leg portions of the staple positioned at the edge portion, which is used at least in a binding work of the binding sheets. Thereafter, the staple positioned at the edge portion is cut off and with respect to the cut off staple, the leg portions of both the edge portions in the longitudinal direction are bent to the first direction by amounts of predetermined lengths.

Thereafter, both the leg portions of the staple which have been bent in the first direction are passed through the binding sheets, and both the leg portions thus passed are bent in the second direction along the binding sheets and are bonded mutually. Both the leg portions bonded mutually are bonded by the adhesion portion for both the leg portions which is provided in the vicinity of one edge portion on the rear surface of the staple.

In order to solve the above-mentioned problem, a staple cartridge relating to the present invention, which is provided detachably with respect to a stapler for binding the binding sheets by a staple and includes a staple housing unit for housing a roll shaped staple formed by winding in a roll shape interlinked staples in which a plurality of staples each forming approximately a straight line are provided concurrently in parallel with the longitudinal direction of each of the staples and are mutually interlinked, and a staple pulling out port provided so as to pull out the roll shaped staple housed in the staple housing unit and so as to make it possible to bring the interlinked staples into sight, is characterized in that each of the staples is a paper-made staple having leg portions at both the edge portions thereof in the longitudinal direction thereof, which are bent by a predetermined length in a first direction and pass through the binding sheets and thereafter, are bent in a second direction along the binding sheet to be mutually bonded, and that the interlinked staples includes, for every staple, an engaged portion with which an engagement unit of feeding means of the stapler engages to feed the interlinked staples to the interlinking direction of the respective staples inside the stapler.

The staple cartridge relating to the present invention is attached to the stapler and the interlinked staples are pulled out from the staple pulling out port to the outside of the staple cartridge and are brought into sight. The interlinked staples, which are pulled out to the outside of the staple cartridge and are brought into sight, are fed by staple feeding means to the staple interlinking direction in the inside of the stapler. At that time, the engagement unit of feeding means engages with a predetermined engaged portion provided for every staple.

In order to solve the above-mentioned problem, a staple cartridge relating to the present invention, which is provided detachably with respect to a stapler for binding the binding sheets by a staple and includes a staple housing unit for housing a roll shaped staple formed by winding in a roll shape interlinked staples in which a plurality of staples each forming approximately a straight line are provided concurrently in parallel with the longitudinal direction of each of the staples and are mutually interlinked, and a staple pulling out port provided so as to pull out the roll shaped staple housed in the staple housing unit and so as to make it possible to bring the interlinked staples into sight, is characterized in that each of the stales has a shape in which both the edges thereof are tapered to their tips.

The staple cartridge relating to the present invention is attached to the stapler and interlinked staples are pulled out from the staple pulling out port to the outside of the staple cartridge.

With respect to the interlinked staples pulled out to the outside of the staple cartridge, a staple positioned at the edge portion is cut off by the stapler. With respect to the cut off staple, the leg portions of both the edge portions in the longitudinal direction are bent by the stapler by amounts of predetermined lengths in a first direction.

The both the leg portions of the staple bent in the first direction are penetrated through the binding sheets by the stapler. Both the penetrated leg portions are bent in a second direction along the binding sheets and bonded mutually.

In order to solve the above-mentioned problem, a staple cartridge relating to the present invention including a staple housing unit for housing roll shaped staples formed by being wound in a roll shape in a state in which a release coated paper is attached on an adhesion portion on the rear surface of interlinked staples in which a plurality of staples each forming approximately a straight line are provided concurrently in parallel with the longitudinal direction of each of the staples and are mutually interlinked, a peeling unit for peeling the release coated paper from any of the interlinked staples in association with an operation of feeding the roll shaped staple from the staple housing unit, and a staple pulling out port, from which the interlinked staple from which the release coated paper has been peeled by the peeling unit is pulled out and is brought into sight, is characterized in that each of the staples is a paper-made staple having leg portions at both the edge portions thereof in the longitudinal direction thereof, which are bent by a predetermined length in a first direction and pass through the binding sheets and thereafter, are bent in a second direction along the binding sheet to be mutually bonded, and that the adhesion portion is provided in the vicinity of one edge portion in a longitudinal direction on the rear surface of each of the staples and is an adhesion portion for both the leg portions, which bonds both the leg portions in a state of being mutually bonded, and the release coated paper is a first release coated paper attached peelably on the adhesion portion for both the leg portions.

The interlinked staples housed in the staple cartridge relating to the present invention are attached with the first release coated paper at the adhesion portion for both the leg portions on the rear surface of each staple, which causes a state in which each adhesion portion for both the leg portions is protected.

Also, the staple cartridge relating to the present invention is attached to the stapler and the binding sheets are bound by the stapler as follows. First, in association with an operation in which the roll shaped staple housed in the staple housing unit is fed, the first release coated paper is peeled by the peeling unit. The interlinked staples, from any of which the first release coated paper is peeled by the peeling unit, are pulled out from the staple pulling out port and are brought into sight on the outside of the staple cartridge.

The staple positioned at the leading portion of the interlinked staples that have been pulled out to the outside of the staple cartridge is cut off and the cut off staple is bent with the leg portions of both the edge portions thereof in the longitudinal direction thereof being bent by a predetermined length in the first direction.

Thereafter, both the leg portions of the staple which have been bent in the first direction are passed through the binding sheets, and both the passed leg portions are bent in the second direction along the binding sheets and are bonded mutually. Both the leg portions thus bonded mutually are bonded by the adhesion portion for both the leg portions which is provided in the vicinity of one edge portion on the rear surface of the staple.

The interlinked staples relating the present invention are fed to the interlinking direction in the inside of the stapler with the engagement unit of the feeding means engaging with the predetermined engaged portion thereof. This enables an accurate feeding to be realized in the inside of the stapler.

The interlinked staples relating to the present invention are a plurality of paper-made staples each forming approximately a straight line, each of which is provided on both the edge portions in the longitudinal direction with leg portions that are bent by a predetermined length in a first direction, pass through binding sheets and are bent along the binding sheets in a second direction to be mutually bonded, are provided concurrently in parallel with the longitudinal direction of each of the staples and are mutually interlinked. Consequently, it is possible to make the posture-by-load small and it is possible to increase the number of the staples which can be loaded on the stapler.

Also, each staple of the interlinked staples relating to the present invention has a shape in which both the edges thereof are tapered to their tips, so that they can pass through the binding sheets accurately.

Further, in the interlinked staples relating to the present invention, the staple positioned at an edge portion of the interlinked staples is cut off in a state in which tensions applied simultaneously in the opposite directions are applied on the staple positioned at the leading portion and the staple adjacent to the staple positioned at the leading portion. Thus, it becomes possible to execute the cutoff of the staple positioned at the edge portion accurately.

Each of the interlinked staples relating to the present invention includes an adhesion portion for both the leg portions for mutually bonding both the leg portions in the vicinity of at least one edge portion on the rear surface of each of the staples. The first release coated paper is attached on the adhesion portion for both the leg portions, which causes a state in which the adhesion portion for both the leg portions is protected. Consequently, it becomes possible to prevent adhesion degradation of the adhesion portion for both the leg portions for mutually bonding both the leg portions.

Also, each of the interlinked staples relating to the present invention includes a binding sheet adhesion portion for mutually bonding the leg portions and the binding sheets in the vicinity of the other edge portion on the rear surface of the each staple. The binding sheet adhesion portion is attached with a second release coated paper, which causes a state in which the binding sheet adhesion portion is protected, so that it is possible to prevent adhesion degradation of the binding sheet adhesion portion.

The interlinked staples housed in the staple cartridge relating to the present invention are fed to the interlinking direction in the inside of the stapler with the engagement unit of the feeding means engaging with the predetermined engaged portion thereof. This enables accurate feeding to be realized in the inside of the stapler.

The staple cartridge relating to the present invention is one which is provided so as to be detachable with respect to a stapler for binding the binding sheets by the staple and which is provided with the staple housing unit for housing the roll shaped staples formed into a roll shape by winding a plurality of interlinked staples, each of which forms approximately a straight line, which are provided concurrently in parallel with the longitudinal direction of each of the staples and are mutually interlinked by interlinking portions, and a staple pulling out port that is provided so as to pull out the roll shaped staples housed in the staple housing unit and so as to make it possible to bring the interlinked staples into sight. Consequently, it is possible to make the posture-by-load small and it is possible to increase the number of the staples which can be loaded on the stapler.

Also, each staple of the interlinked staples housed in the staple cartridge relating to the present invention has a shape in which both the edges thereof are tapered to their tips, so that they can pass through the binding sheets accurately.

Also, in the interlinked staples housed in the staple cartridge relating to the present invention, the staple positioned at the edge portion of the interlinked staples is cut off in a state in which tensions applied simultaneously in the opposite directions are applied on the staple positioned at the leading portion and the staple adjacent to the staple positioned at the leading portion. This enables the staple positioned at the edge portion to be cut off accurately.

The staple cartridge relating to the present invention houses the interlinked staples each including the adhesion portion for both the leg portions in the staple housing unit, so that the adhesion portion for both the leg portions will not be exposed directly to the external atmosphere or various kinds of light beams, thereby preventing adhesion degradation. Also, there is provided, in the vicinity of at least one edge portion on the rear surface of each of the staples, with the adhesion portion for both the leg portions for mutually bonding both the leg portions in each of the interlinked staples housed in the staple cartridge, and the adhesion portion for both the leg portions is attached with the first release coated paper, which causes a state in which the adhesion portion for both the leg portions is protected. Consequently, it becomes possible to prevent adhesion degradation of the adhesion portion for both the leg portions for mutually bonding both the leg portions.

BRIEF DESCRIPTION OF DRAWINGS

FIG. 24B is an explanatory diagram showing a constitution example of the staple feeding unit-cutoff shaping unit-passing-through unit;

FIG. 34A is an explanatory diagram showing a constitution example of a staple pusher unit;

FIG. 34B is an explanatory diagram showing a constitution example of the staple pusher unit;

BEST MODE FOR CARRYING OUT THE INVENTION

Hereinafter, it will be explained with respect to exemplified embodiments of interlinked staples of the present invention with reference to the drawings.
<Constitution Example of Interlinked Staples>
Interlinked staples 1 are ones in which a plurality of staples 2 are interlinked and are used with them being loaded in a stapler 3 mentioned later. The staple 2 positioned at the edge portion of the interlinked staples 1 is cut off by the stapler 3. The cut off staple is shaped by the stapler 3 in a shape in which both the edges thereof are bent to one direction and thereafter, pass through binding sheets, and both the passed leg portions are bent and mutually bonded. The binding sheets are bound in this manner.

Figure 1A:
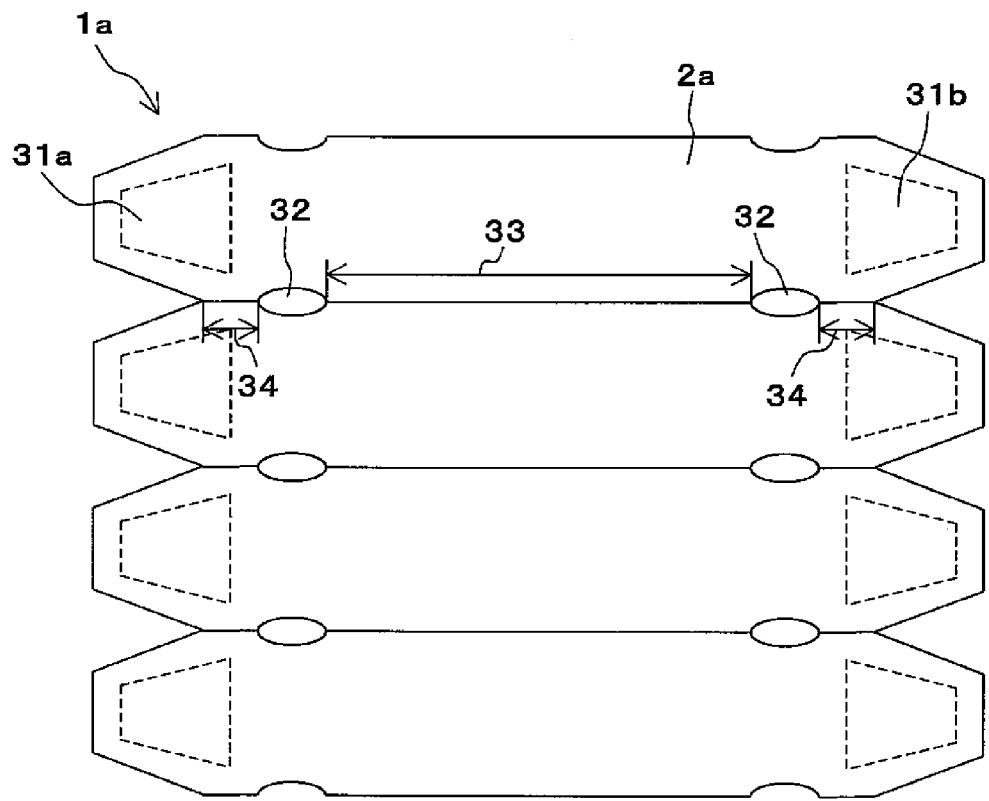
FIG. 1A is an explanatory diagram showing a constitution example of interlinked staples of a first example.
Figure 1B:
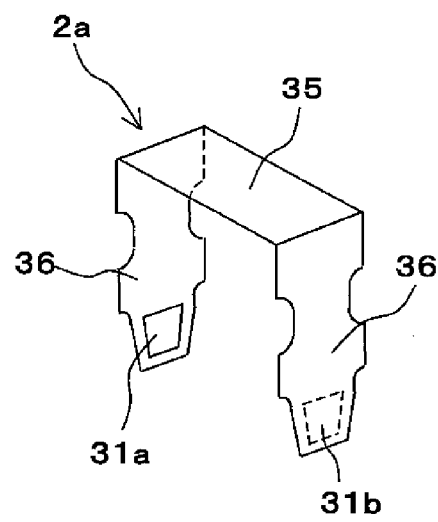
FIG. 1B is an explanatory diagram showing a constitution example of the interlinked staple of the first example.
Figure 2A:
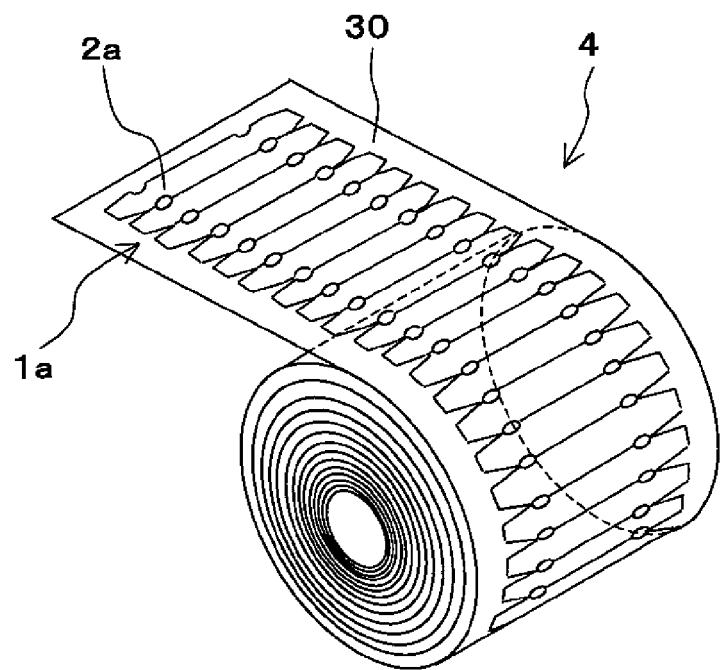
FIG. 2A is an explanatory diagram showing a constitution example of the interlinked staples of the first example.
Figure 2B:
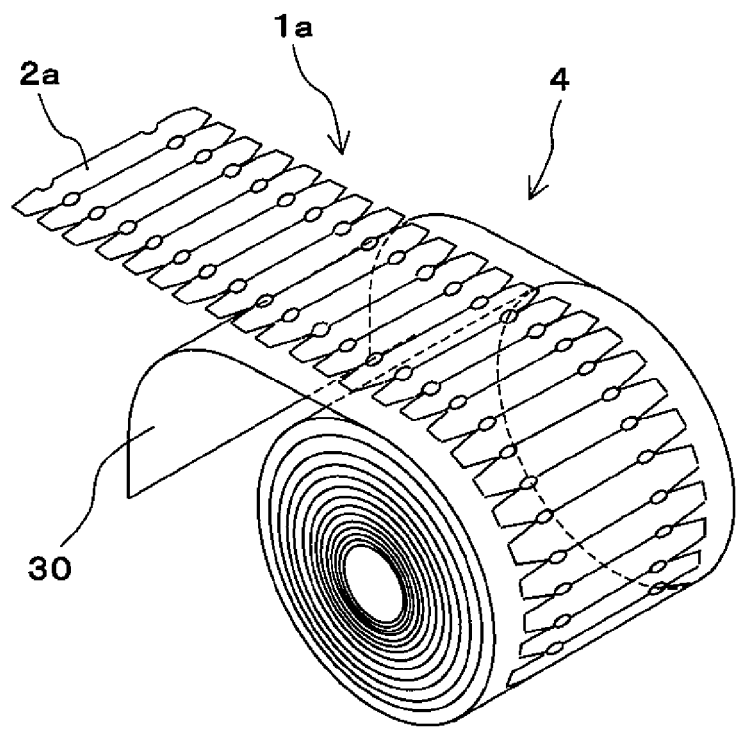
FIG. 2B is an explanatory diagram showing a constitution example of the interlinked staples of the first example.

FIG. 1A, FIG. 1B, FIG. 2A and FIG. 2B are explanatory diagrams showing constitutions with respect to a staple 2a of a first example and with respect to interlinked staples 1a of a first example in which the staples 2a are interlinked. FIG. 1A is a plan view showing details of the interlinked staples 1a. FIG. 1B is a perspective view showing a state in which the staple 2a is formed to a shape such that both the edges thereof are bent to one direction. FIG. 2A and FIG. 2B are explanatory diagrams showing a state in which the interlinked staples 1a are attached to a release coated paper 30 and are wound in a roll shape as a roll shaped staple 4. The interlinked staples 1a, the staple 2a and the roll shaped staple 4 will have, for example, such constitutions as follows.

As shown in FIG. 1A, a plurality of the staples 2a, each of which has an elongated and approximately straight lined shape, are provided concurrently in parallel in a longitudinal direction thereof and interlinked mutually, and the interlinked staples 1a are constituted thereby. With respect to each of the staples 2a, for example, the width in the up and down direction (interlinking direction of staples 2a) of FIG. 1A is around 5 mm to 10 mm, and the width in the right and left direction (longitudinal direction of staple 2a) of FIG. 1A is around 30 mm to 40 mm. The vicinities of the edge portions in the longitudinal direction of each of the staples 2a are formed approximately in trapezoidal shapes, and their widths become narrower gradually toward the tips thereof. Also, there are provided with adhesion portions 31 (31a, 31b) coated with adhesive agent on the rear surface (surface attached with the release coated paper 30) of each of the staple 2a on the vicinities of both the edge portions in the longitudinal direction thereof.

Also, there is provided elliptical feeding holes 32 at predetermined positions from both the edge portions of the side by which the staples 2a are interlinked. There is provided a portion between two feeding holes 32 as a slit portion 33 and the respective staples 2a are cut off perfectly thereby. In portions on the outside of the two feeding holes 32 and until both the edge portions of the side by which the staples 2a are interlinked, a state where the respective staples 2a are interlinked as staple interlinking portions 34 stays.

Also, the staple 2 at the edge portion is cut off from the interlinked staples 1a shown in FIG. 1A by the stapler 3 and as shown in FIG. 1B, it is shaped into a shape in which a crown portion 35 and leg portions 36 bent approximately perpendicularly from the crown portion 35, both the edges of which are bent to one direction.

Figure 3:
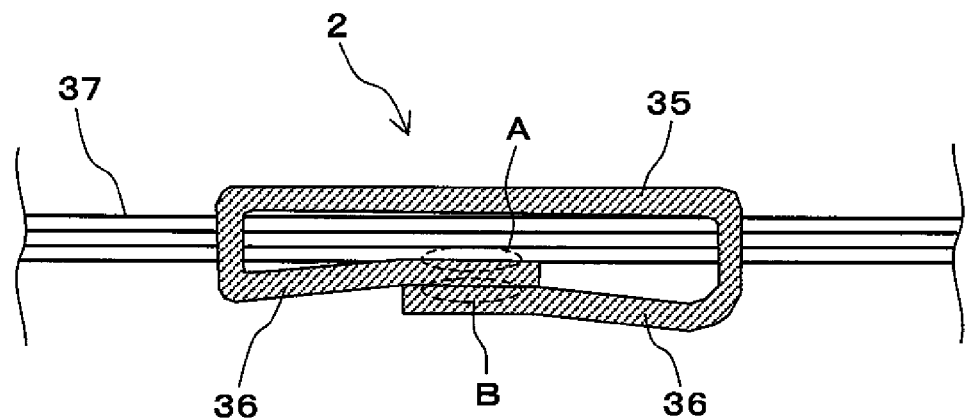
FIG. 3 is a cross-sectional diagram showing a binding state of binding sheets by a staple.

FIG. 3 is a cross-sectional diagram showing a binding state of the binding sheets 37 by the staple 2a. The staple 2a that is formed to a shape in which both the edges are bent to one direction passes through the binding sheets 37 and thereafter, both the leg portions 36 are bent along the binding sheets 37, as shown in FIG. 3, and the binding sheets 37 and an adhesion portion 31a of one leg portion 36 are bonded (at a portion shown by A in FIG. 3) as a binding sheet adhesion portion and the one leg portion 36 and an adhesion portion 31b of the other leg portion 36 are bonded (at a portion shown by B in FIG. 3) as an adhesion portion for both the leg portions, respectively. Thus, it becomes possible to improve retention characteristic of the binding sheets 37 by the staple 2a in a state in which the binding sheets 37 are bound by the staple 2a. Also, with respect to the staple 2a, a gap between the binding sheets 37 and the staple 2*a* disappears in a state of binding the binding sheets 37, which enables the looking of the staple 2*a* in the bound state to be improved.

Also, as shown in FIG. 2A, in a keeping state, the interlinked staples 1*a* are attached on the release coated paper 30 as the first release coated paper and the second release coated paper and is wound therewith. The release coated paper 30 is concurrently provided with a function as the first release coated paper and a function as the second release coated paper. As shown in FIG. 2B, a predetermined length of the release coated paper 30 is peeled from the edge portion on the leading side of the interlinked staples 1*a* and loaded on the stapler 3. It will be mentioned later with respect to the detailed loading method onto the stapler 3.

The interlinked staples 1*a* relating to the present invention are attached with the release coated paper 30 at the adhesion portions 31 (31*a*, 31*b*) on the rear surface of each staple 2*a*, which causes a state in which the respective adhesion portions 31*a*, 31*b* are protected. Consequently, it becomes possible to prevent adhesion degradation of the adhesion portion 31*b* for mutually bonding both the leg portions 36 and the adhesion portion 31*a* between the binding sheets 37 and both the leg portions 36.

Figure 4A:
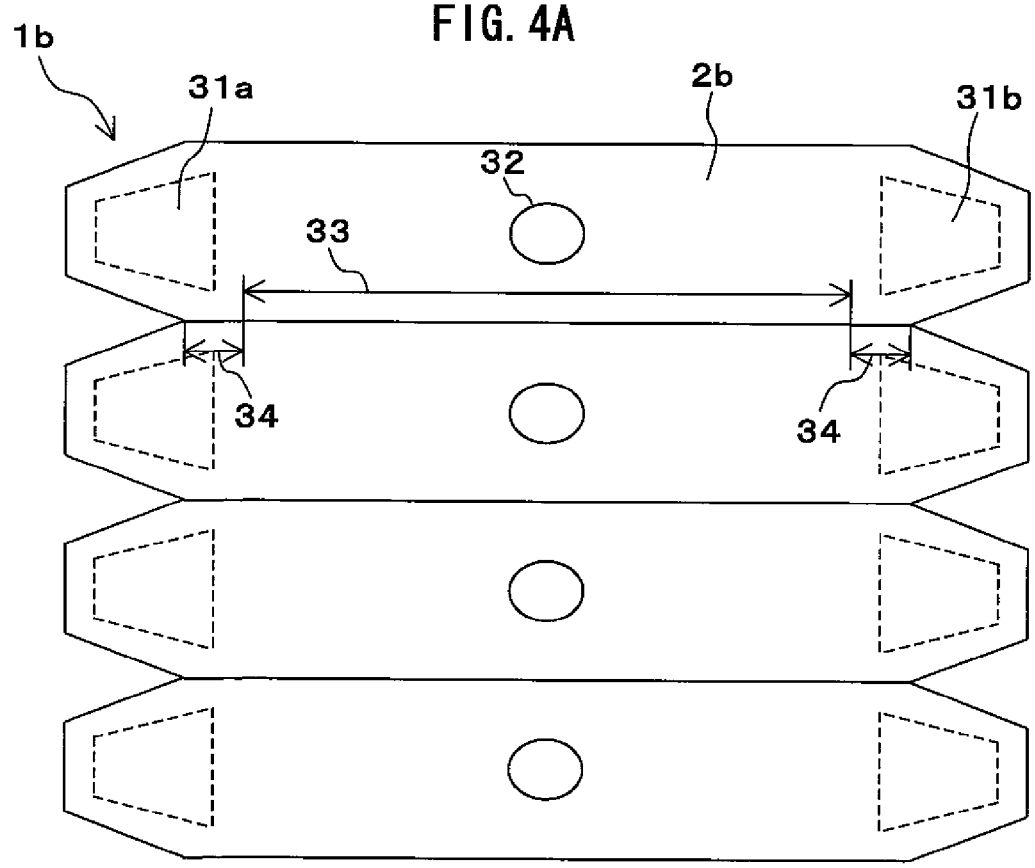
FIG. 4A is an explanatory diagram showing a constitution example of interlinked staples of a second example.
Figure 4B:
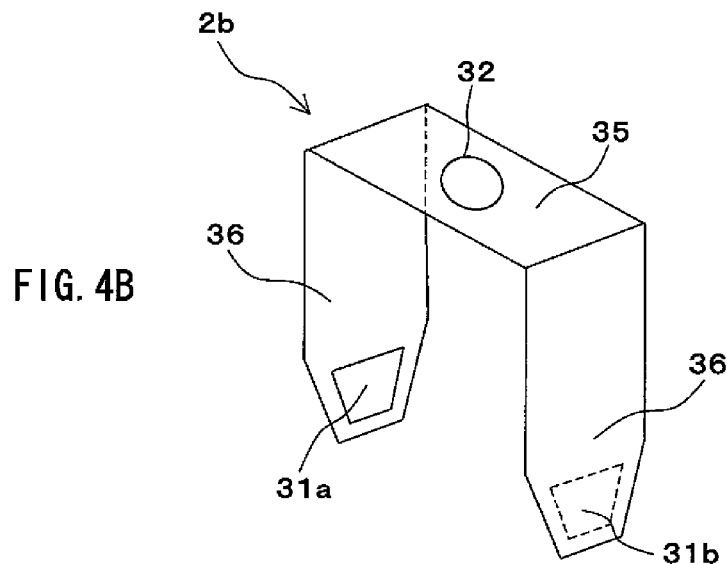
FIG. 4B is an explanatory diagram showing a constitution example of the interlinked staple of the second example.

Next, it will be explained with respect to a staple 2*b* and interlinked staples 1*b* of a second example. FIG. 4A and FIG. 4B are explanatory diagrams showing constitutions of the staple 2*b* of the second example and the interlinked staples 1*b* of the second example in which the staples 2*b* are interlinked. FIG. 4A is a plan view showing the details of the interlinked staples 1*b*. FIG. 4B is a perspective view showing a state in which the staple 2*b* is shaped into a shape for both the edges thereof bent to one direction.

The staple 2*b* is one which is different from the staple 2*a* explained in FIG. 1A and FIG. 1B only in the position of the feeding hole 32. The staple 2*b* is one which is provided with a circular feeding hole 32 at a middle of each staple 2*b*. The staple 2*b* includes, similarly as the staple 2*a*, the adhesion portions 31 (31*a*, 31*b*), the slit portion 33 and the staple interlinking portions 34.

Such staples 2*b* are interlinked and the interlinked staples 1*b* are constituted. The interlinked staples 1*b* are, similarly as the interlinked staples 1*a* shown in FIG. 2A and FIG. 2B, attached with the release coated paper 30 and becomes in a state in which they are wound as the roll shaped staple 4.

Figure 5A:
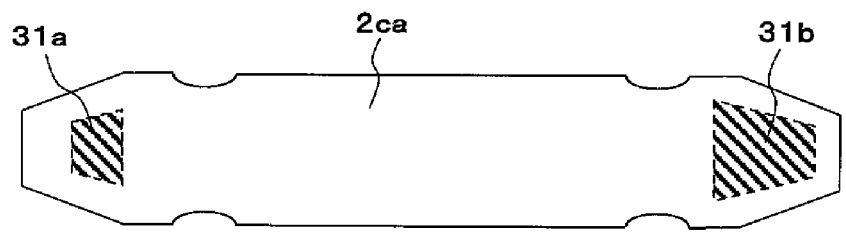
FIG. 5A is an explanatory diagram showing a constitution example of a third staple.
Figure 5B:
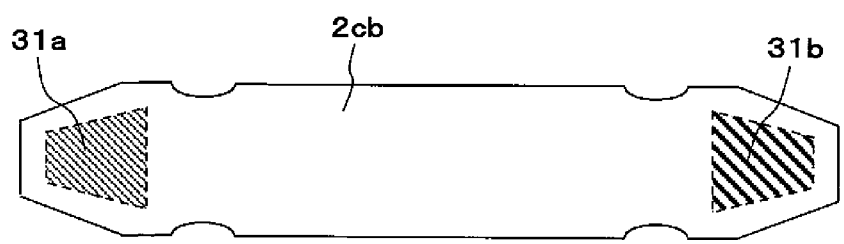
FIG. 5B is an explanatory diagram showing a constitution example of the third staple.
Figure 5C:
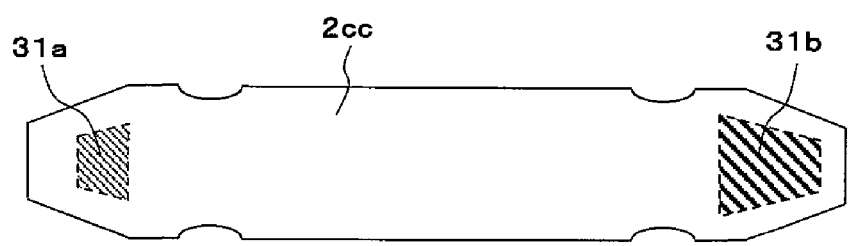
FIG. 5C is an explanatory diagram showing a constitution example of the third staple.

Next, it will be explained with respect to a staple 2*ca* to 2*ac* of a third example. FIG. 5A, FIG. 5B and FIG. 5C are explanatory diagrams of the staple 2*ca* to 2*ac* of the third example. The staple 2*ca* to 2*cc* is one which is different from the staple 1*a* shown in FIG. 1A and FIG. 1B only in the configuration of the respective adhesion portions 31*a*, 31*b*. The third staple 2*ca* to 2*cc* is one in which the adhesion portion 31*a* to be bonded with the binding sheets 37 shown by A in FIG. 3 brings out a weak adhesive force as compared with that of the adhesion portion 31*b* to be bonded with the other leg portion 36 shown by B in FIG. 3.

A staple 2*ca* shown in FIG. 5A includes the adhesion portion 31*a* having a narrower area compared with that of the adhesion portion 31*b*. This enables the adhesion portion 31*a* to be bonded with the binding sheets 37 to bring out a weak adhesive force as compared with that of the adhesion portion 31*b* to be bonded with the other leg portion 36.

A staple 2*cb* shown in FIG. 5B has the adhesion portion 31*a* coated with an adhesive agent of weak adhesive strength compared with that of the adhesion portion 31*b*. This enables the adhesion portion 31*a* to be bonded with the binding sheets 37 to bring out a weak adhesive force as compared with that of the adhesion portion 31*b* to be bonded with the other leg portion 36.

A staple 2*cc* shown in FIG. 5C has the adhesion portion 31*a* coated with an adhesive agent of weak adhesive strength and concurrently has a narrower area compared with that of the adhesion portion 31*b*. This enables the adhesion portion 31*a* to be bonded with the binding sheets 37 to bring out a weak adhesive force as compared with that of the adhesion portion 31*b* to be bonded with the other leg portion 36.

With respect to the staple 2*ca* to 2*cc* of the third example, the binding sheets 37 and the leg portion 36 are bonded with a weak adhesive force based on a fact that the adhesion portion 31*a* to be bonded with the binding sheets 37 brings out a weak adhesive force compared with that of the adhesion portion 31*b* to be bonded with the other leg portion 36. Thus, when the necessity of removing the staple 2*ca* to 2*cc* arises after binding the binding sheets 37, it becomes possible to execute the removal operation of the staple 2*ca* to 2*cc* easily.

The staples 2*ca* to 2*cc* are interlinked, similarly as the staples 2*a* shown in FIG. 1A and FIG. 1B, as the interlinked staples 1. The interlinked staples in which the staples 2*ca* to 2*cc* are interlinked are attached, similarly as the interlinked staples 1*a* shown in FIG. 2A and FIG. 2B, with the release coated paper 30 and become in a state of being wound as a roll shaped staple 4.

Figure 6:
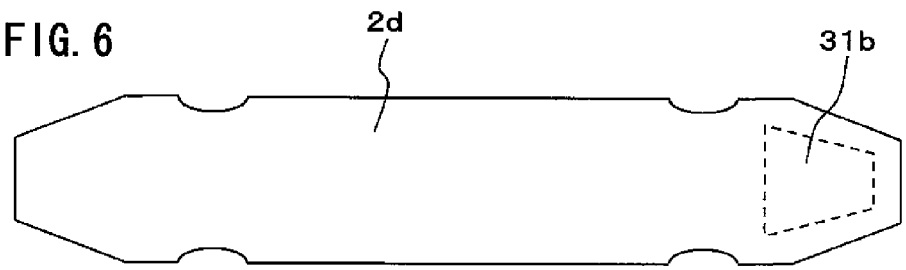
FIG. 6 is an explanatory diagram showing a constitution example of a fourth staple.
Figure 7:
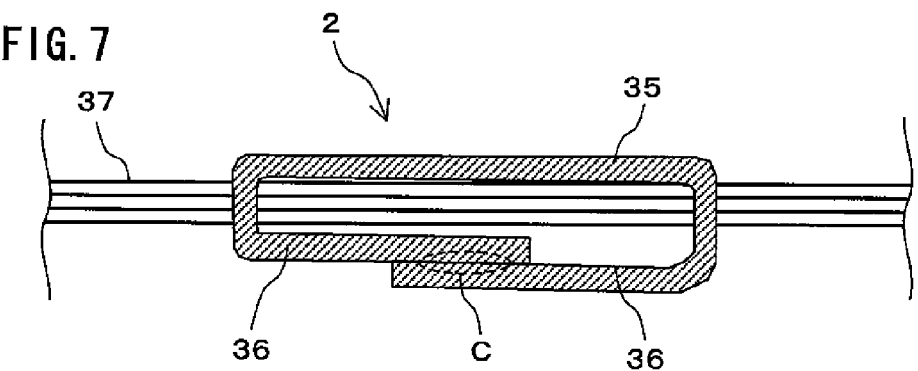
FIG. 7 is a cross-sectional diagram showing a binding state of binding sheets by a staple.

Next, it will be explained with respect to a staple 2*d* of a fourth example. FIG. 6 is an explanatory diagram of the staple 2*d* of the fourth example. The staple 2*d* of the fourth example is different from the staple 2*a* shown in FIG. 1A and FIG. 1B in that it does not include the adhesion portion 31*a* but includes only the adhesion portion 31*b*. FIG. 7 is a cross-sectional diagram showing a state in which the binding sheets 37 are bound by the staple 2*d* of the fourth example.

As shown in FIG. 7, in a state in which the binding sheets 37 are bound by the staple 2*d*, only both the leg portions 36 are bonded by the adhesion portion 31*b* and the binding sheets 37 and the leg portions 36 are not bonded together. This enables the removal operation of the staple 2*ca* to 2*cc* after binding the binding sheets 37 to be more easily executed in the staple 2*d* as compared with a case in the third staple 2*ca* to 2*cc* shown in FIG. 5A, FIG. 5B and FIG. 5C.

The staples 2*d* are interlinked, similarly as the staples 2*a* shown in FIG. 1A and FIG. 1B, as the interlinked staples 1. The interlinked staples in which the staples 2*d* are interlinked are attached, similarly as the interlinked staples 1*a* shown in FIG. 2A and FIG. 2B, with the release coated paper 30 as the first release coated paper and become in a state of being wound as a roll shaped staple 4.

Figure 8A:
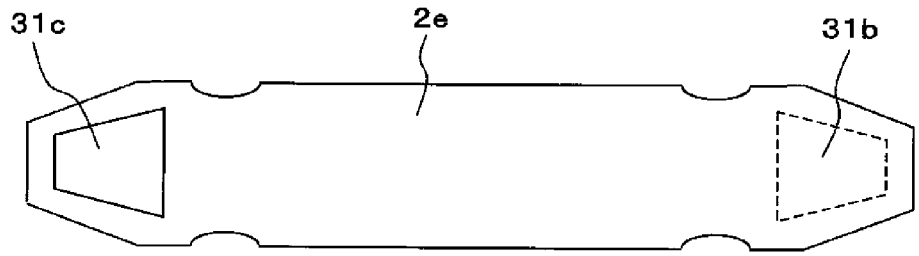
FIG. 8A is an explanatory diagram showing a constitution example of a fifth staple.
Figure 8B:
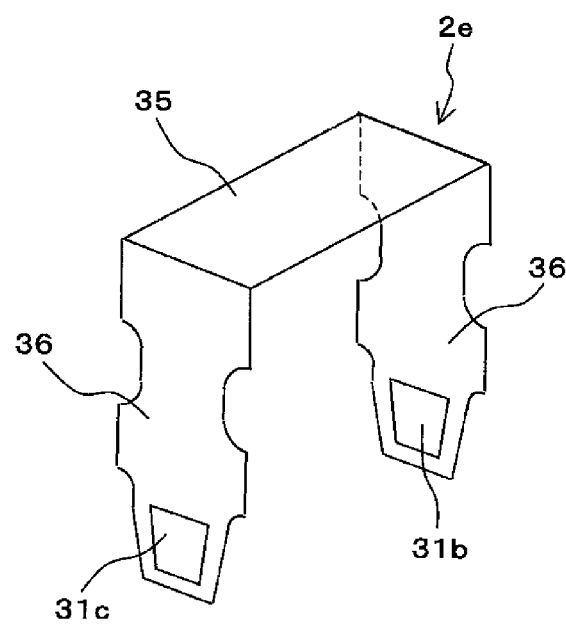
FIG. 8B is an explanatory diagram showing a constitution example of the fifth staple.

Next, it will be explained with respect to a staple 2*e* of a fifth example. FIG. 8A and FIG. 8B are explanatory diagrams of the staple 2*e* of the fifth example. FIG. 8A is a plan view of the staple 2*e*, and FIG. 8B is a perspective view thereof showing a state where the staple 2*e* is shaped into a shape in which both the edges thereof are bent to one direction. As shown in FIG. 8A, the staple 2*e* is different from the staple 2*a* shown in FIG. 1A and FIG. 1B in that it does not include the adhesion portion 31*a* to be bonded with the binding sheets 37 on the rear surface. The staple 2*e* is provided only with the adhesion portion 31*b* on the rear surface. Also, the staple 2*e* is provided with an adhesion portion 31*c* on a surface of the other edge portion that is different from the edge portion provided with the adhesion portion 31*b*.

Depending on a fact that the staple 2*e* has such a constitution, in a state in which the binding sheets 37 are bound by the staple 2*e*, as shown in FIG. 7, only both the leg portions 36 are bonded by the adhesion portion 31*b* and the adhesion portion 31c, but the binding sheets 37 and the leg portion 36 are not bonded together. This enables the removal operation of the staple 2ca to 2cc after binding the binding sheets 37 to be more easily executed in the staple 2d as compared with a case of the third staple 2ca to 2cc shown in FIG. 5A, FIG. 5B and FIG. 5C.

Also, with respect to the staple 2e, for example, an adhesive agent with self-bonding characteristic is coated on the adhesion portion 31b and the adhesion portion 31c as the first adhesion portion and the second adhesion portion. The adhesive agent with self-bonding characteristic is one which generates the adhesive force only when the same adhesive agents come into contact together and which does not generate the adhesive force in another case. Further, with respect to the staple 2e, for example, respective liquids of two-liquid mixture type adhesive agents are coated on the adhesion portion 31b and the adhesion portion 31c. The two-liquid mixture type adhesive agent is one which generates the adhesive force when mixing two kinds of liquids and which does not generate the adhesive force in another case.

Figure 9:
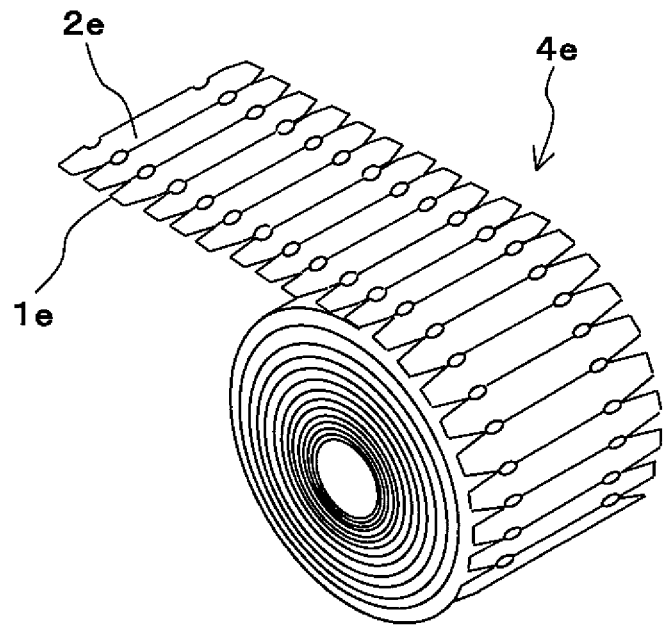
FIG. 9 is an explanatory diagram showing a constitution example of fifth interlinked staples.

FIG. 9 is an explanatory diagram showing a roll shaped staple 4e in which the interlinked staples 1e constituted by interlinking the staples 2e are wound around in a roll shape. As mentioned above, no adhesive force is generated in a state in which the adhesion portion 31b and the adhesion portion 31c of the staple 2e are not made to contact with each other. Consequently, it is unnecessary to protect the adhesion portion 31b and the adhesion portion 31c by the release coated paper 30 in a keeping state thereof and as shown in FIG. 9, it becomes possible to form the roll shaped staple 4e by directly winding around the interlinked staples 1e, which is differently from the interlinked staples 1 in which the first to fourth staples 2 are interlinked.

Figure 10:
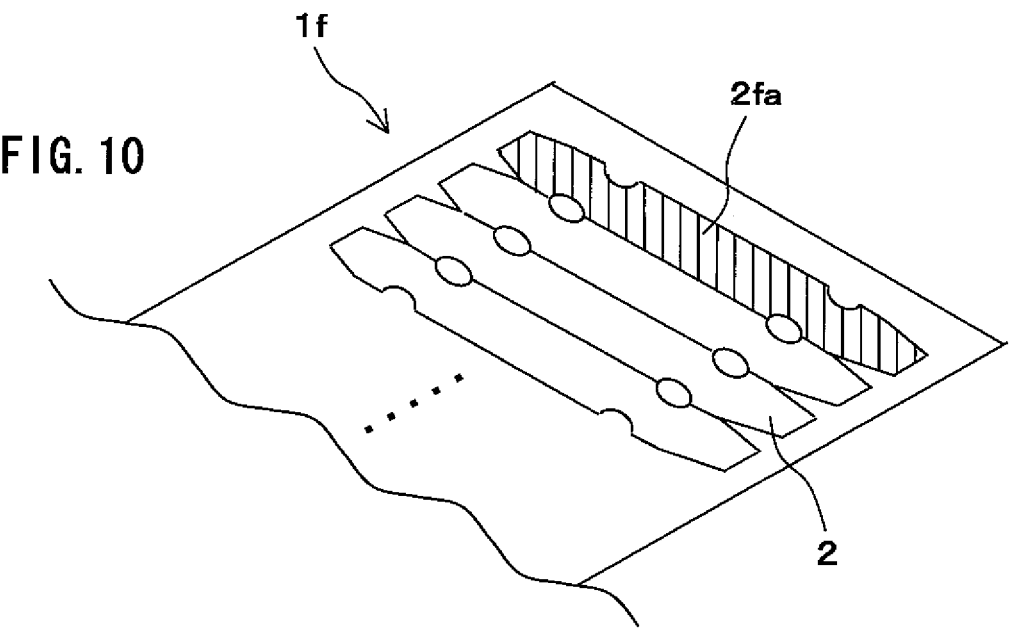
FIG. 10 is an explanatory diagram showing a constitution example of sixth interlinked staples.

Next, it will be explained with respect to a constitution example of interlinked staples if of a sixth example. FIG. 10 is an explanatory diagram showing a constitution example of the interlinked staples if of the sixth example. As shown in FIG. 10, with respect to the interlinked staples 1f, a staple 2fa which becomes the last one is provided with a different color from that of other staples 2. Consequently, a user can recognize that the staples 2 loaded in the stapler 3 are exhausted after the binding sheets 37 have been bound by the last staple 2fa.

Figure 11:
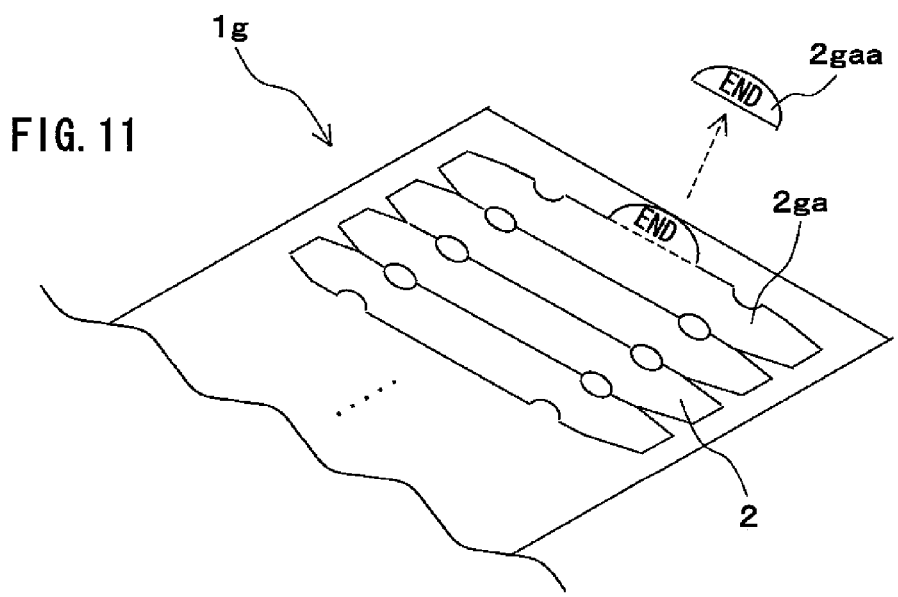
FIG. 11 is an explanatory diagram showing a constitution example of seventh interlinked staples.

Next, it will be explained with respect to a constitution example of interlinked staples 1g of a seventh example. FIG. 11 is an explanatory diagram showing a constitution example of the interlinked staples 1g of the seventh example. As shown in FIG. 11, with respect to the interlinked staples 1g, a staple 2ga which becomes the last one is provided with an identification tag 2gaa which can be cut off by perforations. Consequently, a user can recognize that the staples 2 loaded in the stapler 3 are exhausted after the binding sheets 37 have been bound by the last staple 2ga. Also, the identification tag 2gaa can be cut off by the perforations, so that it becomes the same as the state bound by other staples 2 by cutting off the identification tag 2gaa after binding the binding sheets 37.

Figure 12A:
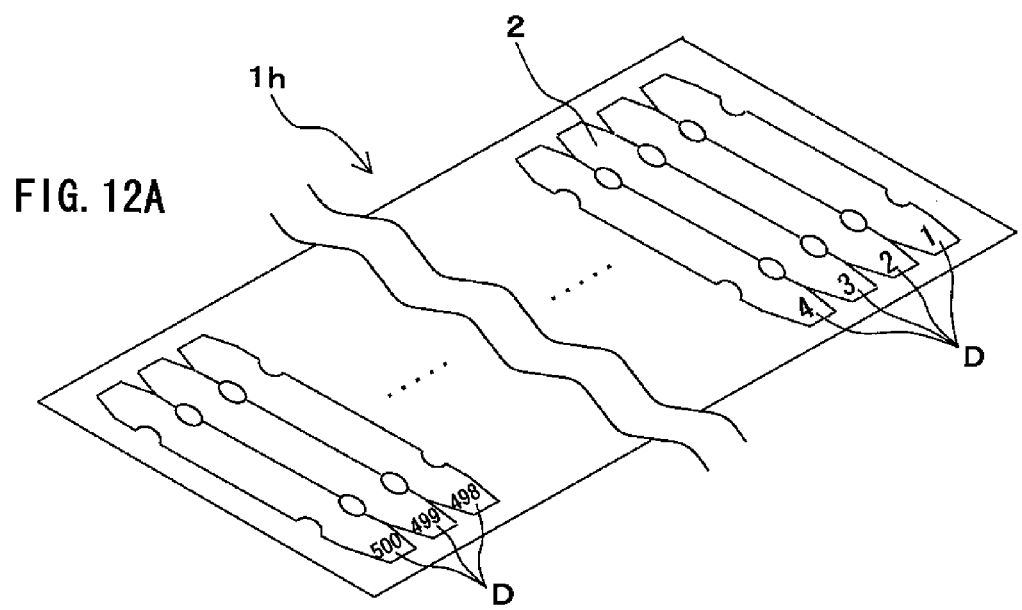
FIG. 12A is an explanatory diagram showing a constitution example of eighth interlinked staples.
Figure 12B:
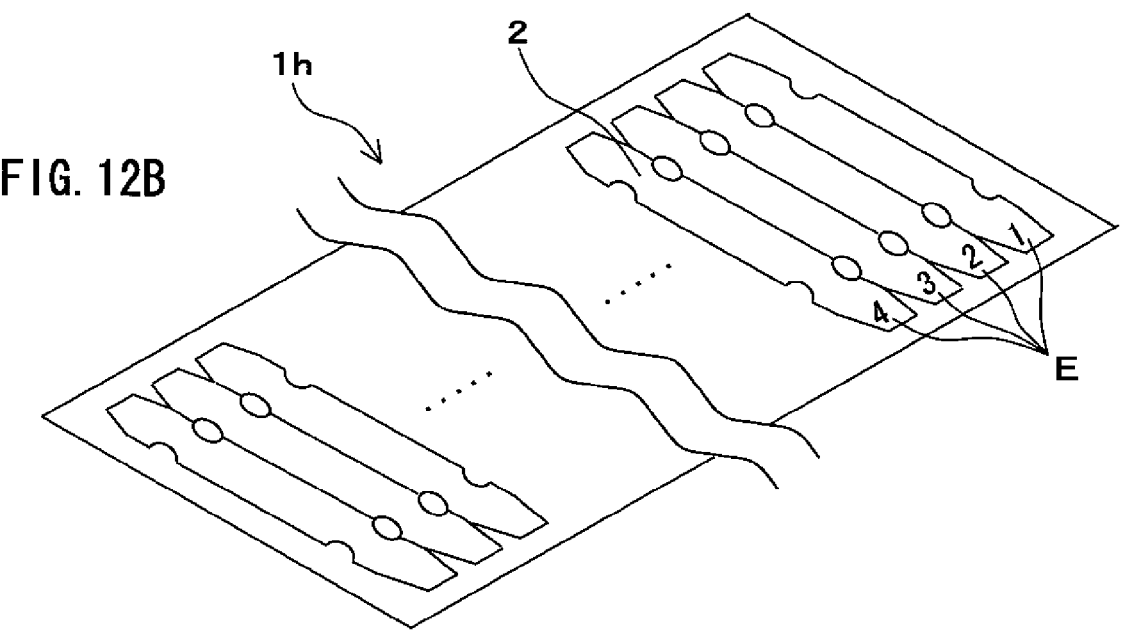
FIG. 12B is an explanatory diagram showing a constitution example of the eighth interlinked staples.
Figure 12C:
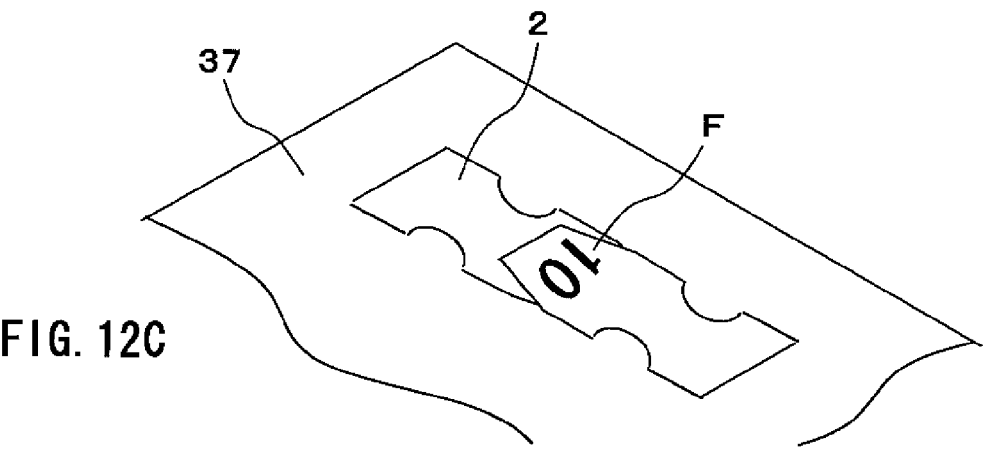
FIG. 12C is an explanatory diagram showing a constitution example of the eighth interlinked staples.

Next, it will be explained with respect to a constitution example of interlinked staples 1h of an eighth example. FIG. 12A, FIG. 12B and FIG. 12C are explanatory diagrams with respect to the constitution example of the interlinked staples 1h of the eighth example. FIG. 12A and FIG. 12B show constitution examples of the interlinked staples 1h, and FIG. 12C is an explanatory diagram showing a state of binding the binding sheets 37 by means of the staple 2 of the interlinked staples 1h shown in FIG. 12A and FIG. 12B.

The interlinked staples 1h shown in FIG. 12A are provided with consecutive numbers shown by D for all the staples 2. Consequently, a user can confirm the residual quantity of the staples 2 loaded in the stapler 3 for every binding work.

Also, the interlinked staples 1h shown in FIG. 12B are provided with consecutive numbers shown by E for the last several sheets of the staples 2. Consequently, a user can confirm the residual quantity of the staples 2 at the time instant when the residual quantity of the staples 2 loaded in the stapler 3 becomes a few.

Figure 13:
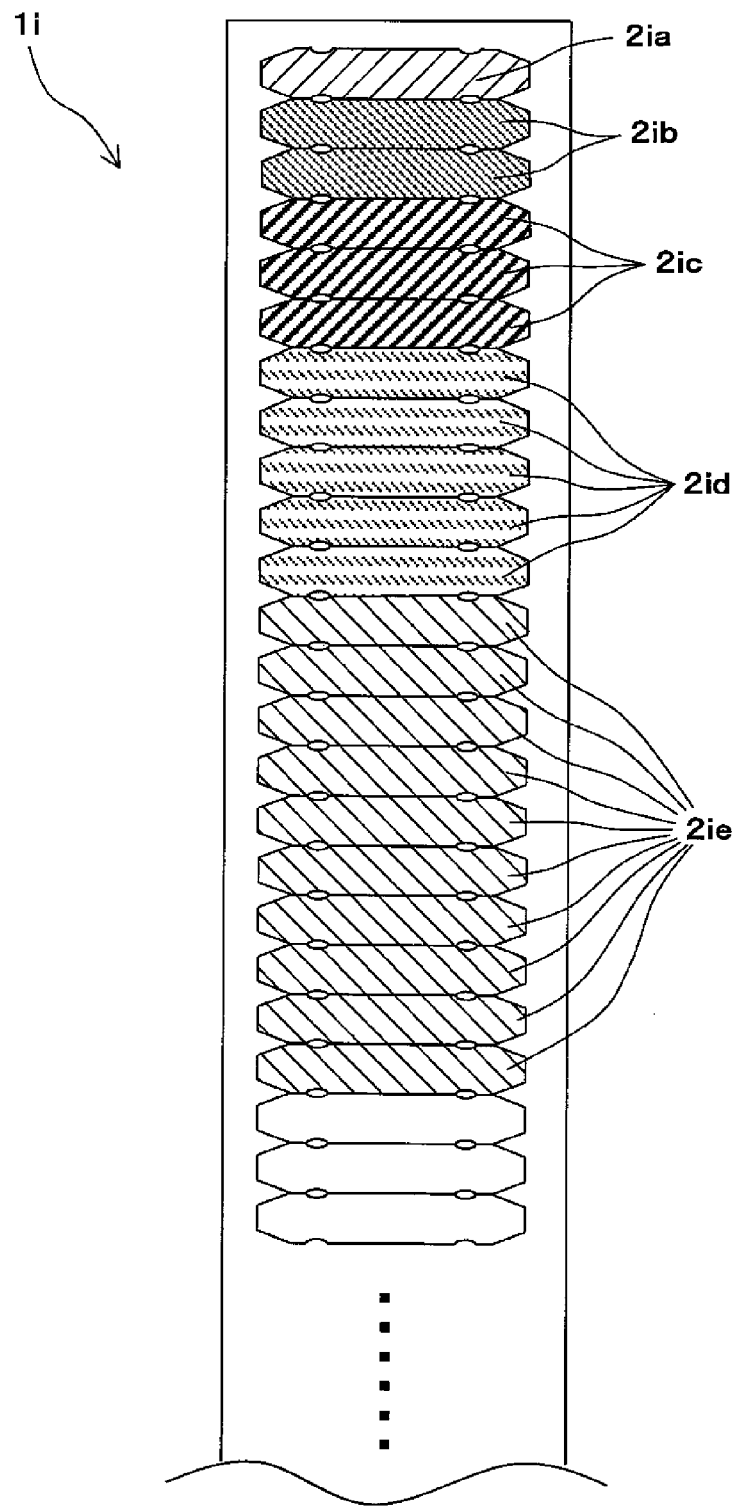
FIG. 13 is an explanatory diagram showing a constitution example of ninth interlinked staples.

Next, it will be explained with respect to a constitution example of interlinked staples 1i of a ninth example. FIG. 13 is an explanatory diagram showing a constitution example of the interlinked staples 1i of the ninth example. As shown in FIG. 13, the interlinked staples 1i are provided with a constitution in which the color of the staples 2 changes in response to the number of residual sheets of the staples 2. In the example shown in FIG. 13, staple 2ia to 2ie have different colors respectively. In FIG. 13, there is shown an example in which the color of the full surface of the each staple 2 becomes different, but it is also allowed to employ a constitution in which only a partial color of the each staple 2 will become different. Thus, for this reason, a user can confirm the residual quantity of the staples 2 loaded in the stapler 3 for every binding work.

In the interlinked staples 1 of the sixth to ninth examples, a user can recognize a fact that the staples 2 in the stapler 3 are exhausted. Thus, it becomes possible to prevent a punch hole from being formed through the binding sheets 37 by the punching blade of the stapler 3, which will be mentioned later, when executing a binding work in a state in which the staples 2 are not loaded in the stapler 3.

Figure 14A:
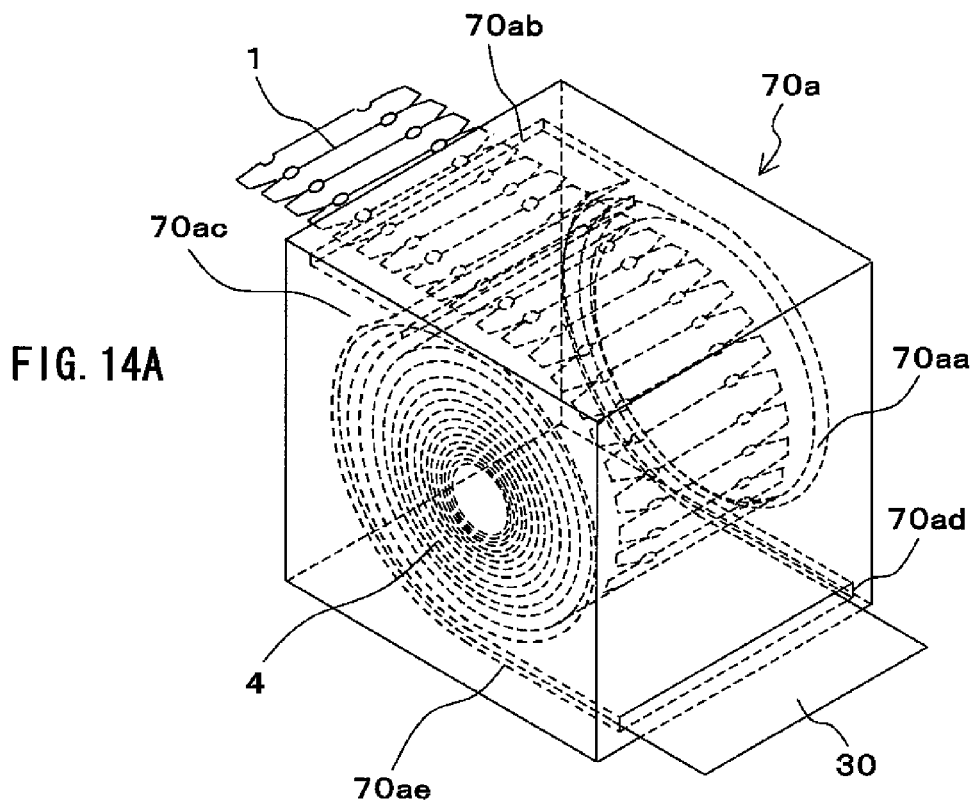
FIG. 14A is an explanatory diagram showing a constitution example of a first cartridge.
Figure 14B:
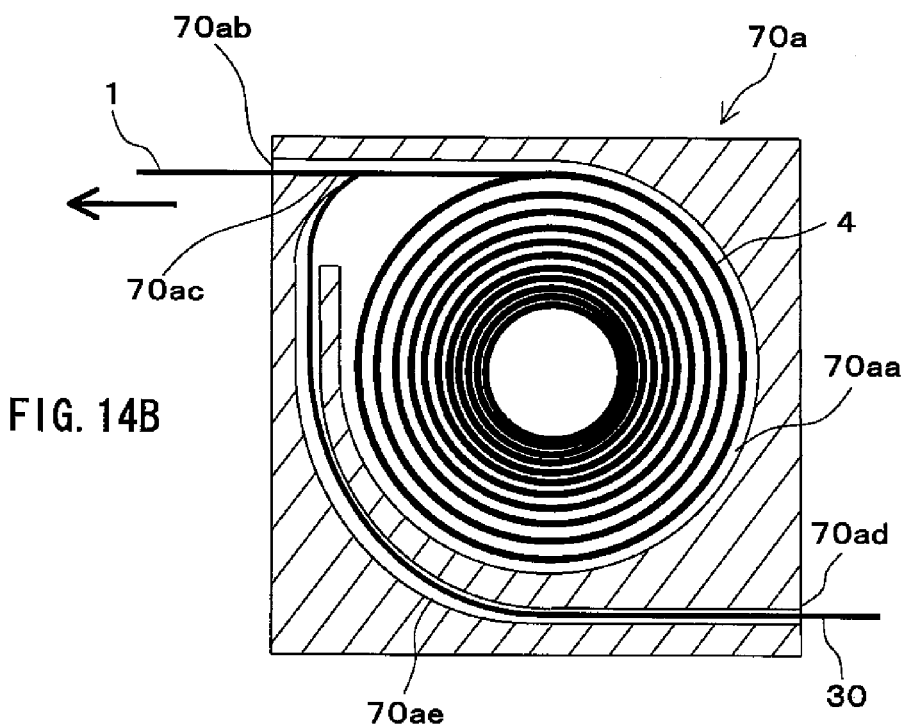
FIG. 14B is an explanatory diagram showing a constitution example of the first cartridge.

Next, it will be explained with respect to a constitution example of a cartridge 70 of the present invention for loading the roll shaped staple 4 to the stapler 3. FIG. 14A and FIG. 14B are explanatory diagrams showing a constitution of the cartridge 70a of a first example. FIG. 14A is a perspective view of the cartridge 70a for showing a constitution thereof and a part thereof is shown by broken lines in a seeing-through state thereof for the sake of explanation. FIG. 14B is a cross-section showing a constitution of the cartridge 70a.

As shown in FIG. 14A and FIG. 14B, the cartridge 70a has a shape of approximately a rectangular body of a size in response to the roll shaped staple 4 and includes a staple housing unit 70aa which the roll shaped staple 4 is placed in the inside. Also, the cartridge 70a is provided, at the upper portion of one side surface, with an interlinked staple pulling out port 70ab for pulling out the interlinked staples 1 in which the release coated paper 30 is peeled from the roll shaped staple 4 and for bringing them into sight. Further, the cartridge 70a is provided, in the inside of the cartridge 70a and at the downward portion of the interlinked staple pulling out port 70ab, with a peeling block 70ac as a protrusion shaped peeling unit for peeling the release coated paper 30 from the interlinked staples 1.

Also, at the lower portion of the side surface of the opposite side of the side surface on which the interlinked staple pulling out port 70ab is provided, a release coated paper outlet 70ad for discharging the release coated paper 30 peeled from the interlinked staples 1 is provided. Further, the cartridge 70a is provided, from the downward portion of the peeling block 70ac to the release coated paper outlet 70ad, with a release coated paper discharge path 70ae for discharging the release coated paper 30 peeled from the interlinked staples 1.

By pulling the interlinked staples 1 from a state shown in FIG. 14A and FIG. 14B to a direction shown by an arrow in FIG. 14B, the interlinked staples 1 are pulled out from the interlinked staple pulling out port 70ab and at the same time, the release coated paper 30 peeled from the interlinked staples 1 is discharged from the release coated paper outlet 70ad. The cartridge 70a is constituted, for example, by a resin.

Figure 15A:
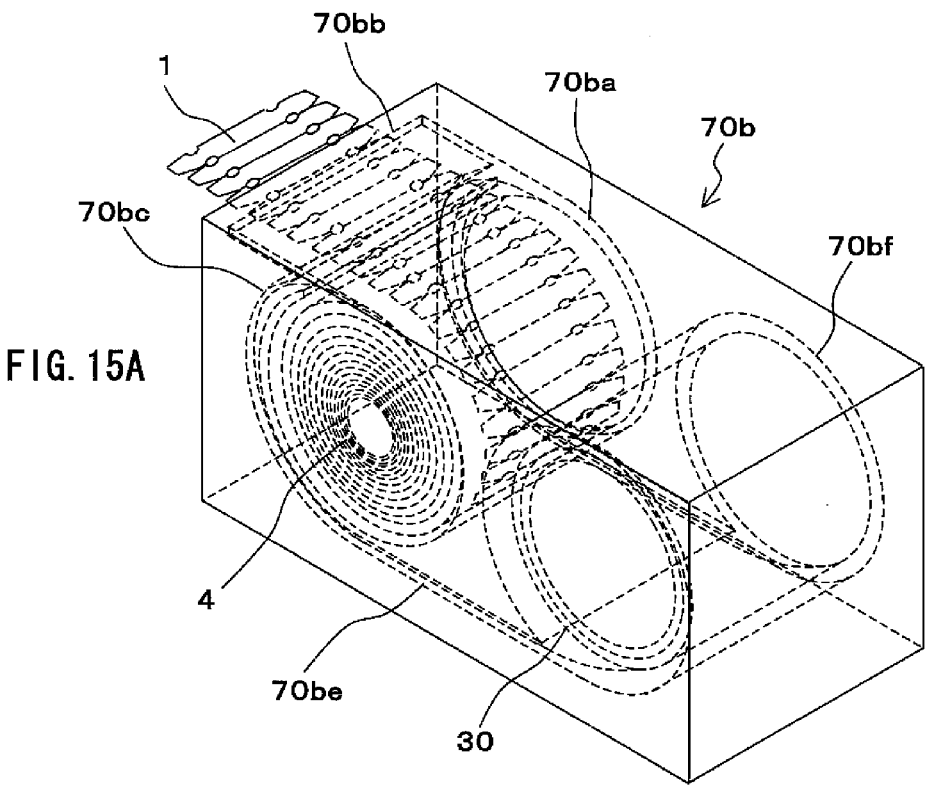
FIG. 15A is an explanatory diagram showing a constitution example of a second cartridge.
Figure 15B:
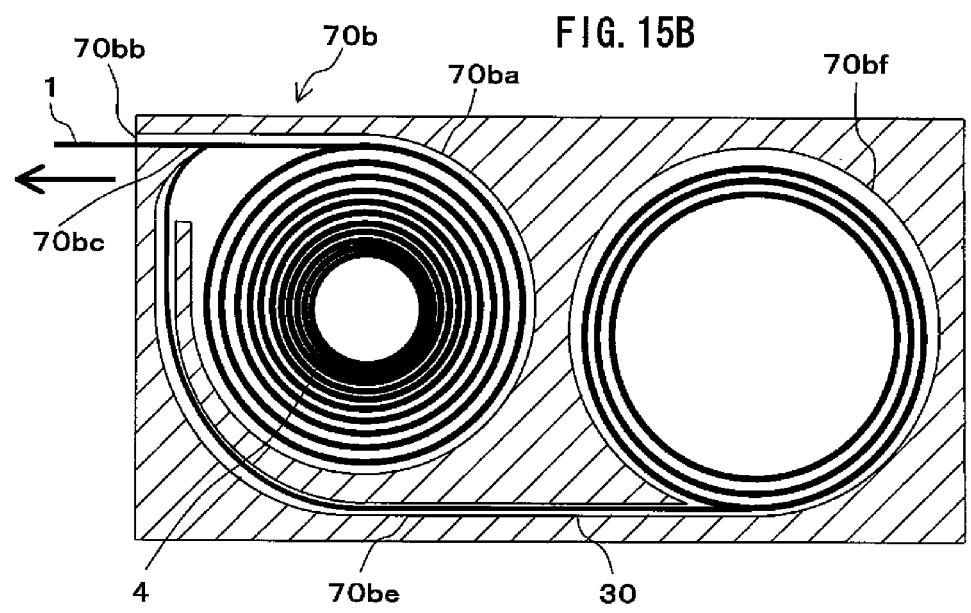
FIG. 15B is an explanatory diagram showing a constitution example of the second cartridge.

Next, it will be explained with respect to a constitution example of the cartridge 70b of a second example. FIG. 15A and FIG. 15B are explanatory diagrams showing a constitution of the cartridge 70b of a second example. FIG. 15A is a perspective view showing a constitution of the cartridge 70b and a part thereof is shown by broken lines in a seeing-through state thereof for the sake of explanation. FIG. 15B is a cross-section showing a constitution of the cartridge 70b.

As shown in FIG. 15A and FIG. 15B, the cartridge 70b has a shape of a rectangular body of a size in response to the roll shaped staple 4, and includes a staple housing unit 70ba which the roll shaped staple 4 is placed in the inside and a release coated paper housing unit 70bf for housing the release coated paper 30 peeled from the interlinked staples 1.

Also, similarly as the cartridge 70a, the cartridge 70b is provided, at the upper portion of one side surface, with an interlinked staple pulling out port 70bb for pulling out the interlinked staples 1 in which the release coated paper 30 is peeled and for bringing them into sight. Further, the cartridge 70b is provided, in the inside of the cartridge 70b and at the downward portion of the interlinked staple pulling out port 70bb, with a peeling block 70bc as a protrusion shaped peeling unit for peeling the release coated paper 30 from the interlinked staples 1.

Also, the cartridge 70b is provided, in a region from the downward portion of the peeling block 70bc to the release coated paper housing unit 70bf, with a release coated paper discharge path 70be for feeding the release coated paper 30 peeled from the interlinked staples 1 to the release coated paper housing unit 70bf.

By pulling the interlinked staples 1 from a state shown in FIG. 15A and FIG. 15B to a direction shown by an arrow in FIG. 15B, the interlinked staples 1 are pulled out from the interlinked staple pulling out port 70bb and at the same time, the release coated paper 30 peeled from the interlinked staples 1 is fed to the release coated paper housing unit 70bf and housed therein. The cartridge 70b is constituted, for example, by a resin.

Figure 16A:
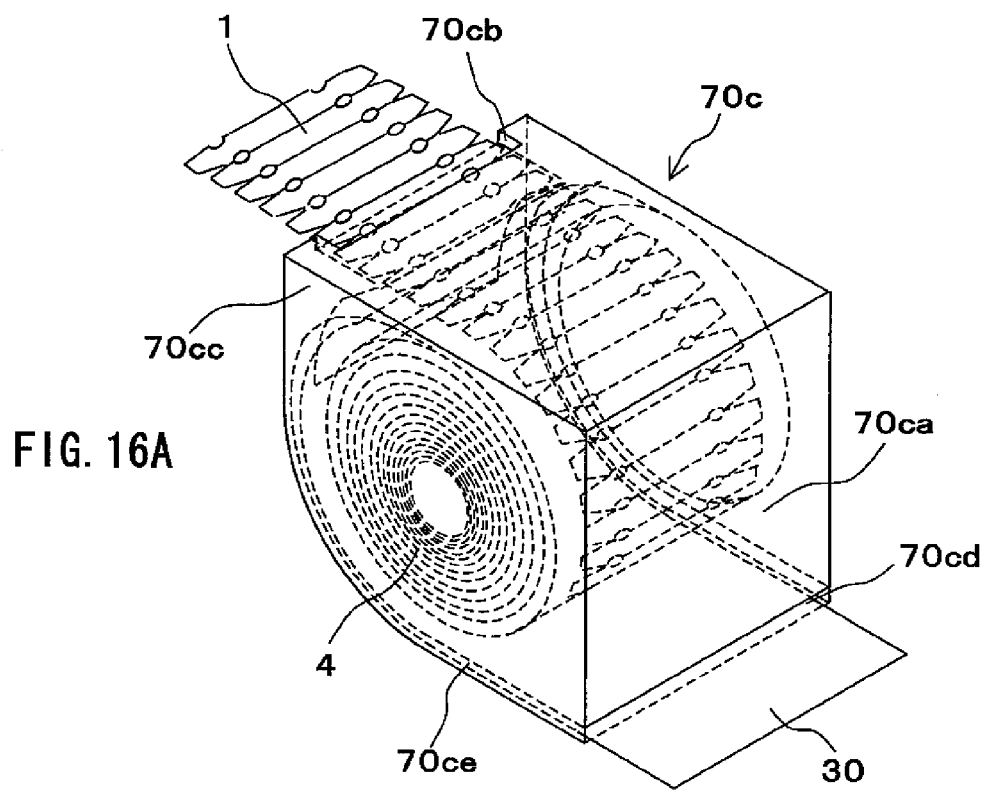
FIG. 16A is an explanatory diagram showing a constitution example of a third cartridge.
Figure 16B:
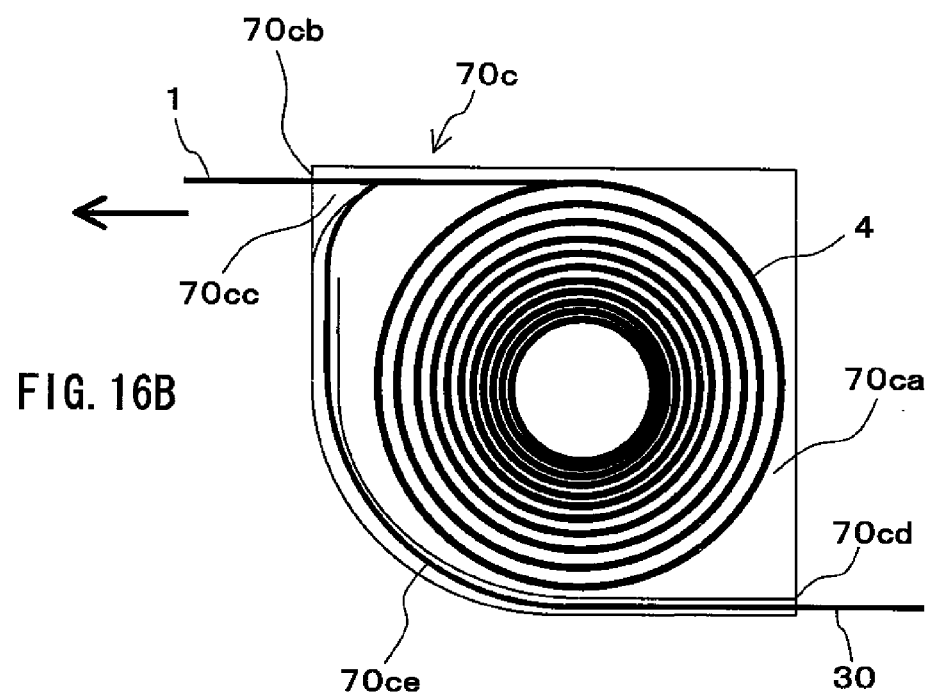
FIG. 16B is an explanatory diagram showing a constitution example of the third cartridge.

Next, it will be explained with respect to a constitution example of the cartridge 70c of a third example. FIG. 16A and FIG. 16B are explanatory diagrams showing a constitution of the cartridge 70c of the third example. FIG. 16A is a perspective view showing a constitution of the cartridge 70c and a part thereof is shown by broken lines in a seeing-through state thereof for the sake of explanation. FIG. 16B is a cross-section showing a constitution of the cartridge 70c.

As shown in FIG. 16A and FIG. 16B, the cartridge 70c has a shape of approximately a rectangular body which partially includes a curved surface and has a size in response to the roll shaped staple 4, and includes a staple housing unit 70ca which the roll shaped staple 4 is placed in the inside. Also, the cartridge 70c is provided, at the upper portion of one side surface, with an interlinked staple pulling out port 70cb from which the interlinked staples 1 from which the release coated paper 30 is peeled are pulled out. Further, the cartridge 70c is provided, in the inside of the cartridge 70c and at the downward portion of the interlinked staple pulling out port 70cb, with a peeling block 70cc as a protrusion shaped peeling unit for peeling the release coated paper 30 from the interlinked staples 1.

Also, at the lower portion of the side surface of the opposite side of the side surface on which the interlinked staple pulling out port 70cb is provided, a release coated paper outlet 70cd for discharging the release coated paper 30 peeled from the interlinked staples 1 is provided. Further, the cartridge 70c is provided, from the downward portion of the peeling block 70cc to the release coated paper outlet 70cd, with a release coated paper discharge path 70ce for discharging the release coated paper 30 peeled from the interlinked staples 1.

By pulling the interlinked staples 1 from a state shown in FIG. 16A and FIG. 16B to a direction shown by an arrow in FIG. 16B, the interlinked staples 1 are pulled out from the interlinked staple pulling out port 70cb and at the same time, the release coated paper 30 peeled from the interlinked staples 1 is discharged from the release coated paper outlet 70cd.

The cartridge 70c is constituted, for example, by paper. Consequently, it becomes possible for the cartridge 70c to be manufactured inexpensively compared with the cartridge 70a and the cartridge 70b which are constituted by resins. It should be noted that it is also allowed only for the peeling block 70cc to be resin-made.

<Constitution Example of Stapler>

Next, it will be explained with respect to a constitution example of the stapler 3 binding the binding sheets 37 by using the interlinked staples 1 of the present invention.

(1) Outline of Stapler 3

Figure 17:
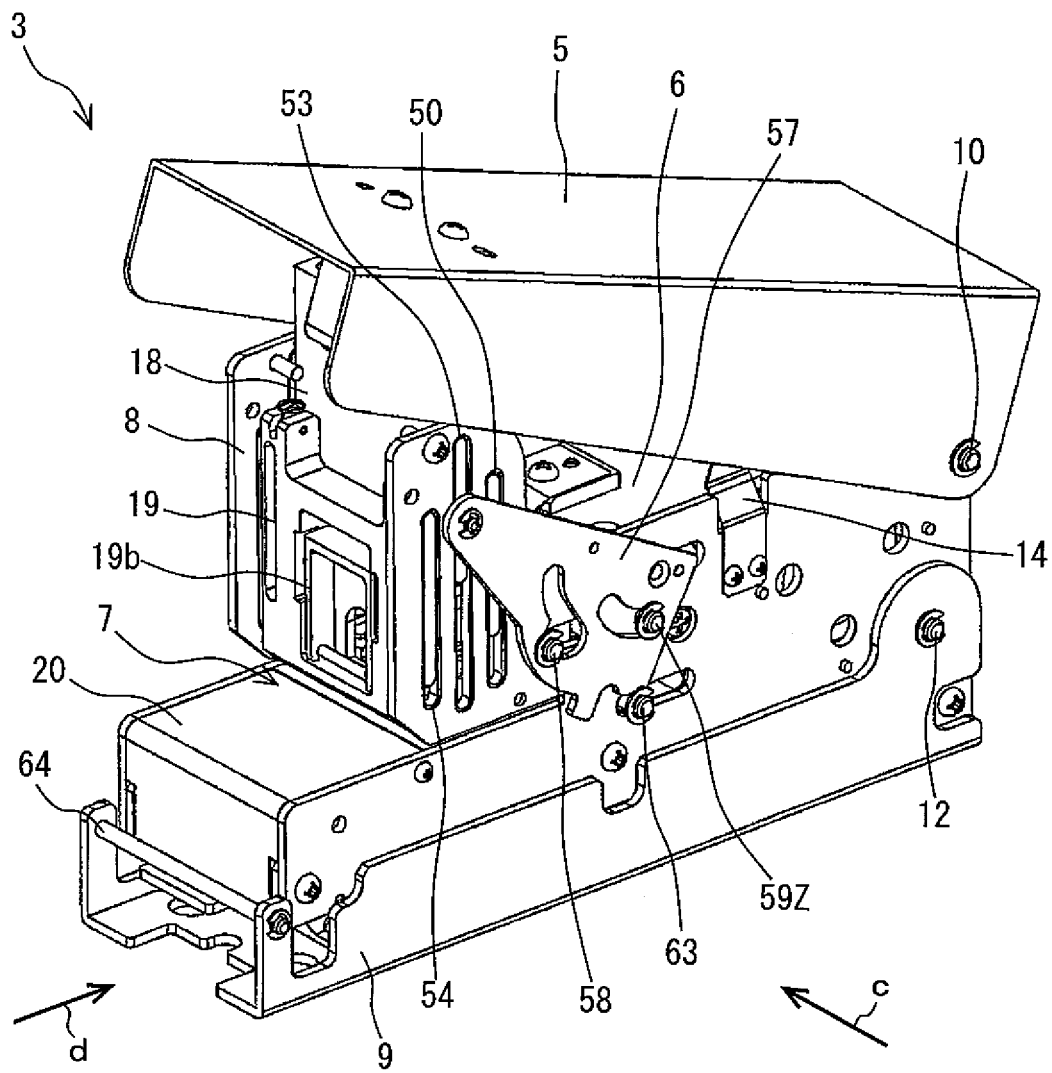
FIG. 17 is an explanatory diagram showing a constitution example of a stapler.
Figure 18:
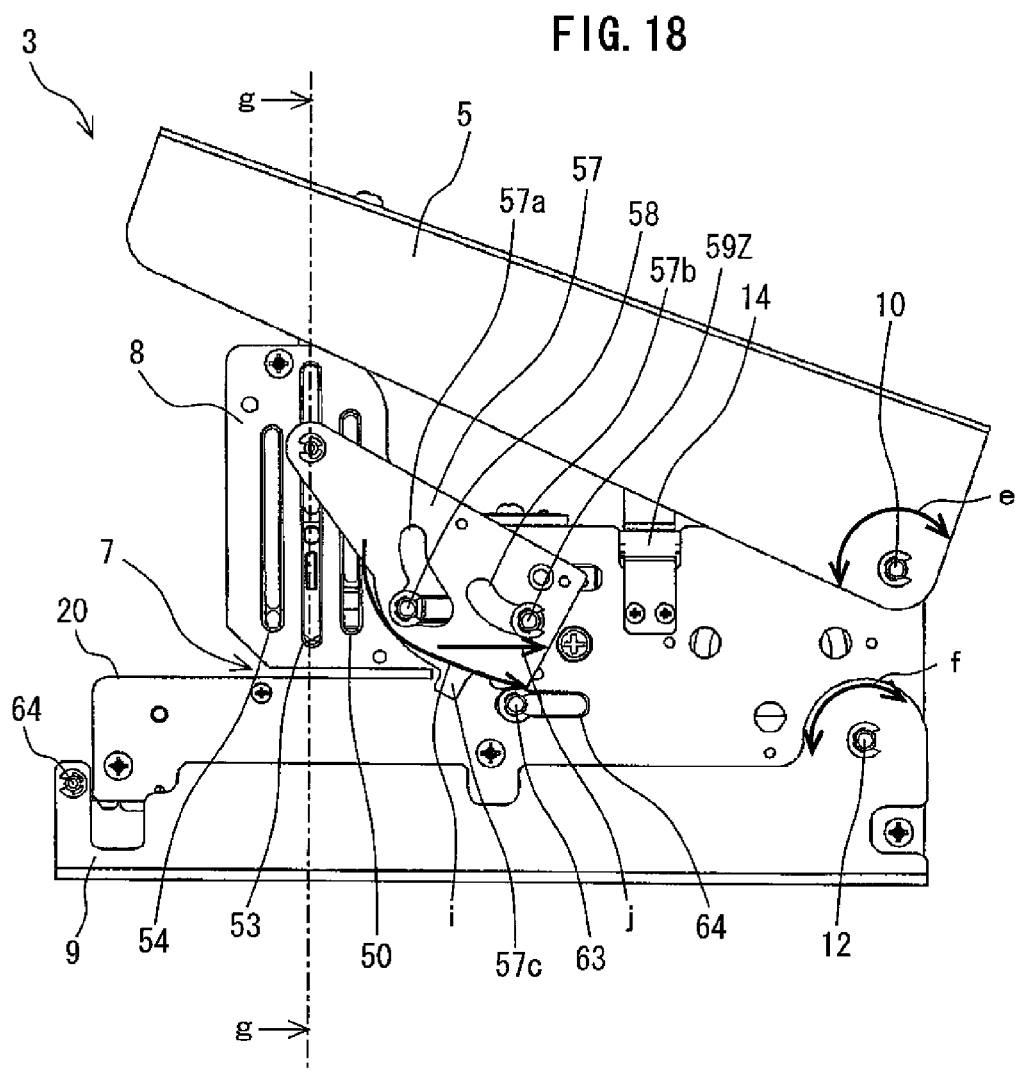
FIG. 18 is an explanatory diagram showing a constitution example of the stapler.
Figure 19:
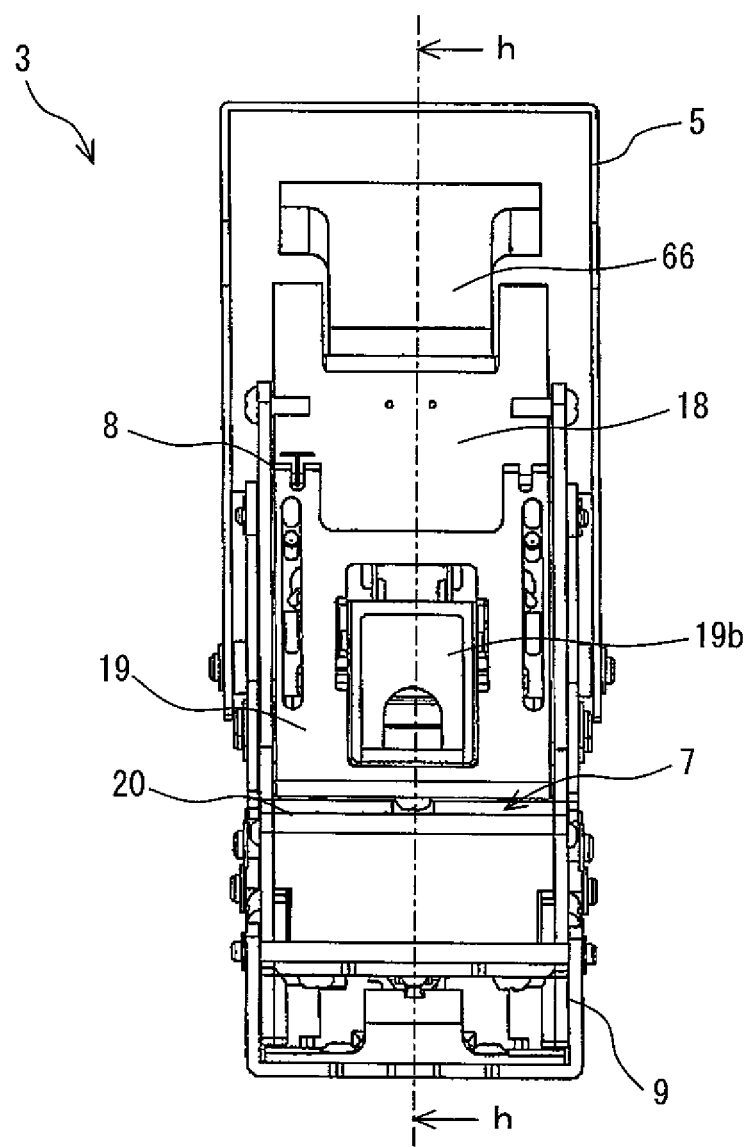
FIG. 19 is an explanatory diagram showing a constitution example of the stapler.

The stapler 3 is one in which the binding sheets 37 which are the binding object are bound by the above-mentioned interlinked staples 1. FIG. 17 is a perspective view showing the stapler 3, FIG. 18 is a side view showing a state seen from an arrow c of FIG. 17, and FIG. 19 is a front view showing a state seen from an arrow d of FIG. 17. In the following explanation, the left direction of FIG. 18 is made to be the front surface side of the stapler 3 and the right direction of FIG. 18 is made to be the rear surface side of the stapler 3. Also, the left direction of FIG. 19 is made to be the left side of the stapler 3 and the right direction of FIG. 19 is made to be the right side of the stapler 3.

Figure 20:
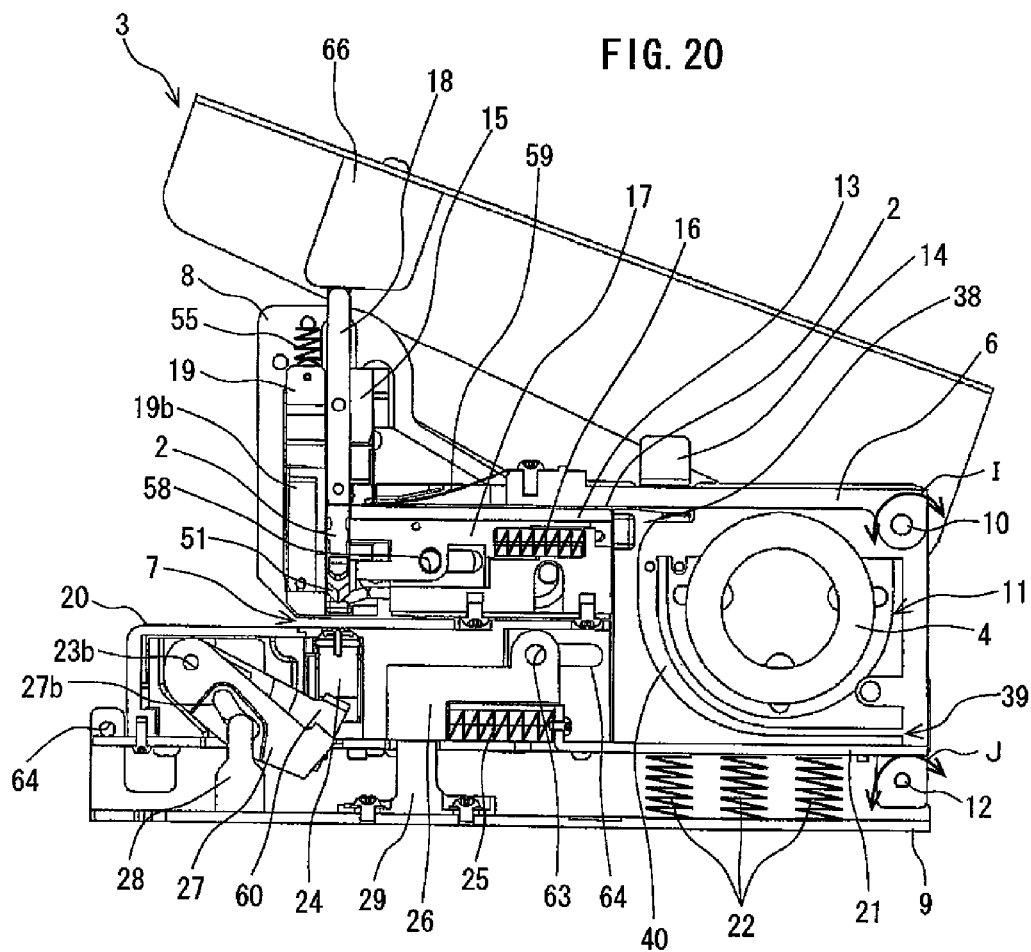
FIG. 20 is an explanatory diagram showing a constitution example of the stapler.
Figure 21:
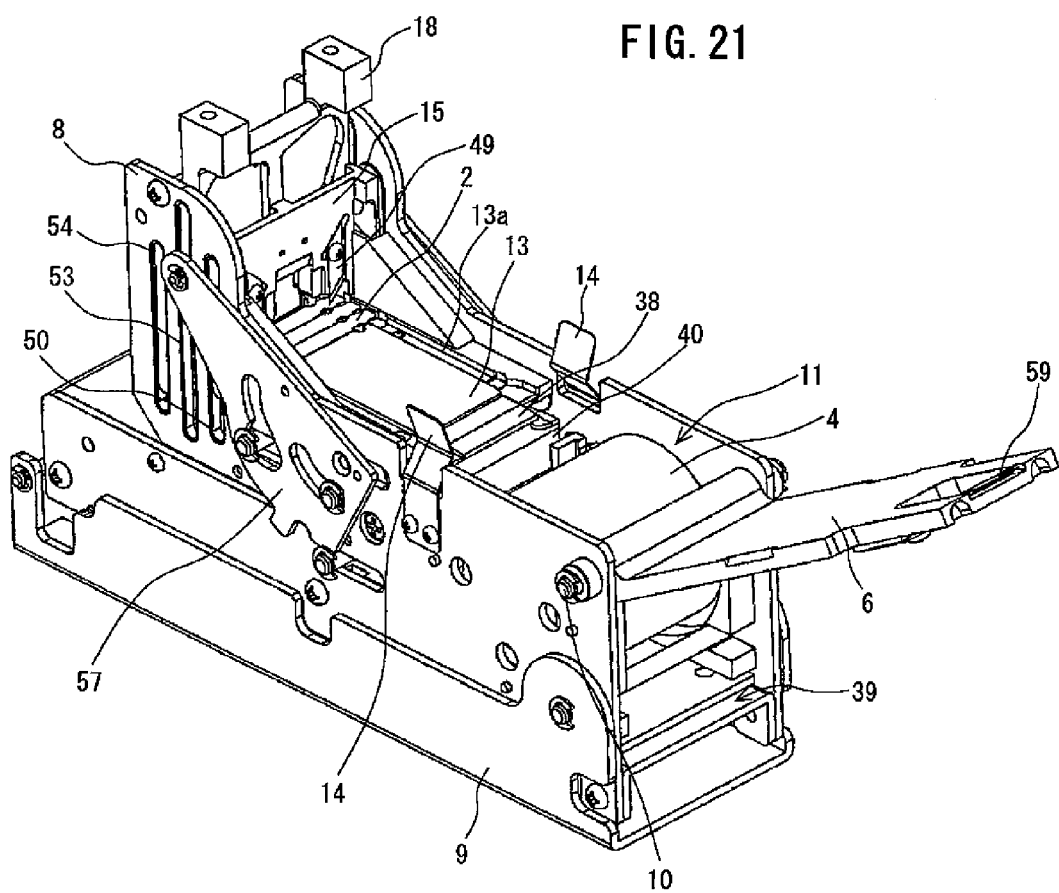
FIG. 21 is an explanatory diagram showing a constitution example of the stapler.

FIG. 20 and FIG. 21 are explanatory diagrams showing constitutions in the inside of the stapler 3. FIG. 20 is a cross-sectional view showing an h-h cross-section of FIG. 19. FIG. 21 is a perspective view showing a state in which the handle 5 is detached and the staple cover 6 mentioned later is opened.

As shown in FIG. 17 to FIG. 19, the stapler 3 is constituted by including the handle 5 pushed down by a user when executing a binding operation, a frame 8 which is positioned downward the handle 5 and includes a paper-sheet insertion port 7 into which binding sheets are inserted or the like, and a base 9 supporting the handle 5 and the frame 8.

As shown by an arrow e in FIG. 18 and by an arrow I in FIG. 20, the handle 5 is mounted on a handle & staple cover rotating shaft 10 rotatably at an upper portion of a rear end of the frame 8. The handle 5 rotates with respect to the frame 8 in counterclockwise direction of FIG. 18 and FIG. 20 caused by being pushed down by a user when executing a binding operation. Also, when executing the loading of a roll shaped staple 4 to a staple holder 11 of the frame 8, which is mentioned later, or the like, the handle 5 is rotated in clockwise direction of FIG. 18 and FIG. 20 and becomes in a state in which the top surface of the frame 8 is opened.

As shown by an arrow f in FIG. 18 and by an arrow J in FIG. 20, the frame 8 is mounted on a frame rotating shaft 12 rotatably at a rear end of the base 9. Also, as shown in FIG. 20 and FIG. 21, the frame 8 is provided with the staple cover 6 which is mounted rotatably similarly as the handle 5 on the handle & staple cover rotating shaft 10 on the top surface as a staple pusher unit.

Also, the frame 8 is provided with the staple holder 11 as a staple loading unit, which loads the roll shaped staple 4, at its rear edge portion. Further, the frame 8 is provided with a plane-surface shaped feeding path 13 as a staple feeding unit which executes the feeding of the staple 2 from the staple holder 11 toward the front. There are provided on the right and left sides of the feeding path 13 with plate springs 14 and owing to these plate springs 14, the staple cover 6 becomes in a state of being held down with respect to the feeding path 13 as shown in FIG. 20.

Also, the frame 8 is provided, in the vicinity of the front edge portion of the feeding path 13, with a forming plate 15 as a staple cutoff shaping unit for cutting off the staple 2 and for executing the shaping of both the edges thereof into a shape bent to one direction depending on the operation of the handle 5. Further, the frame 8 is provided with a driver 18 as a staple passing-through unit for passing the staple 2 through the binding sheets depending on the operation of the handle 5. Further, the frame 8 is provided with a paper-sheet pusher 19 for holding down the binding sheets when executing the cut-off, the shaping and the passing-through of the staple 2.

Also, the frame 8 is provided, at a lower portion of the feeding path 13, with a pusher spring 16 and a pusher 17 biased forward by the pusher spring 16 as a movement mechanism for moving the staple 2 from the position at which the cutoff and the shaping of the staple 2 is executed to the position at which the staple 2 passes through as mentioned above. There is provided, on the downward side of the forming plate 15, the driver 18, the paper-sheet pusher 19 and the pusher 17, with the paper-sheet insertion port 7 into which the binding sheets of the binding object are inserted and a table 20 on which binding sheets 37 are placed.

There is provided, at the lower portion of the table 20, with a bending unit for bending both the leg portions of the staple 2 passing through the binding sheets at the passing-through position along the binding sheets and for mutually bonding both the bent leg portions. The stapler 3 is provided, as the bending unit, with a clincher unit 23 (see FIG. 40) mounted on a bending unit installation table 21 which becomes a bottom portion of the frame 8, a pushing-out unit 24 and a slider 26 biased forward by a slider spring 25.

Also, the stapler 3 is provided, as the bending unit, with a clincher lifter 28 for supporting a clincher center 27 and for fixing the position thereof on the base 9. Further, the stapler 3 is provided with a slider holder 29 for supporting the slider 26 and return springs 22 each for supporting the bending unit installation table 21.

The stapler 3 has such a constitution and is one executing an operation for binding the binding sheets placed on the table 20 in the paper-sheet insertion port 7 by means of the staple 2 based on the operation of the handle 5 by a user.

(2) Constitution Example of Staple Loading Unit

Figure 22:
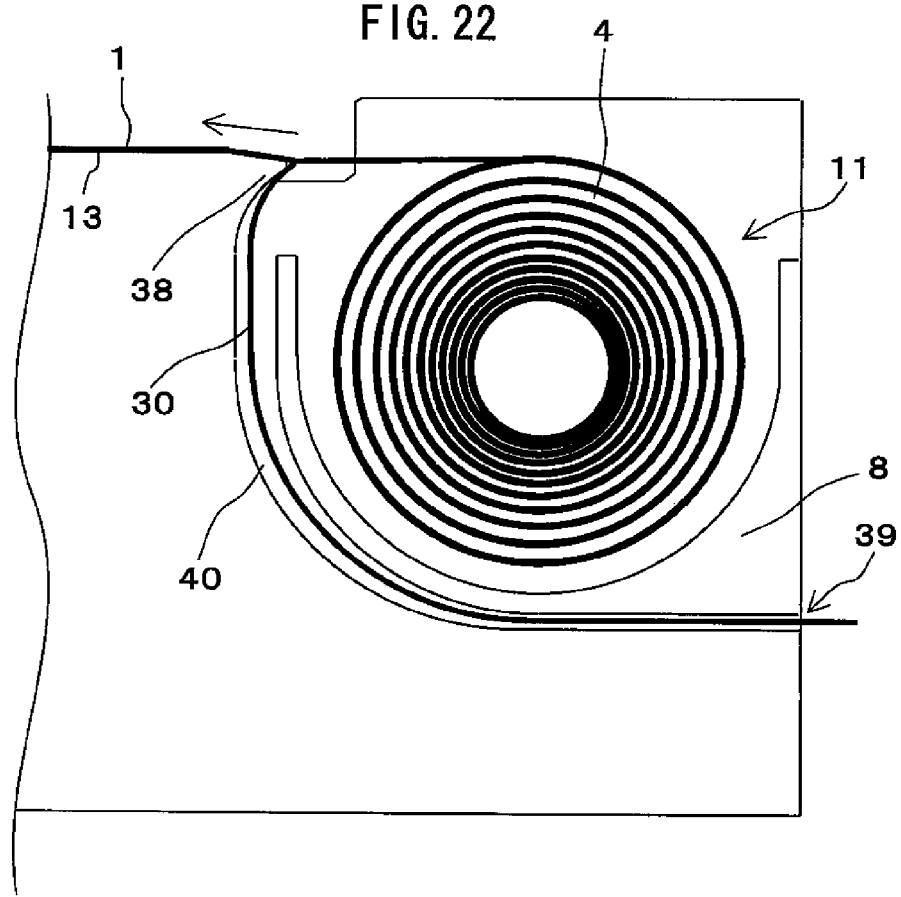
FIG. 22 is an explanatory diagram showing a constitution example of a staple loading unit.

Next, it will be explained with respect to a constitution example of a staple loading unit of the stapler 3. FIG. 22 is an explanatory diagram showing a state in which the roll shaped staple 4 is loaded on the staple loading unit. For a staple loading unit for loading the roll shaped staple 4, the stapler 3 is provided with the staple holder 11 at the rear edge portion of the frame 8. As shown in FIG. 21 mentioned above, it becomes possible by opening the handle 5 and the staple cover 6 to make an access to the staple holder 11 which is a staple loading unit.

Also, as shown in FIG. 20, FIG. 22 and the like, the feeding path 13 for executing the feed of the interlinked staples 1 peeling the release coated paper 30 is provided at the upper portion of the frame 8 from the staple holder 11 toward the front which is provided with the staple cutoff shaping unit or the like. At the starting edge of this feeding path 13, a protrusion-shaped peeling block 38 formed in response to the shape of the release coated paper 30 is included. Also, a release coated paper discharge path 40 is provided from the downward portion of this peeling block 38 to a release coated paper outlet 39 provided on the rear end surface of the frame 8 by way of the downward portion of the roll shaped staple 4 placed in the staple holder 11.

By including such a constitution, the staple loading unit is loaded with the roll shaped staple 4 and the interlinked staples 1 as follows. As shown in FIG. 22, the release coated paper 30 is peeled by the peeling block 38 from the interlinked staples 1 with the release coated paper 30 which are pulled out from the roll shaped staple 4 loaded in the staple holder 11. The interlinked staples 1 in which the release coated paper 30 is peeled are fed in the feeding path 13 and the peeled release coated paper 30 is discharged from the release coated paper outlet by way of the release coated paper discharge path 40.

Also, when the stapler 3 is provided loadably with the various kinds of cartridges 70 shown in FIG. 14A, FIG. 14B, FIG. 15A, FIG. 15B, FIG. 16A and FIG. 16B, the stapler 3 is provided with a loading unit of the cartridge 70 at the rear edge portion of the frame 8 instead of the staple holder 11. In this case, the staple 3 is not provided with the peeling block 38 and in a state in which the cartridge 70 is loaded, the interlinked staple pulling out port becomes in a position in response to the edge portion of the feeding path 13.

Consequently, similarly as FIG. 22, the release coated paper 30 is peeled, by the peeling block in the cartridge 70, from the interlinked staples 1 with the release coated paper 30, which are pulled out from the roll shaped staple 4 loaded in the staple housing unit; the interlinked staples 1 in which the release coated paper 30 is peeled are fed through the feeding path 13; and the peeled release coated paper 30 is discharged from the release coated paper outlet of the cartridge 70 by way of the release coated paper discharge path in the cartridge 70.

(3) Constitution Example of Staple Feed-Cutoff Shaping-Passing-Through Unit-Pusher Unit Next, it will be explained with respect to constitution examples of a staple feeding unit for executing feed of the interlinked staples 1 in which the release coated paper 30 is peeled, a staple cutoff shaping unit for executing cutoff and shaping of the staple 2 positioned at an edge portion from the fed interlinked staples 1 and a staple passing-through unit for passing the shaped staple 2 through the binding sheets.

Figure 23A:
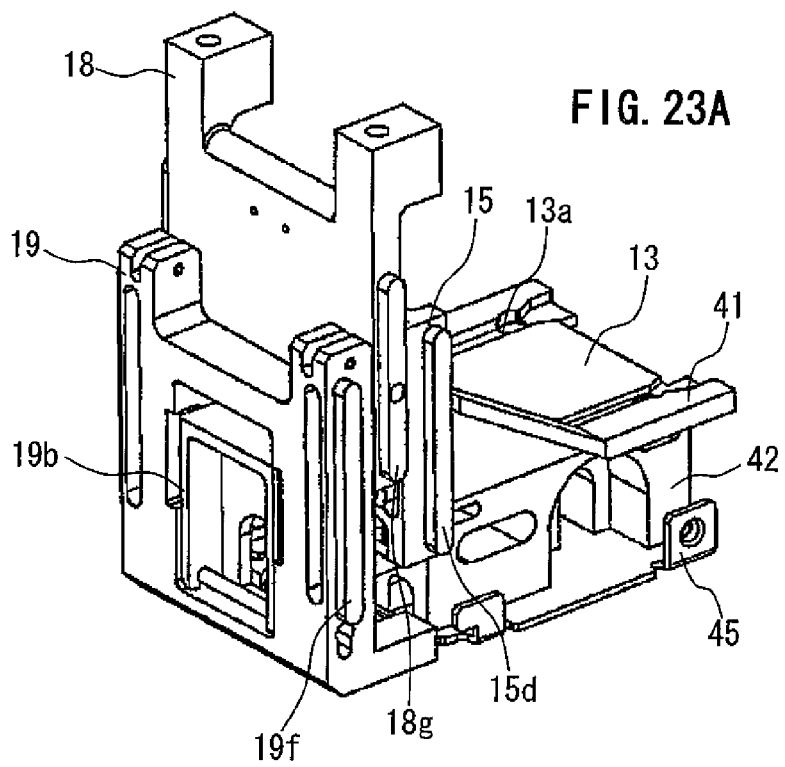
FIG. 23A is an explanatory diagram showing a constitution example of a staple feeding unit-cutoff shaping unit-passing-through unit.
Figure 23B:
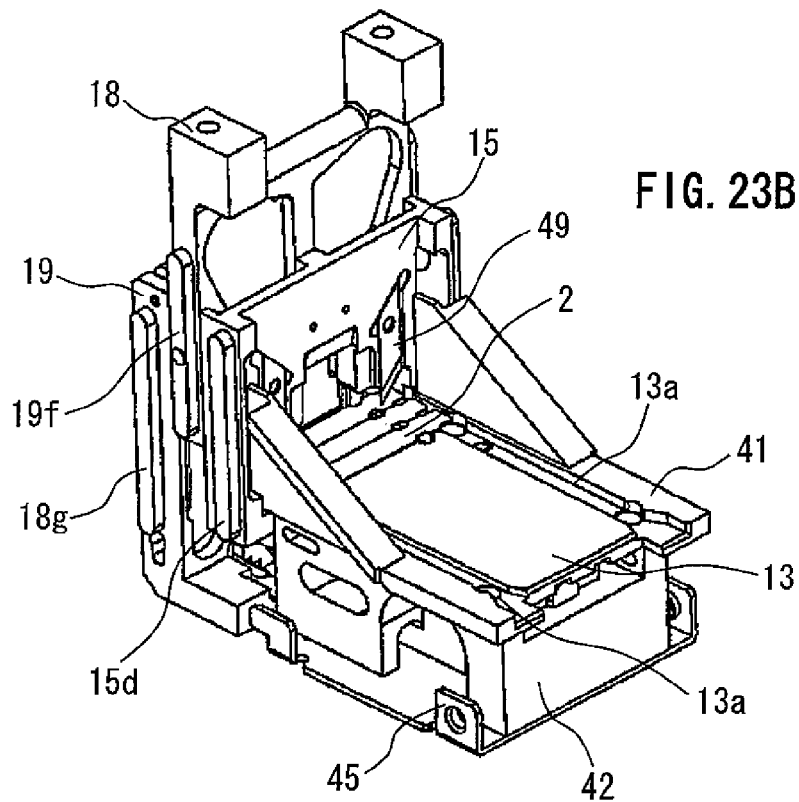
FIG. 23B is an explanatory diagram showing a constitution example of the staple feeding unit-cutoff shaping unit-passing-through unit.
Figure 24A:
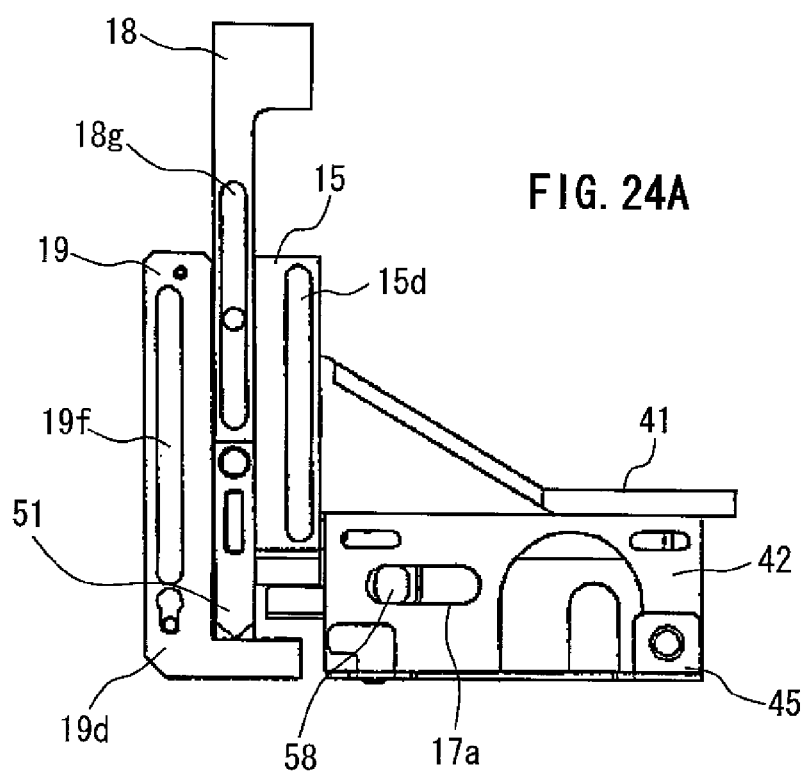
FIG. 24A is an explanatory diagram showing a constitution example of the staple feeding unit-cutoff shaping unit-passing-through unit.
Figure 25:
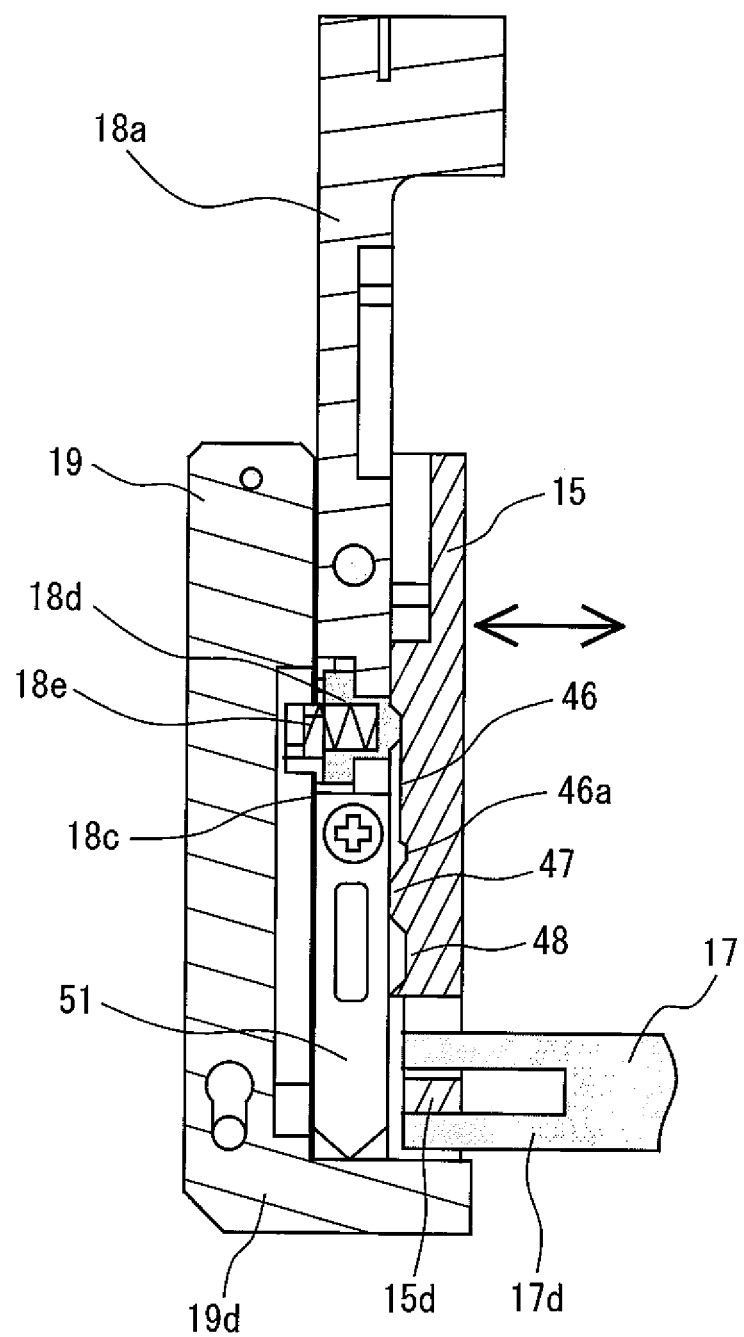
FIG. 25 is a cross-sectional view of a main portion of the staple feeding unit-cutoff shaping unit-penetration unit.

FIG. 23A, FIG. 23B, FIG. 24A and FIG. 24B are explanatory diagrams showing the staple feeding unit, the staple cutoff shaping unit and the staple passing-through unit. FIG. 23A is a perspective view showing a state in which staple feeding unit-cutoff shaping unit-passing-through unit is seen from the diagonal front. FIG. 23B is a perspective view showing a state in which staple feeding unit-cutoff shaping unit-passing-through unit is seen from the diagonal back, and shows a state in which the staple 2 is placed on a portion of the feeding path 13 for the sake of explanation. FIG. 24A is a side view showing a state in which staple feeding unit-cutoff shaping unit-passing-through unit is seen from the right direction, and FIG. 24B is a cross-section view. Also, FIG. 25 is a cross-section view of main portions of a staple feeding unit, a staple cutoff shaping unit and a staple passing-through unit.

As shown in FIG. 20, the staple feeding unit, the staple cutoff shaping unit and the staple passing-through unit are provided on the front side of a staple loading unit at an upper portion of the frame 8. As shown in FIG. 23A, FIG. 23B, FIG. 24A and FIG. 24B, the stapler 3 is provided with a feeding path portion 41, a pusher holder 42 and a feeding path installation table 43 or the like as a staple feeding unit which feeds the interlinked staples 1. Also, the stapler 3 is provided with the forming plate 15 as a staple cutoff shaping unit which cuts off and shapes the staple 2 which is positioned at a leading portion from the interlinked staples 1, and the driver 18 as the staple passing-through unit which passes the cutoff shaped staple 2 through the binding sheets. Also, the frame 8 is provided with the paper-sheet pusher 19 for pushing binding sheets down when the cutoff shaping and the passing-through of the staple 2 are executed. These are positioned on the front side from the position of a staple loading unit in order of the feeding path portion 41, the forming plate 15, the driver 18 and the paper-sheet pusher 19.

Figure 26:
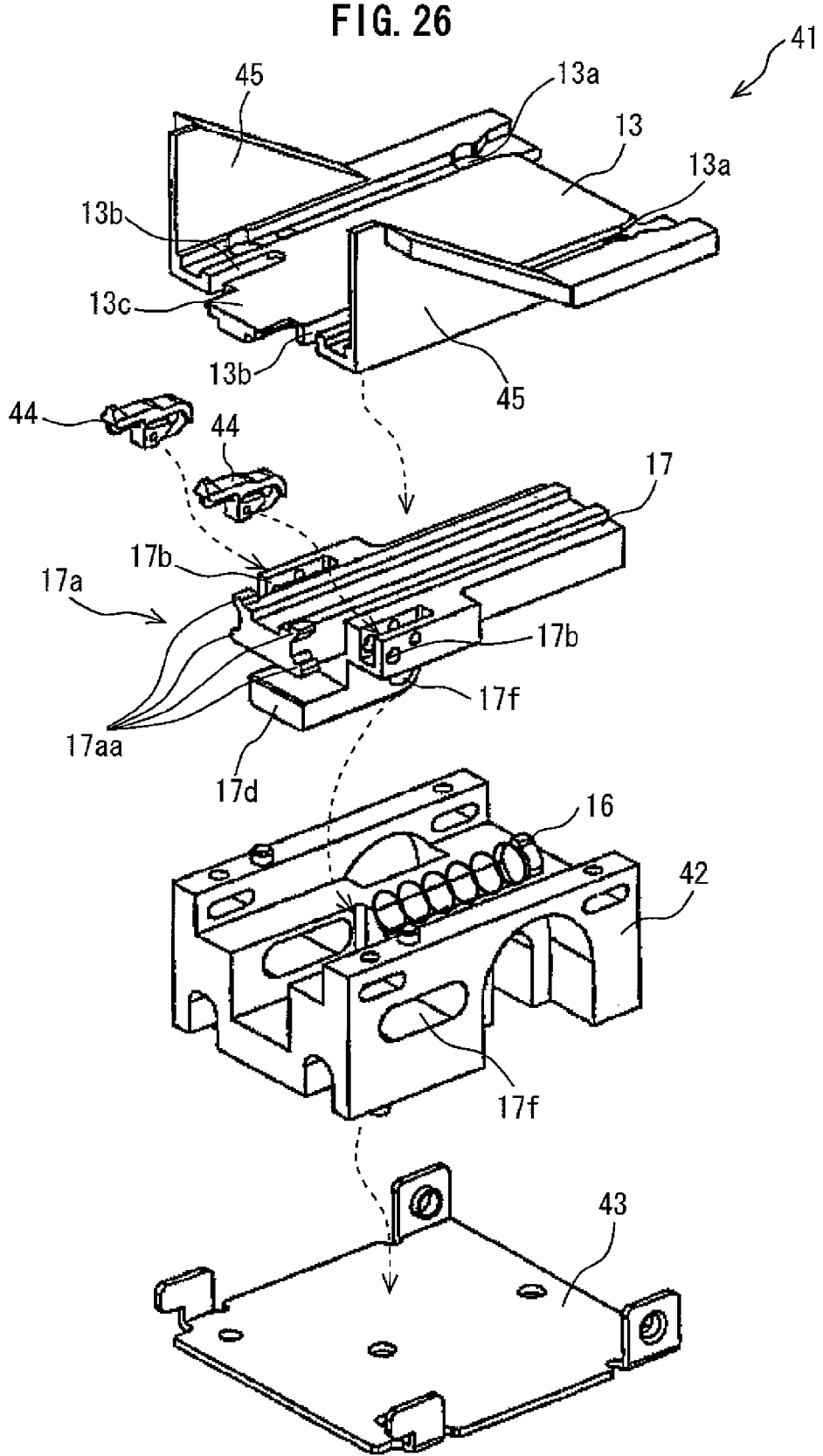
FIG. 26 is an explanatory diagram showing a constitution example of the staple feeding unit.

First, it will be explained with respect to a constitution of the staple feeding unit. FIG. 26 is an exploded perspective view of the staple feeding unit for showing a constitution thereof. As shown in FIG. 15A and FIG. 15B, the staple feeding unit is constituted by including the feeding path portion 41, the pusher 17, the pusher spring 16, the pusher holder 42 and the feeding path installation table 43.

The feeding path portion 41 has a flat plate shaped feeding path 13 which has the width in response to the width of a longitudinal direction of each staple 2 of the interlinked staples 1. Also, at both the edge portions of the feeding path 13, feeding path grooves 13*a* are provided at positions in response to the adhesion portions 31 provided on the rear surface of the staple 2. Further, at the front edge portion of the feeding path 13, feeding claw grooves 13*b* are provided for protruding feeding claws 44 attached to the pusher 17 mentioned later on the feeding path 13. Also, at the front edge portion of the feeding path 13, a receiving table portion 13*c* onto which a staple shaping unit 15*a* of the forming plate 15 mentioned later is fitted is provided.

Further, the feeding path portion 41 is provided with triangle shaped side plates 45 at both the edges of the front portion of the feeding path 13. In each of these side plates 45, as shown in FIG. 24B, a screw coil spring 56 is positioned in a state in which the staple feeding unit, the staple cutoff shaping unit and the staple passing-through unit are assembled.

Figure 27:
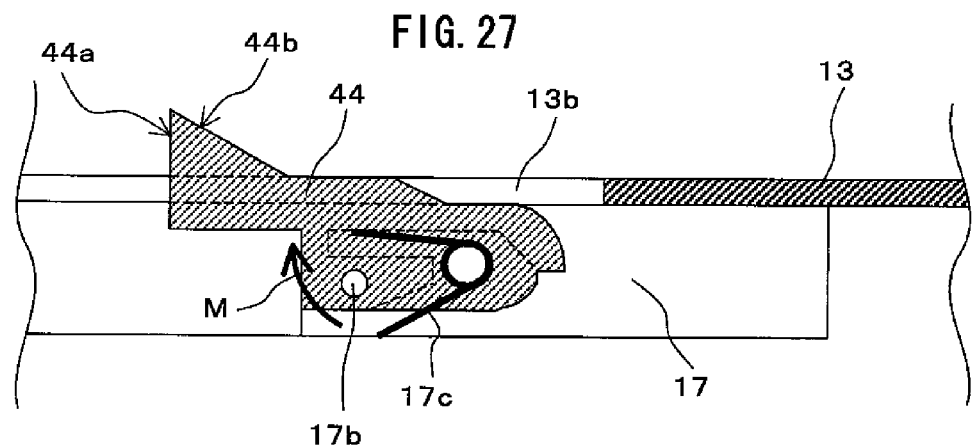
FIG. 27 is a cross-sectional view of a main portion of a feeding path portion-pusher.

FIG. 27 is a cross-section view of a main portion of the feeding path portion 41 and the pusher 17. The pusher 17 is positioned at a lower portion of the feeding path portion 41 in a state in which the stapler 3 is assembled. The pusher 17 is provided, at front edge portion thereof, with a staple pushing unit 17*a* having protrusion portions 17*aa* at its four corners. Also, the pusher 17 is provided with the feeding claws 44, which are mounted rotatably on feeding claw rotating shafts 17*b*, at the positions in response to the feeding claw grooves 13*b* of the feeding path portion 41.

As shown in FIG. 27, each of the feeding claws 44 is biased in the direction shown by an arrow M by a feeding claw spring 17*c*. Also, a protrusion portion of each of the feeding claws 44 protruding from the feeding path 13 has a front surface that is formed vertically as an engaging slope surface 44*a* and a rear surface that is formed obliquely as a disengagement slope surface 44*b*. Also, as shown in FIG. 26 the pusher 17 is provided with an L-shaped arm 17*d* which is formed in an L-shape at a lower portion thereof and a pusher shaft hole 17*e*.

The pusher holder 42 has a rectangular body shape which retains the feeding path portion 41 and the pusher 17. The pusher holder 42 includes a pusher shaft long hole 17*f* of a long hole shape at a position corresponding to the pusher shaft hole 17*e* of the pusher 17 which is placed. By inserting a pusher shaft 58, which is not shown, into the pusher shaft hole 17*e* of the pusher 17 and the pusher shaft long hole 17*f* of the pusher holder 42, the pusher 17 becomes slidable in the forward and backward directions by predetermined amounts with respect to the pusher holder 42. Also, the pusher holder 42 is provided with the pusher spring 16 for biasing a rear portion of the L-shaped arm 17*d* of the pusher 17 forward. The pusher holder 42 which retains the feeding path portion 41 and the pusher 17 is attached to frame 8 through the feeding unit installation table 43.

Figure 28A:
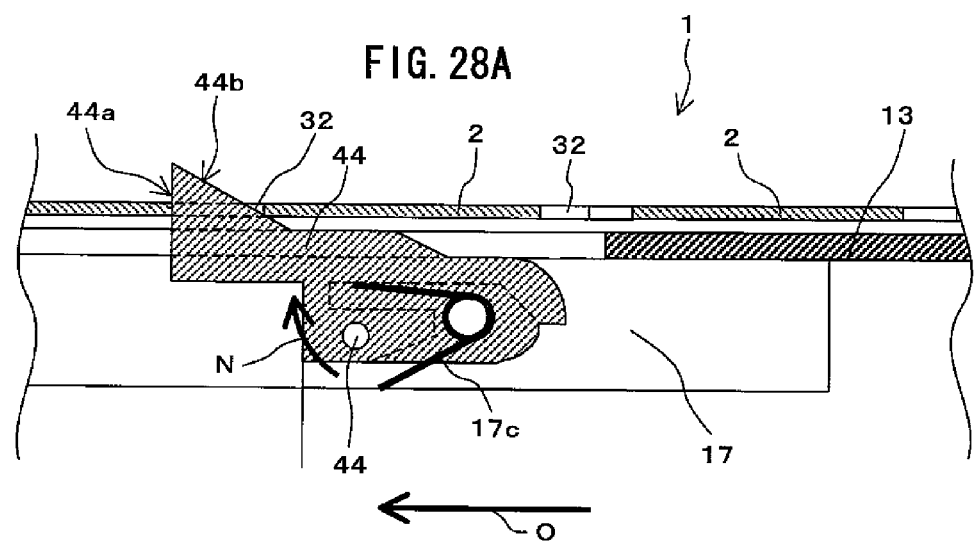
FIG. 28A is an explanatory diagram showing a feeding method of a staple.
Figure 28B:
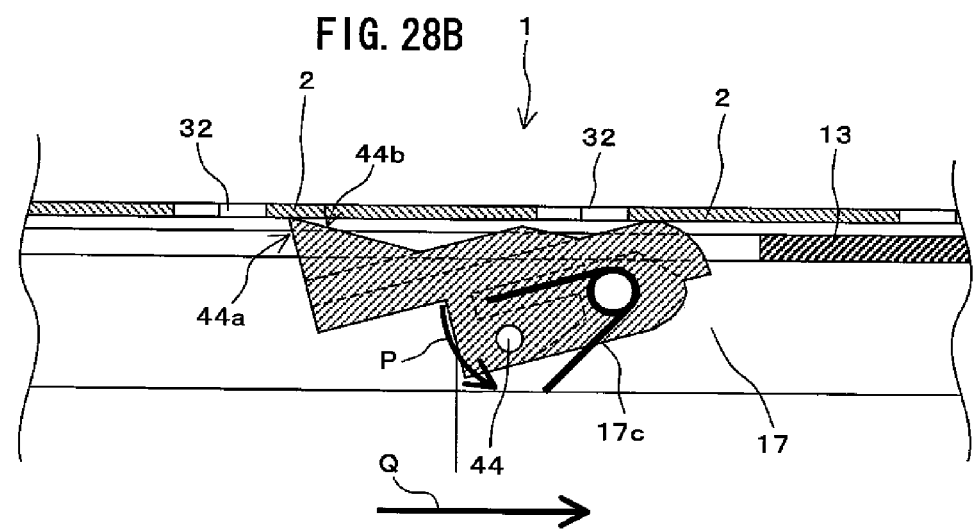
FIG. 28B is an explanatory diagram showing the feeding method of the staple.

Here, it will be explained with respect to a feeding method of the interlinked staples 1 on the feeding path 13 by means of the feeding claws 44 attached to the pusher 17. FIG. 28A and FIG. 28B are explanatory diagrams of the feeding method of the interlinked staples 1 by means of the feeding claws 44 attached to the pusher 17. FIG. 28A shows a state in which the feeding claws 44 attached to the pusher 17 move forward, and FIG. 28B shows a state in which the feeding claws 44 attached to the pusher 17 move backward.

As shown in FIG. 28A, when the pusher 17 moves forward, the interlinked staples 1 move forward on the feeding path 13 by engaging a protrusion portion of the feeding claw 44 which is biased in an arrow N direction with the feeding hole 32 of the interlinked staples 1 at the engaging slope surface 44*a* which is positioned on the front side. Also, as shown in FIG. 28B, when the pusher 17 moves backward, a protrusion portion of the feeding claw 44 becomes disengagement from the feeding hole 32 of the interlinked staples 1 by the disengagement slope surface 44*b* which is positioned on the back side, and the feeding claws 44 rotate as shown by an arrow P so that they move backward.

Figure 29A:
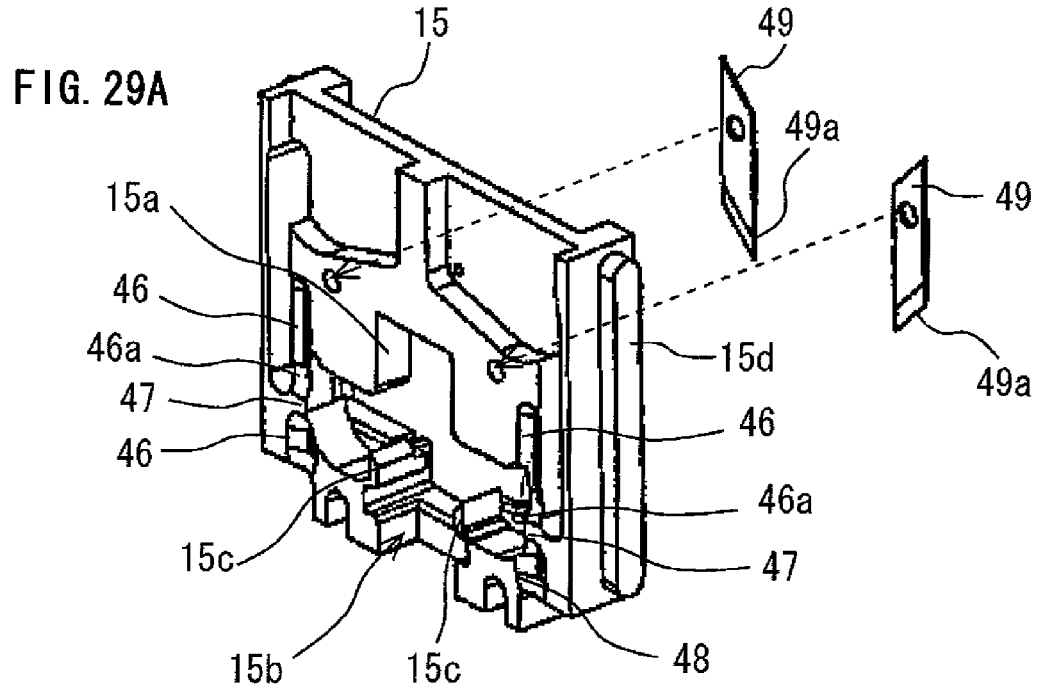
FIG. 29A is an explanatory diagram showing a constitution example of a forming plate.
Figure 29B:
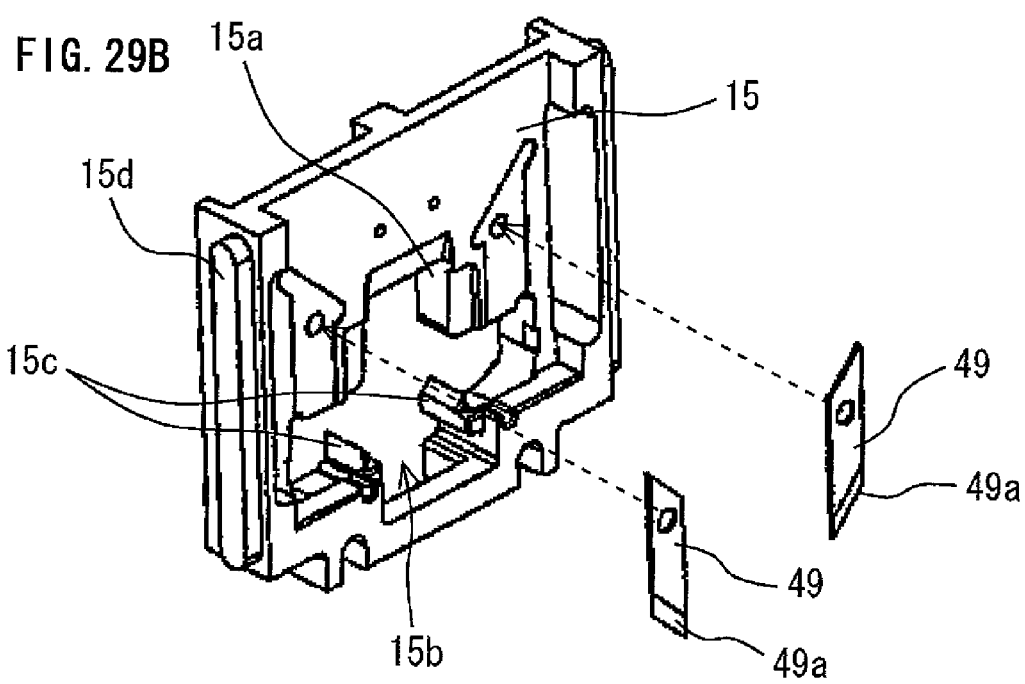
FIG. 29B is an explanatory diagram showing a constitution example of the forming plate.
Figure 29C:
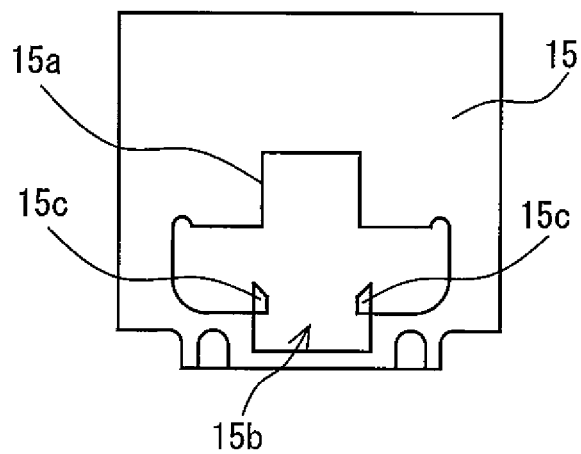
FIG. 29C is an explanatory diagram showing a constitution example of the forming plate.

Next, it will be explained with respect to a constitution example of the forming plate 15 constituting a staple shaping cutoff unit. FIG. 29A, FIG. 29B and FIG. 29C are explanatory diagrams showing a constitution of the forming plate 15. FIG. 29A is a perspective view thereof showing a state seen obliquely from the front, and FIG. 29B is a perspective view thereof showing a state seen obliquely from the diagonal back. FIG. 29C is a front view of the forming plate 15, and shows a state in which a part of a constitution is simplified.

As shown in FIG. 29A, FIG. 29B and FIG. 29C, the forming plate has an opening portion at the center thereof, and has a plate-formed shape having a predetermined thickness. At an upper portion of the opening portion, there is provided with the staple shaping unit 15*a* having a shape whose lower portion is opened, which is fitted into the receiving table portion 13*c* of the feeding path portion 41, which has been mentioned above. A lower portion of the staple shaping unit 15*a* is opened with a predetermined width which is wider than that of the staple shaping unit 15*a*. Also, at a lower portion of the opening portion, there is provided with a staple pushing unit insertion portion 15*b* into which the staple pushing units 17*a* of the pusher 17 mentioned above are inserted.

Further, in the opening portion of the forming plate 15, there is provided with protrusion shaped spread-retainers 15*c* which are formed such that their slope surfaces are faced to each other toward the upper side from both the edges of the staple pushing unit insertion portion 15*b*.

Also, the forming plate 15 is provided with groove portions at the right and the left of the opening portion of the front surface side (side on which the driver 18 is located). As the groove portions, as shown in FIG. 25 and FIG. 29A, first, there is provided with a V-groove 46 which is formed for a predetermined length vertically by a predetermined depth. A lower edge portion 46*a* of the V-groove 46 is formed deeply as compared with the other portion. At the lower side thereof sandwiching a flat portion 47 of a predetermined length from the V-groove 46 there is provided with a V-groove 48 having the same depth as that of the lower edge portion 46*a* of the V-groove 46.

Further, on the forming plate 15, at a rear surface side thereof (side on which the staple feeding unit is located), two cutting blades 49 are attached. The respective cutting blades 49 are attached on the forming plate 15 in a state in which the respective blade edges 49*a* are faced to the outside obliquely and at the same time, in a state in which the blade edges are protruded in the opening portion by predetermined amounts.

Further, the forming plate 15 is provided with convex portions 15*d* at the right thereof and the left thereof, which are fitted into side grooves 50 of the frame 8 shown in FIG. 21. Thus, the forming plate 15 can be slid upward and downward with respect to the frame 8.

Figure 30A:
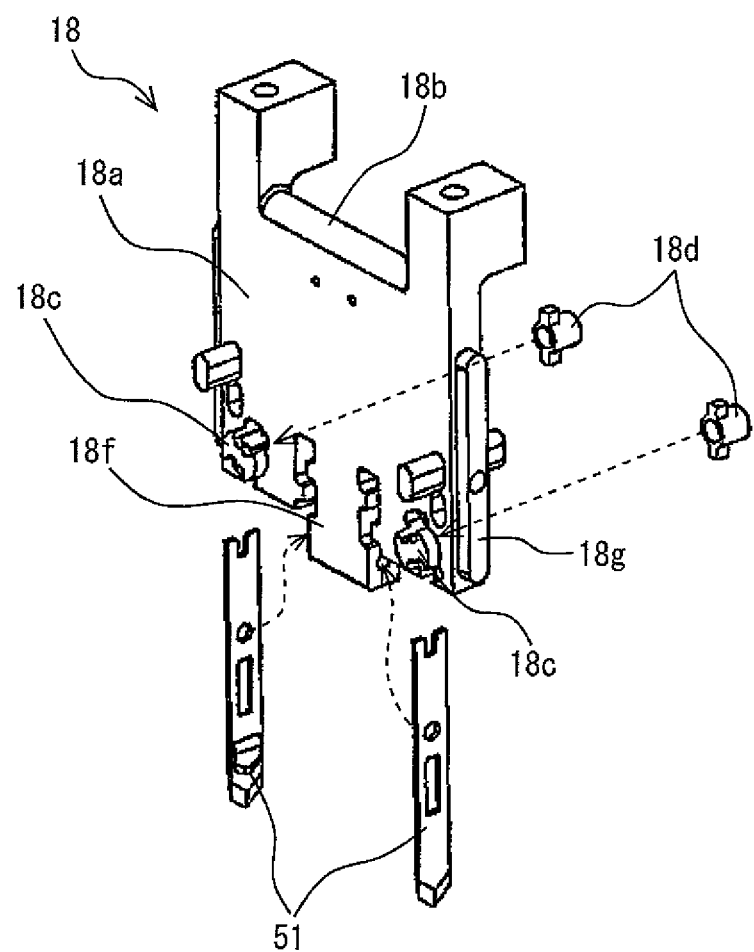
FIG. 30A is an explanatory diagram showing a constitution example of a driver.
Figure 30B:
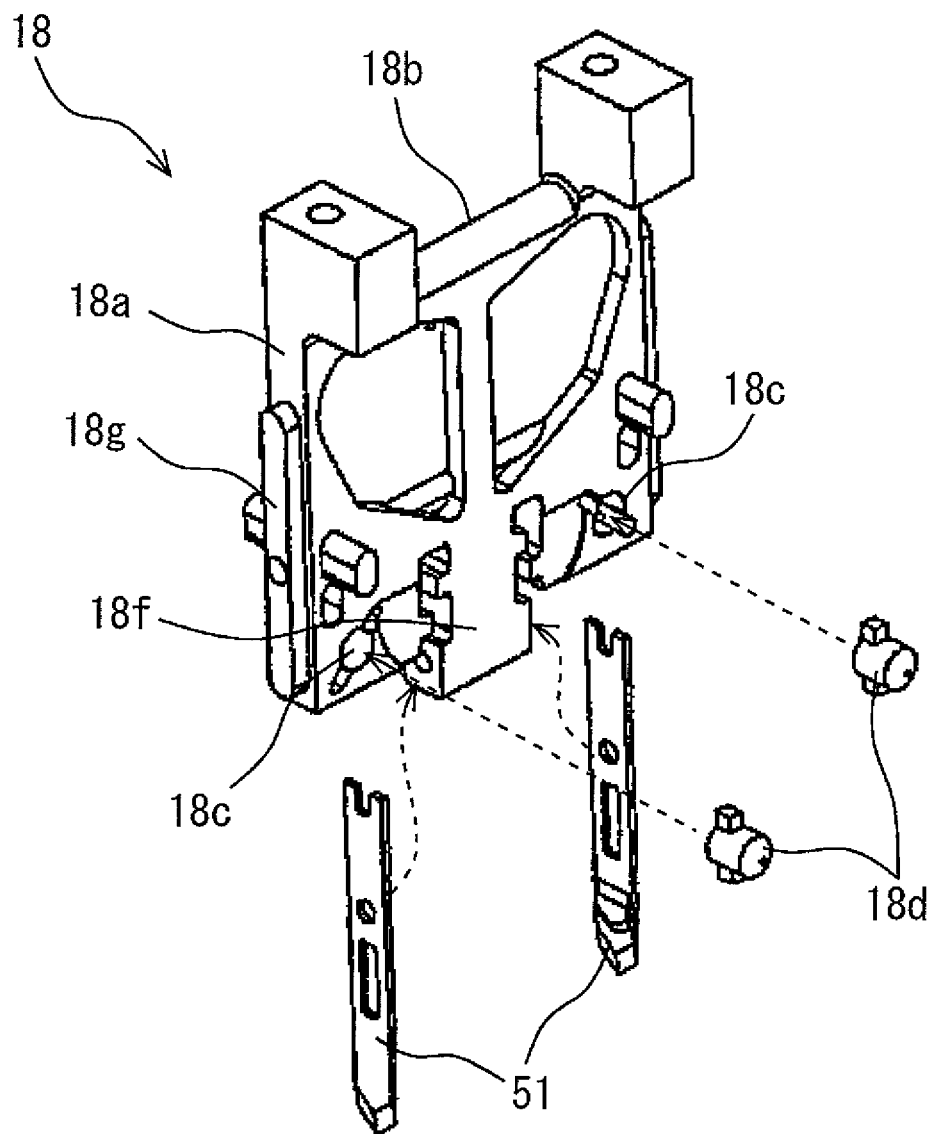
FIG. 30B is an explanatory diagram showing a constitution example of the driver.
Figure 31:
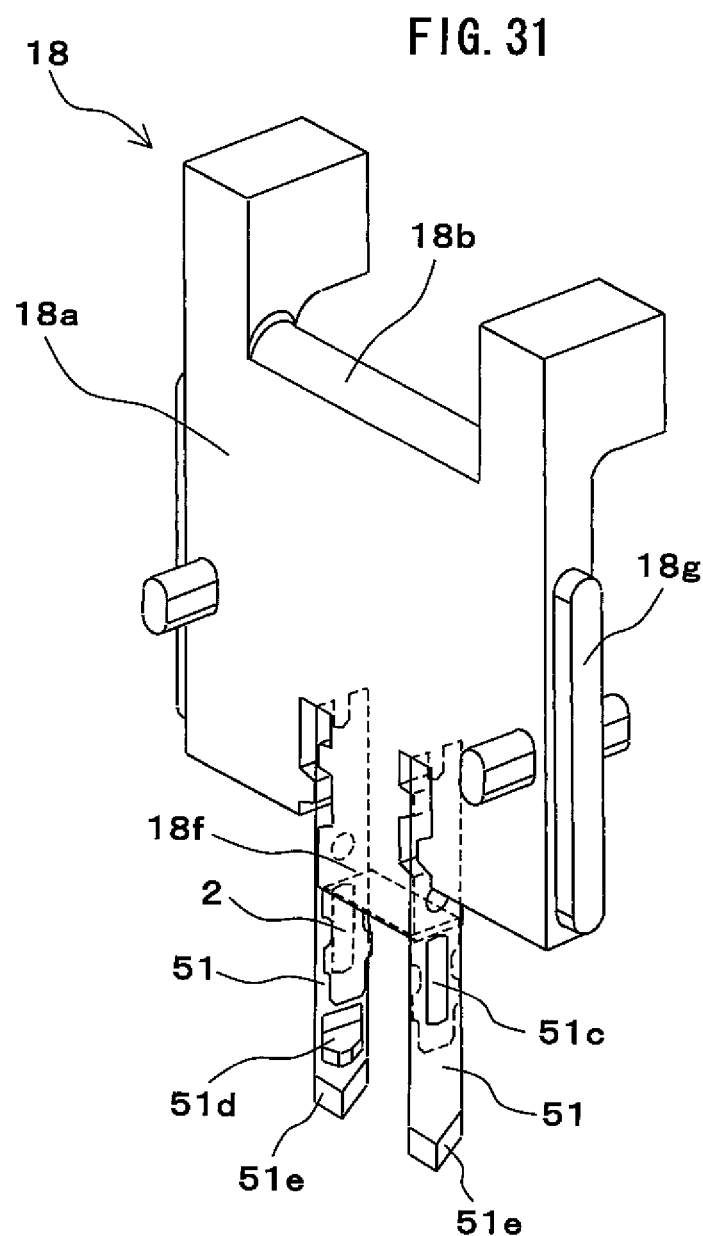
FIG. 31 is an explanatory diagram showing a constitution example of the driver.

Next, it will be explained with respect to a constitution example of the driver 18 constituting the staple passing-through unit. FIG. 30A is an exploded perspective view thereof showing a state in which the driver 18 is seen obliquely from the front, and FIG. 30B is an exploded perspective view thereof showing a state in which the driver 18 is seen obliquely from the back-side. FIG. 31 is a perspective view thereof showing a state in which punching blades 51 are attached to a main body portion thereof and the staple 2 of a shape in which both the edges are bent to one direction is positioned inside the punching blades 51.

The driver 18 is provided with a plate shaped driver main body portion 18*a* having a predetermined thickness, protrusion pins 18*d* and two pieces of the punching blades 51. The driver main body portion 18*a* is provided, at an upper edge portion thereof, with a driver pusher contact unit 18*b* onto which a driver pusher 66 provided on the rear surface of the handle 5 shown in FIG. 20 abuts.

Also, in the driver main body portion 18*a*, in the vicinity of the lower edge portion there, the protrusion pins 18*d* are attached to protrusion pin mounting units 18*c* of the vicinity of both the edge portions of the right and the left thereof. As shown in FIG. 25, each protrusion pin 18*d* is formed so that a tip portion thereof is a conical shape and an inside portion thereof is a hollow and is attached to the driver 18 in a state of having a protrusion pin spring 18*e* which is a compressed spring in the inside portion. Thus, the protrusion pins 18*d* are slidable in the forward and backward directions as shown by an arrow of FIG. 25 and at the same time, are attached to the driver main body portion 18*a* with them being biased in the rear surface direction (direction on which the forming plate 15 is located).

Also, the conical shaped portion of the tip portion of the protrusion pin 18*d* has a shape in response to the V-groove 46 and the V-groove 48 which are provided at the forming plate 15. Further, when the protrusion pin 18*d* stays in the V-groove 46, a portion of the conical shaped portion of the protrusion pin 18*d* becomes in a state of being positioned in the groove, and when the protrusion pin 18*d* stays in the lower edge portion 46*a* of the V-groove 46 and the V-groove 48 the protrusion pin 18*d*, the V-groove 46 and the V-groove 48 have shapes which become in a state in which all of the conical shaped portion of the protrusion pin 18*d* is positioned in the groove.

Figure 32A:
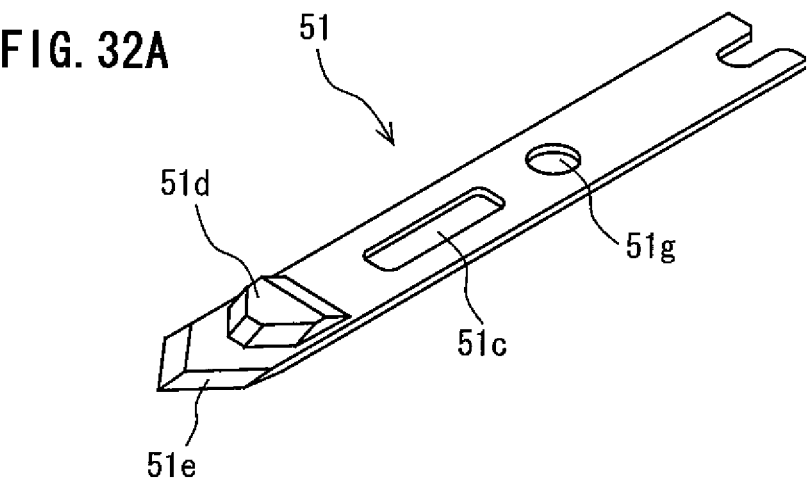
FIG. 32A is an explanatory diagram showing a constitution example of a first punching blade and a shape of a punch hole.
Figure 32B:
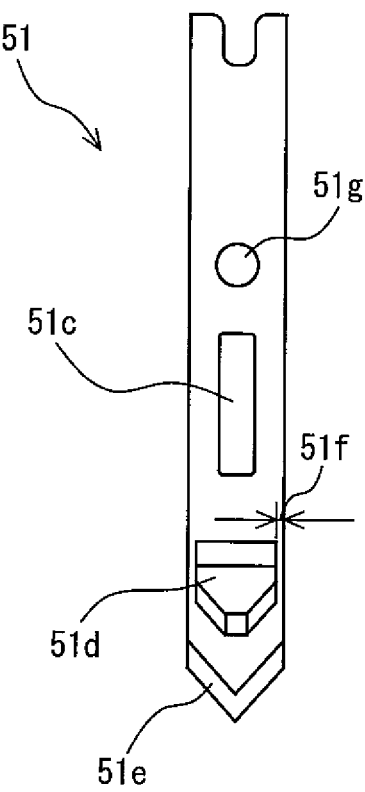
FIG. 32B is an explanatory diagram showing a constitution example of the first punching blade and the shape of the punch hole.
Figure 32C:
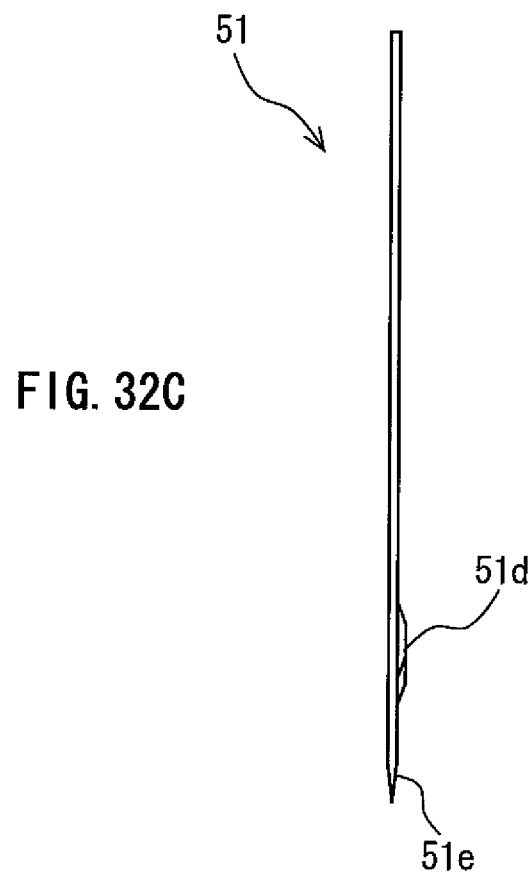
FIG. 32C is an explanatory diagram showing a constitution example of the first punching blade and the shape of the punch hole.

Also, the driver main body portion 18*a* is provided with a staple push down unit 18*f* of a rectangular body, which is protruded by predetermined amounts at the center of the lower edge portion thereof. To the right and the left of the staple push down unit 18*f*, the punching blades 51 are attached respectively, as shown in FIG. 31. Here, it will be explained with respect to a constitution of each punching blade 51. FIG. 32A, FIG. 32B and FIG. 32C are explanatory diagrams showing a constitution of the punching blade 51. FIG. 32A is a perspective view of the punching blade 51, FIG. 32B is a side view of the punching blade 51 and FIG. 32C is a front view of the punching blade 51.

As shown in FIG. 32A, FIG. 32 and FIG. 32C, the punching blade 51 has a predetermined length, and is provided with a blade edge 51*e* at one edge portion thereof. Also, the punching blade 51 is provided, in the vicinity of the edge portion where the blade edge 51*e* is provided, with a protrusion portion 51*d* which has at least a slope surface on a side of the blade edge 51*e* and which is protruded by predetermined amounts. Here, the protrusion portion 51*d* is not formed by the full width of the punching blade 51, and the punching blade 51, as shown in FIG. 32B, has a linear portion 51*f* which becomes continuous from one edge portion to the other edge portion in a longitudinal direction thereof. Consequently, it has a predetermined strength for the bend with respect to the right and left directions of a state shown in FIG. 32C. Also, the protrusion portion 51*d* can be inexpensively formed by a press process as compared with a case of a mold process.

Figure 32D:
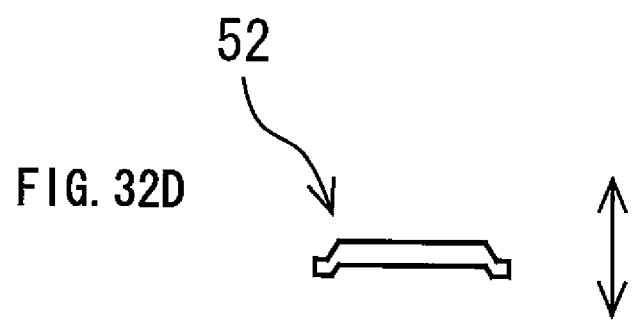
FIG. 32D is an explanatory diagram showing a constitution example of the first punching blade and the shape of the punch hole.

Further, the punching blade 51 is provided with a predetermined shaped push-out hole 51*c* at the center portion thereof, and is provided with a mounting hole 51*g* for allowing it to be mounted on the staple push down unit 18*f* of the driver main body portion 18*a* on the upper side of the push-out hole 51*c*. A notch opening 52 with a shape as shown in FIG. 32D is formed by passing the punching blade 51 including such a constitution through the binding sheets.

Back to FIG. 30A, FIG. 30B and FIG. 31, the driver main body portion 18*a* is provided with convex portions 18*g* at the right and the left, which are fitted into the side grooves 53 of the frame 8 shown in FIG. 21. Thus, the driver main body portion 18*a* can be slid upward and downward with respect to the frame 8.

Figure 33A:
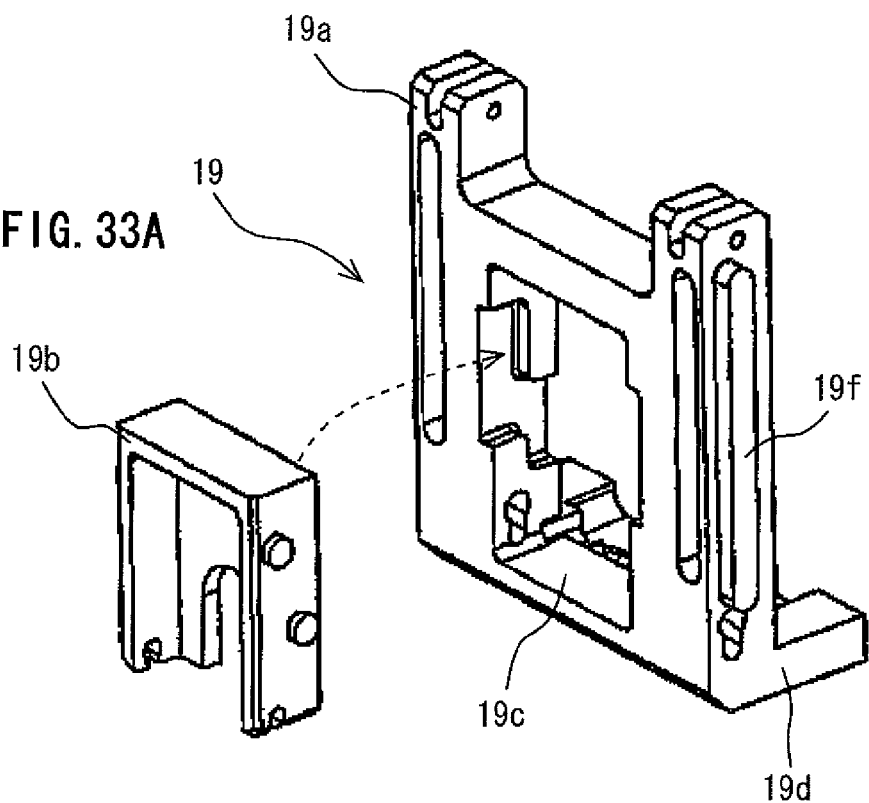
FIG. 33A is an explanatory diagram showing a constitution example of a paper-sheet pusher.
Figure 33B:
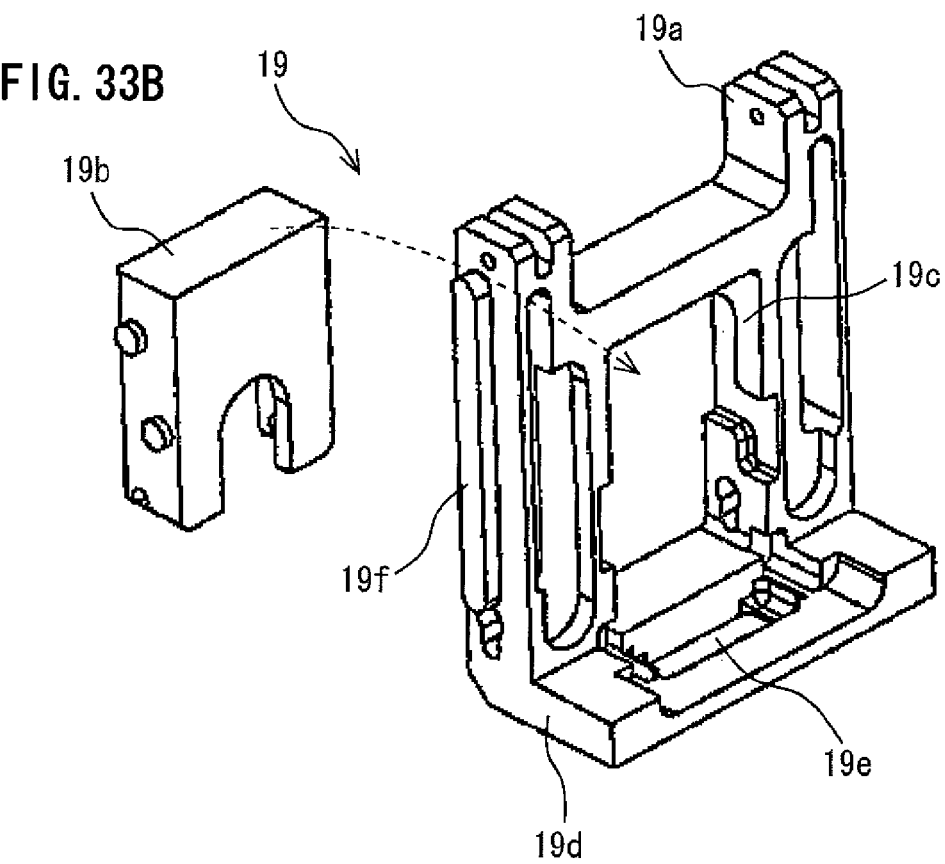
FIG. 33B is an explanatory diagram showing a constitution example of the paper-sheet pusher.

Next, it will be explained with respect to a constitution of the paper-sheet pusher 19 which hold down the binding sheets with respect to the table 20 when the staple 2 is passed through the binding sheets by the staple passing-through unit and both the leg portions of the staple 2 are bent and bonded by the staple bending unit mentioned later. FIG. 33A and FIG. 33B are explanatory diagrams showing a constitution of the paper-sheet pusher 19. FIG. 33A is an exploded perspective view thereof showing a state in which the paper-sheet pusher 19 is seen obliquely from the front and FIG. 33B is an exploded perspective view thereof showing a state in which the paper-sheet pusher 19 is seen obliquely from the back-side.

As shown in FIG. 33A and FIG. 33B, the paper-sheet pusher 19 is provided with a cross-section L-shaped paper-sheet pusher main body portion 19*a* having a predetermined thickness and a square window 19*b*. The paper-sheet pusher main body portion 19*a* is provided with a square window hole 19*c* on which the square window 19*b* is attached open-close freely, at the center portion thereof. Also, the paper-sheet pusher main body portion 19*a* is provided with a paper-sheet pusher unit 19*d* at a lower edge portion thereof, and is also provided with a staple binding hole 19*e* which is used when the staple is passed through by the staple penetration unit in the center of the paper-sheet pusher unit 19*d*.

Further, the paper-sheet pusher main body portion 19*a* is provided with convex portions 19*f* at the right and the left, which are fitted into side grooves 54 of the frame 8 shown in FIG. 17 and FIG. 21. Thus, the paper-sheet pusher main body portion 19*a* can be slid upward and downward with respect to the frame 8.

Next, it will be explained with respect to a constitution of a support in the up and down directions of the forming plate 15, the driver 18 and the paper-sheet pusher 19. As mentioned above, the forming plate 15 has the convex portions 15*d* at the side portions thereof, the driver main body portion 18*a* has the convex portions 18*g* at the side portions thereof and the paper-sheet pusher main body portion 19*a* has the convex portions 19*f* at the side portions thereof. These convex portions are respectively fit into the side grooves 50, the side grooves 53 and the side grooves 54 of the frame 8 and slid, so that the forming plate 15, the driver 18 and the paper-sheet pusher 19 become movable in the up and down directions at respective predetermined positions.

First, as shown in FIG. 25, in a stand-by state, the forming plate 15 becomes in a state in which the lower edge portion 15*d* is put on an upper portion of the L-shaped arm 17*d* of the pusher 17. Also, as shown in FIG. 20 or the like, the paper-sheet pusher 19 is attached to the frame 8 by a tension spring 55, and becomes in a state of being pulled upward. An upper dead point of the paper-sheet pusher 19 in a stand-by state is fixed by the side grooves 54 of the frame 8 and the convex portions 19*f* of the paper-sheet pusher main body portion 19*a*.

Also, as shown in FIG. 24B, the screw coil spring 56 is provided between the paper-sheet pusher main body portion 19*a* and the driver main body portion 18*a*, biases the paper-sheet pusher main body portion 19*a* downward, and concurrently biases the driver main body portion 18*a* upward. More specifically, in a stand-by state, the driver main body portion 18*a* is biased upward with respect to the frame 8, and an upper dead point of the driver main body portion 18*a* is fixed by the side grooves 53 of the frame 8 and the convex portions 18*g* of the driver main body portion 18*a*.

Also, as shown in FIG. 18, the driver main body portion 18*a* is rotatably attached to links 57 at the side portions. The links 57 are engaged with the pusher shaft 58 at the long holes 57*a*, and is engaged with a shaft 59Z at long holes 57*b*. Here, the links 57 rotate in the direction shown by an arrow i by pushing down the handle 5 and by descending the driver main body portion 18*a*, and the pusher shaft 58 is moved in the direction shown by an arrow j therein along the long holes 57*a*.

Consequently, the pusher 17 shown in FIG. 20 or the like is moved back, the lower edge portion 15*d* of the forming plate 15 is disengaged from an upper portion of the L-shaped arm 17*d* of the pusher 17 so that the forming plate 15 can descend.

Also, at the side grooves 54 of the frame 8, the side grooves 53 and the side grooves 50, there is provided with collar portions which are hemmed by a resin or the like in order to improve slidability for the convex portions 19*f*, the convex portions 18*g* and the convex portions 15*d*.

Next, it will be explained with respect to a constitution example of the staple cover 6 and a reverse stopper spring 59 provided at the staple cover 6 as a staple pusher unit. FIG. 34A and FIG. 34B are explanatory diagrams showing a constitution of the staple pusher unit. FIG. 34A is a plan view thereof showing a state in which the interlinked staples 1 is held down by the reverse stopper spring 59, and FIG. 34B is a side view thereof showing a state in which the interlinked staples 1 is held down by the reverse stopper spring 59.

As shown in FIG. 22, the stapler 3 is provided with the staple cover 6 which is mounted at a rear edge portion of an upper end of the frame 8 rotatably on the handle & staple cover rotating shaft 10. The staple cover 6 includes a width in response to the width of the frame and as shown in FIG. 20, is held down by the plate spring 14 in a state in which the interlinked staples 1 on the feeding path 13 is held down.

Also, at a mounting portion to the handle & staple cover rotating shaft 10 and an edge portion of the reverse side of the staple cover 6, there is provided with the reverse stopper spring 59 which is one example of a pusher piece. The reverse stopper spring 59 is a thin plate shaped metal having elasticity, and is constituted by including a first reverse stopper spring 59*a* positioned at the center and second reverse stopper springs 59*b* positioned at the right and the left of the first reverse stopper spring 59*a*.

Here, the first reverse stopper spring 59*a* has a length longer than that of each of the second reverse stopper springs 59*b*, and a edge portion thereof holds the staple 2A positioned at the lower side of the forming plate 15 which is the staple cutoff shaping unit, which has been mentioned above, in a state in which the staple cover 6 is held down by the plate spring 14 as shown by R of FIG. 34A and T of FIG. 34B. Also, the second reverse stopper springs 59*b* hold the staple 2B positioned next on the staple loading unit side of the staple 2A as shown by S of FIG. 34A and U of FIG. 34B with their edge portions.

Next, it will be explained with respect to cutoff, shaping and feeding methods of a staple 2 which is positioned at the edge portion of interlinked staples 1 by means of a staple cutoff shaping unit by using FIG. 35A to FIG. 35E or the like. FIG. 35A, FIG. 35B, FIG. 35C, FIG. 35D and FIG. 35E are explanatory diagrams with respect to the cutoff, shaping and feeding methods of the staple 2, and show with cross-sectional view in a state in which the interlinked staples 1, the reverse stopper spring 59 and the feeding claw 44 are cut off. In FIG. 35A to FIG. 35E, a staple after having shaped in a shape in which both the edges are bent to one direction is shown by a state of side surface view without cutting off.

Figure 35A:
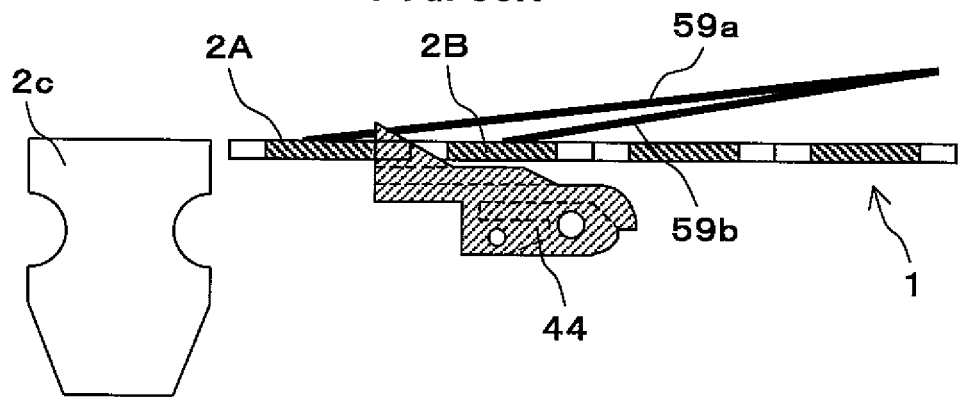
FIG. 35A is an explanatory diagram showing a staple cutoff-shaping-feeding method.

FIG. 35A shows the each staple 2 in a stand-by state of the stapler 3, the reverse stopper spring 59 and the feeding claw 44. A staple 2A is the staple 2 of the edge portion of the interlinked staples 1, which is similar as FIG. 34A and FIG. 34B, and is positioned on the receiving table portion 13*c* under the forming plate 15. A staple 2B is the staple 2 which is positioned next on a side of the staple loading unit of the staple 2A, and a staple 2C is the staple 2 which is shaped into a shape which both edges thereof are bent to one direction and is positioned under the driver 18 as shown in FIG. 20. It should be noted that the staple 2C is not displayed in the figures after FIG. 35B.

Figure 35B:
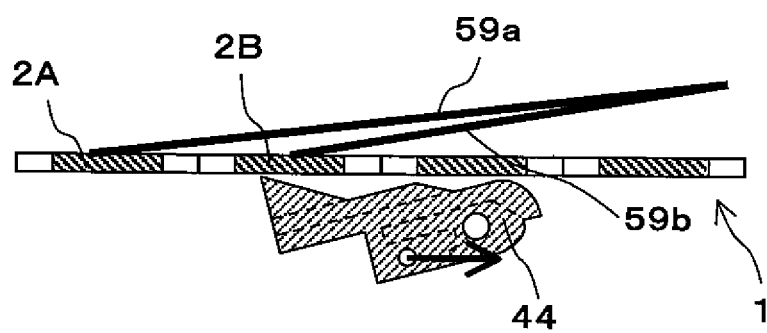
FIG. 35B is an explanatory diagram showing the staple cutoff-shaping-feeding method.
Figure 35C:
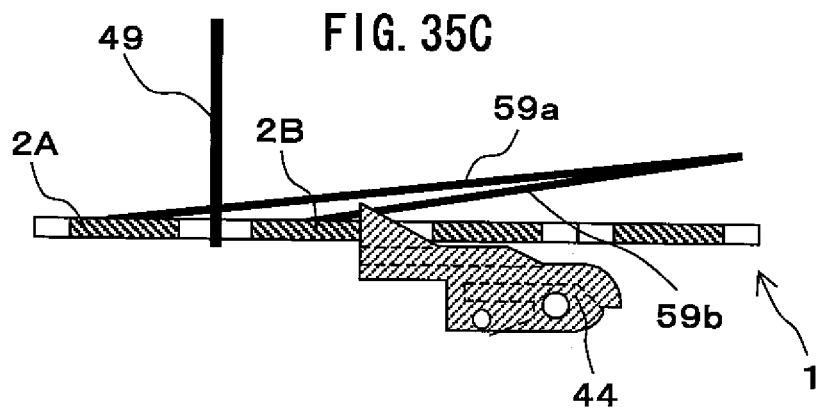
FIG. 35C is an explanatory diagram showing the staple cutoff-shaping-feeding method.
Figure 35D:
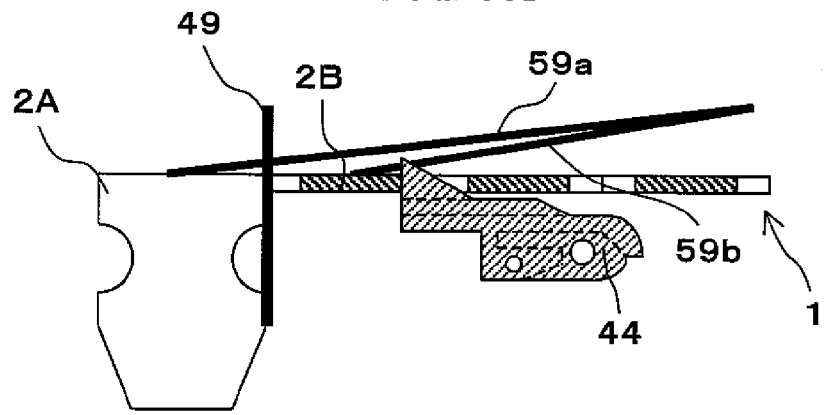
FIG. 35D is an explanatory diagram showing the staple cutoff-shaping-feeding method.
Figure 35E:
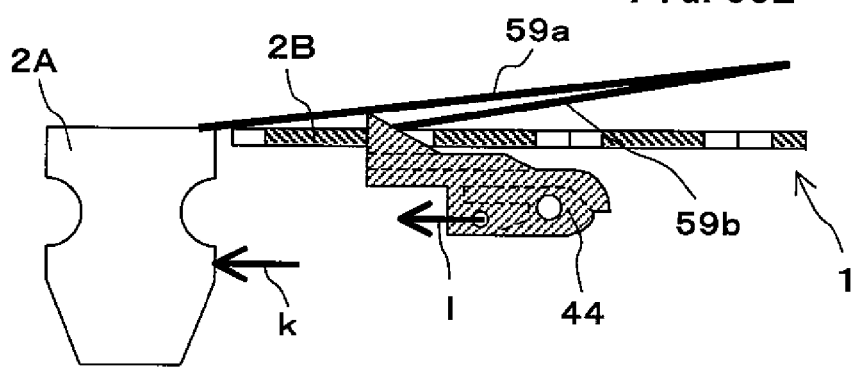
FIG. 35E is an explanatory diagram showing the staple cutoff-shaping-feeding method.

FIG. 35B shows a state in which the feeding claws 44 move downward. FIG. 35C shows a state in which the interlinking portions between the staple 2A and the staple 2B are cut off by the cutting blade 49. FIG. 35D shows a state in which the staple 2A is shaped by the forming plate 15. FIG. 35E shows a state in which the interlinked staples 1 is moved by the feeding claws 44 and at the same time, the staple 2C is moved forward by the staple pushing unit 17*a* of the pusher 17.

By pushing down the handle 5 from a stand-by state of the stapler 3 shown in FIG. 35A, the driver 18 descends, the link 57 rotates and the pusher 17 moves backward. Thus, as shown in FIG. 35B and FIG. 35C, the feeding claws 44 rotate and move backward, engagement units of the feeding claws 44 are disengaged from the feeding holes 32 of the staple loading unit side (right side of FIG. 35A to FIG. 35E) of the staple 2A and becomes in a state being engaged with the feeding holes 32 of the staple loading unit side of the staple 2B.

Figure 36A:
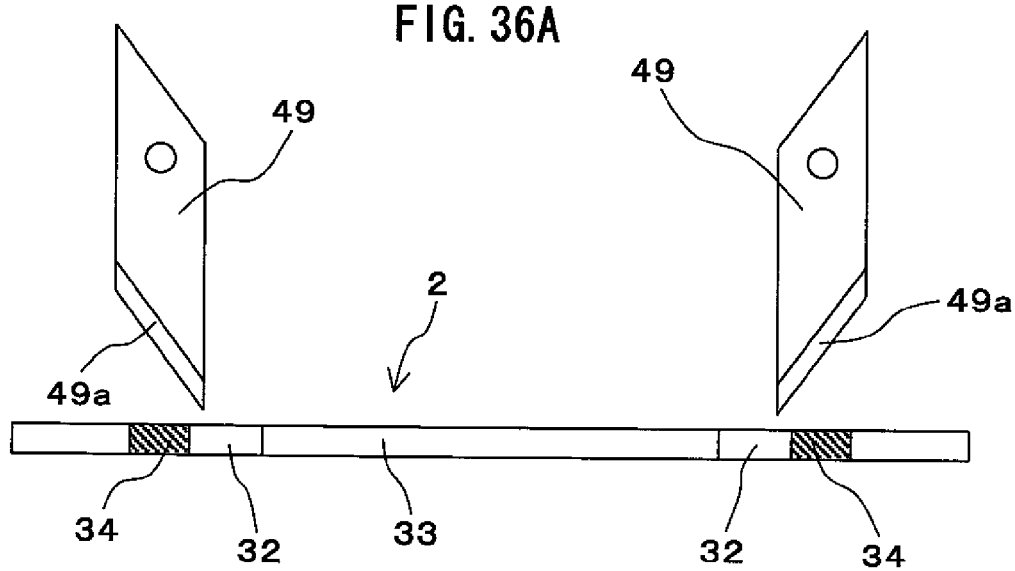
FIG. 36A is an explanatory diagram showing the staple cutoff method.
Figure 36B:
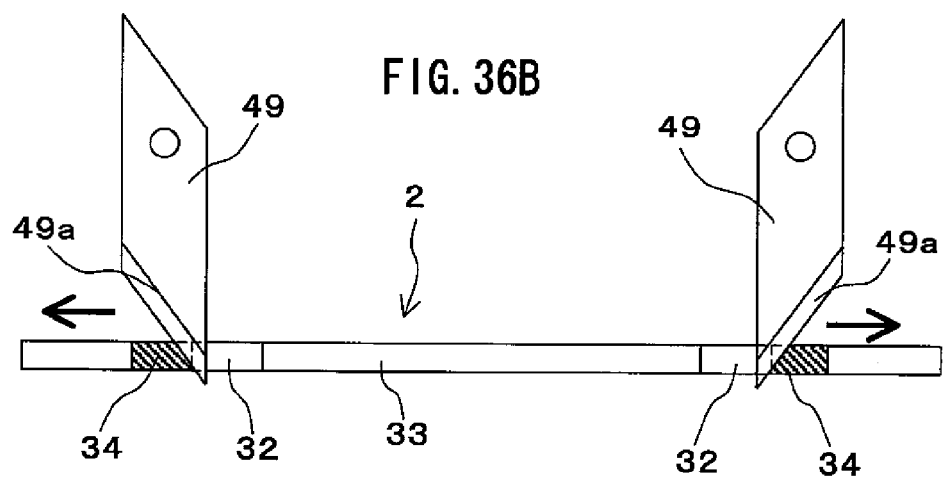
FIG. 36B is an explanatory diagram showing the staple cutoff method.
Figure 36C:
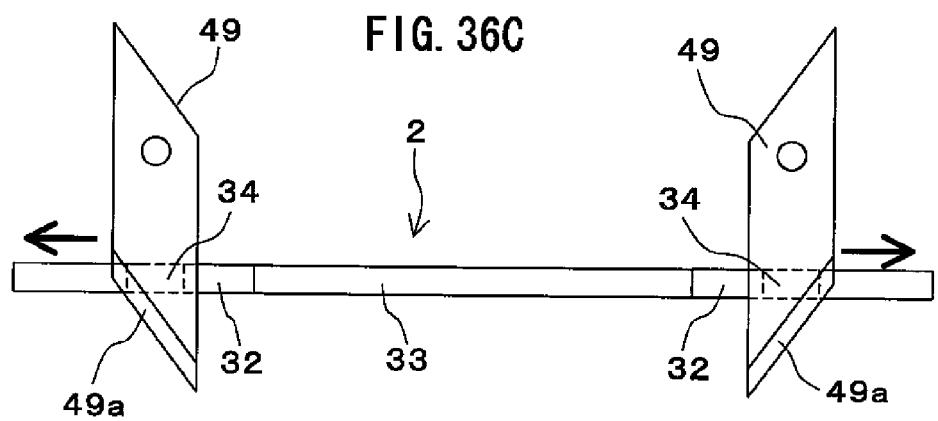
FIG. 36C is an explanatory diagram showing the staple cutoff method.

Also, during the period shown in FIG. 35A to FIG. 35C, the forming plate 15 descends by being pushed down by the driver 18. The details with respect to the push down of the forming plate 15 by the driver 18 will be mentioned later. The interlinking portions between the staple 2A and the staple 2B is cut off by the cutting blades 49 by descending the forming plate 15 including the cutting blades 49 with respect to the interlinked staples 1. FIG. 36A, FIG. 36B and FIG. 36C are explanatory diagrams in which the cutoff of a staple 2 by the cutting blades 49 is shown by time series.

As shown in FIG. 36A to FIG. 36C, the respective staple interlinking portions 34 are cut off by blade edges 49*a* of two cutting blades 49 by descending the two cutting blades 49 with respect to the staple 2. Here, the respective blade edges 49*a* are pushed against in the opposite directions respectively toward the outside from the inside of the staple 2 with respect to the respective staple interlinking portions 34 between the staple 2A and the staple 2B, and the respective staple interlinking portions 34 are cut off. Thus, on an occasion of the cutoff of the respective staple interlinking portions 34, the staple 2A and the staple 2B become in a state that force of the opposite directions by the respective blade edges 49a is simultaneously applied thereto.

Consequently, it is unnecessary for supporting the staple 2A of a cutoff object and the staple 2B adjacent to the staple 2A of the cutoff object in wide range, and it becomes possible to execute the cutoff of the staple 2 stably with a simple constitution by holding down by the reverse stopper spring 59.

The staple interlinking portions 34 of the staple 2A and the staple 2B are cut off in FIG. 36C and thereafter, by descending the forming plate 15 further, shaping to a shape in which both the edges of staple 2A are bent to one direction is executed. FIG. 37A, FIG. 37B, FIG. 37C, FIG. 38A, FIG. 38B and FIG. 38C are explanatory diagrams in which shaping of the staple 2 by a receiving table portion 13c and a forming plate 15 is shown by time series.

As shown in FIG. 37A, FIG. 37B, FIG. 37C and FIG. 38A, with respect to the staple 2 which is placed on the receiving table portion 13c and which is cut off from adjacent staple 2, the forming plate 15 descends and the receiving table portion 13c and the staple shaping unit 15a are fitted. Thus, the staple 2 is shaped in a shape in which both the edges are bent to one direction such that the crown portion 35 and the leg portions 36 which are bent perpendicularly from the crown portion 35 are formed.

Figure 38A:
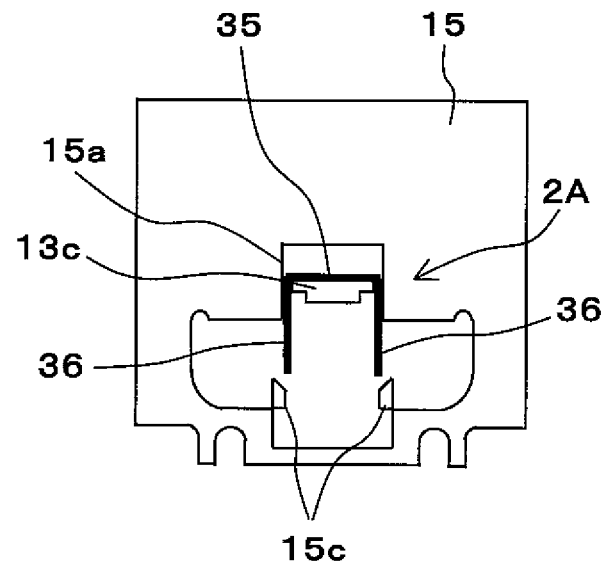
FIG. 38A is an explanatory diagram showing the staple shaping method.
Figure 38B:
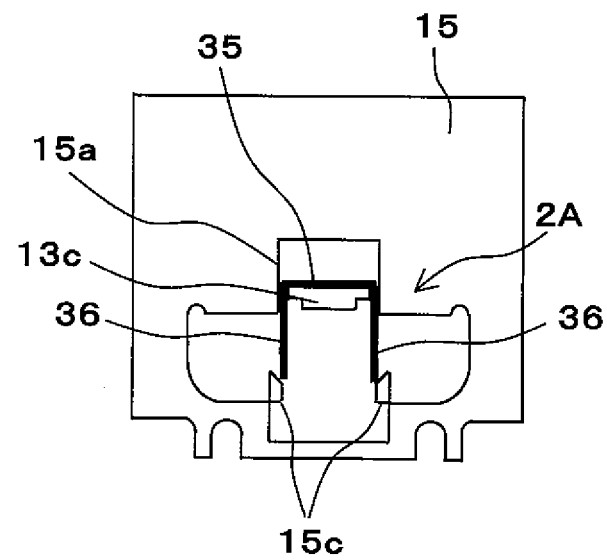
FIG. 38B is an explanatory diagram showing the staple shaping method.
Figure 38C:
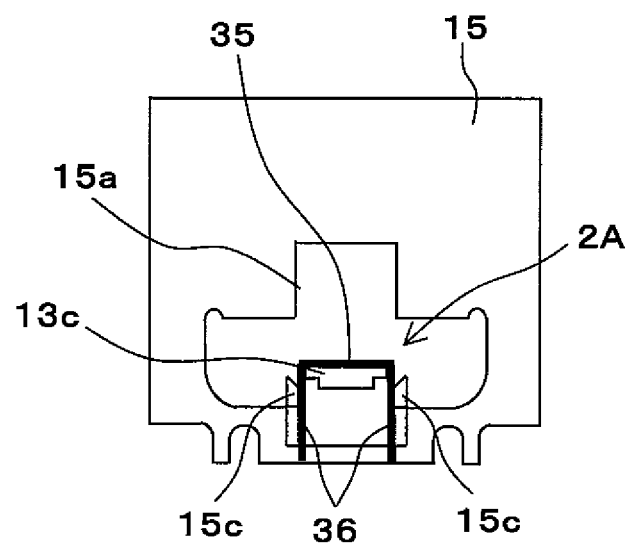
FIG. 38C is an explanatory diagram showing the staple shaping method.

Also, as shown in FIG. 38A, the staple 2 is shaped in the shape in which both the edges are bent to one direction and thereafter, the forming plate 15 also ascends by ascending the driver 18. The details with respect to the ascent of the driver 18 and the forming plate 15 will be mentioned later. Here, as shown in FIG. 38B and FIG. 38C, when the forming plate 15 ascends, both the leg portions 36 of the staple 2 which is shaped in the shape in which both the edges are bent to one direction are held down by the spread-retainers 15c. In this manner, by retaining from the both outsides by the spread-retainers 15c, both the leg portions 36 of the staple 2 are prevented from being opened by the spring back.

After the forming plate 15 ascends and a state such that both the leg portions 36 of the staple 2 having a shape in which both the edges thereof are bent to one direction by the spread-retainers 15c are retained appears, the driver 18 ascends further, the link 57 rotates and the pusher 17 which is biased by the pusher spring 16 moves forward. Thus, as shown by an arrow l of FIG. 35E, the interlinked staples 1 move forward by the feeding claws 44 and at the same time, as shown by an arrow k, the staple 2A is pushed out forward by the staple pushing unit 17a which is not shown.

The interlinked staples 1 relating to the present invention are fed to the interlinking direction in the inside of the stapler 3 by the feeding claws 44 in which engagement units are engaged with the feeding holes 32. Thus, it becomes possible to be fed in the inside of the stapler 3 accurately.

Figure 39A:
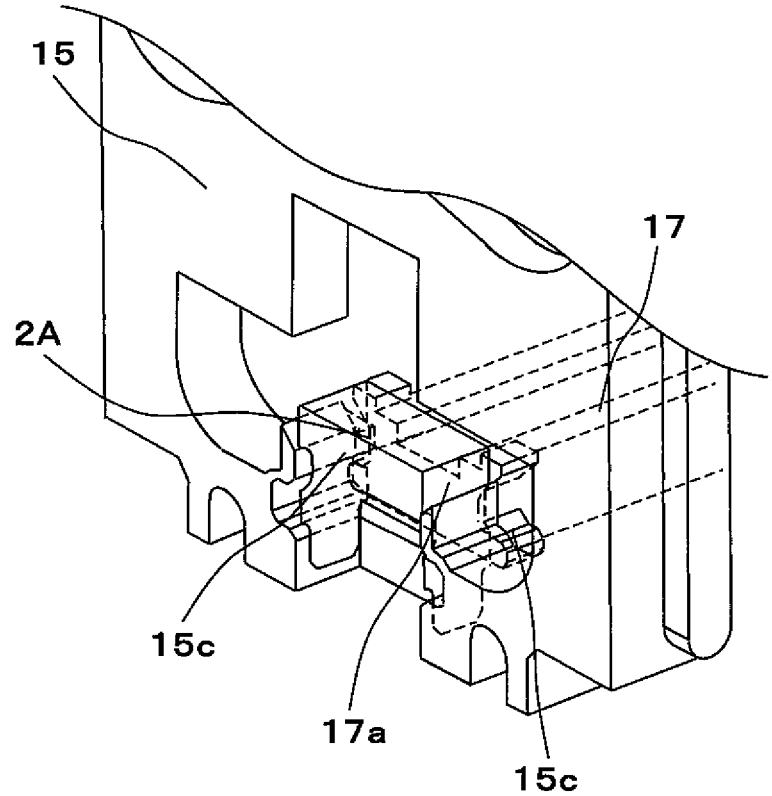
FIG. 39A is an explanatory diagram showing a staple pushing-out method by a pusher.
Figure 39B:
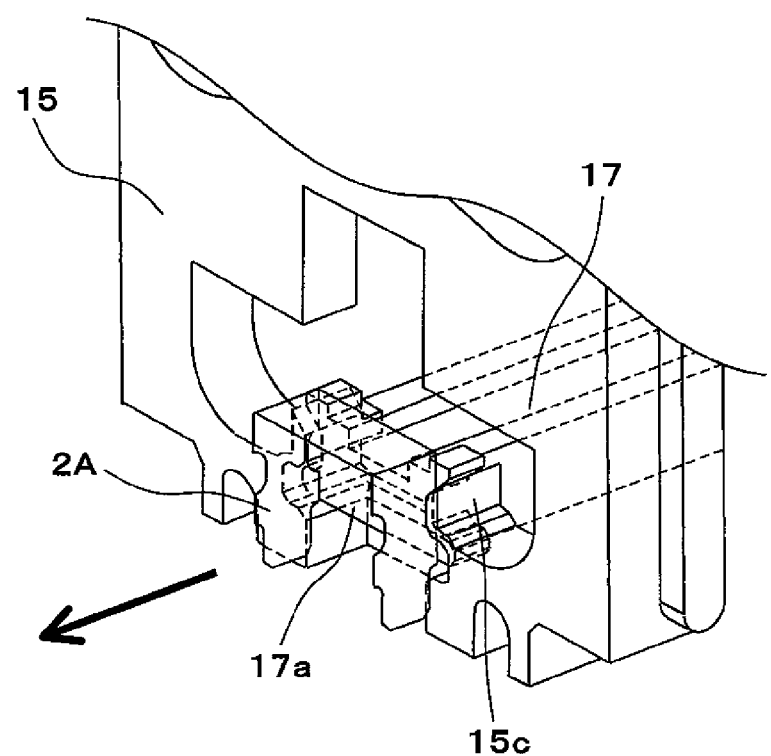
FIG. 39B is an explanatory diagram showing the staple pushing-out method by the pusher.

FIG. 39A and FIG. 39B are explanatory diagrams showing a pushing-out method of the staple 2 by the staple pushing unit 17a by the pusher 17. As shown in FIG. 39A and FIG. 39B, by moving the pusher 17 forward, by the staple pushing unit 17, the staple 2 of a shape in which both the edges are bent to one direction is pushed out between two punching blades of the driver 18 from the forming plate 15. At that time, the push-out of the staple 2 by means of the staple pushing unit 17a is executed by pushing an upper portion and a lower portion of the rear surface side of both the leg portions 36 of the staple 2 by four protrusion portions 17aa which are provided at the staple pushing unit 17a.

(4) Constitution Example of Staple Bending Unit

Next, it will be explained with respect to a constitution example of a staple bending unit which bends both the leg portions 36 of the staple 2 which pass through the binding sheets by a staple passing-through unit along the binding sheets 37, and which bonds the binding sheets 37 and one leg portion 36 by an adhesion portion 31a and which bonds one leg portion 36 and the other leg portion 36 by an adhesion portion 31b respectively. It should be noted that bonding between the adhesion portion 31b and the adhesion portion 31c is also similar.

Figure 40:
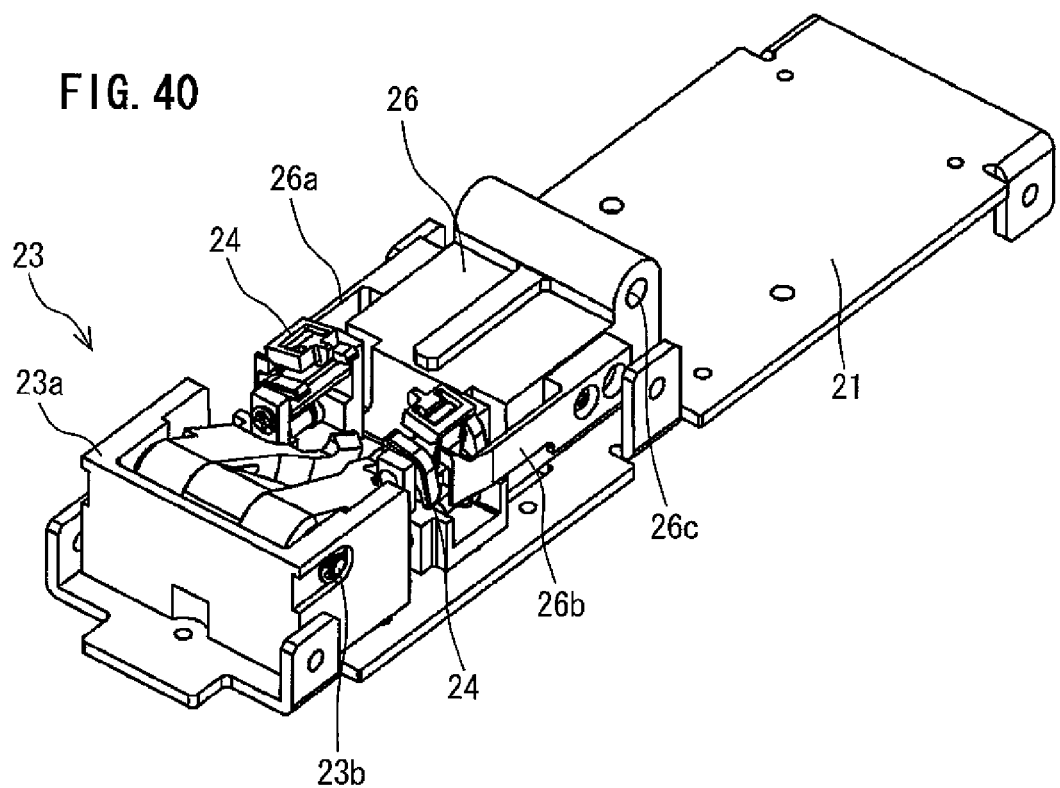
FIG. 40 is an explanatory diagram showing a constitution example of a staple bending unit.
Figure 41A:
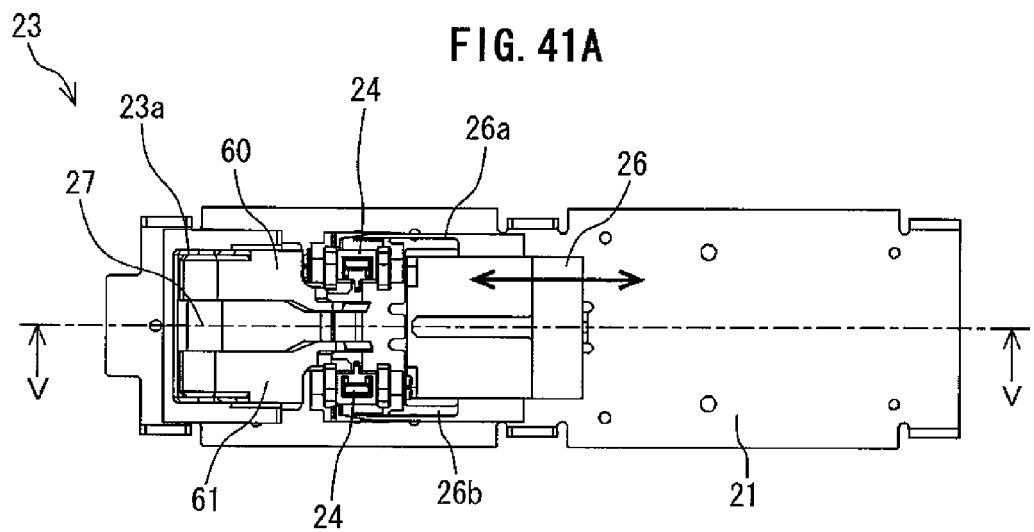
FIG. 41A is an explanatory diagram showing a constitution example of the staple bending unit.
Figure 41B:
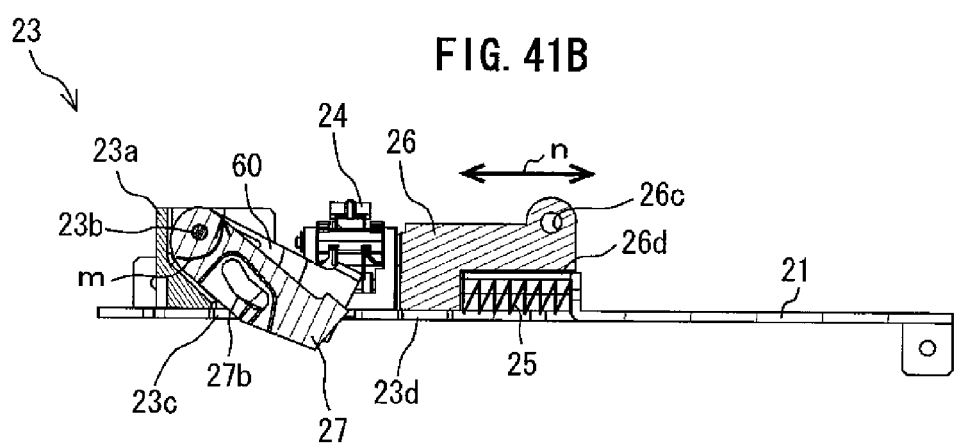
FIG. 41B is an explanatory diagram showing a constitution example of the staple bending unit.
Figure 41C:
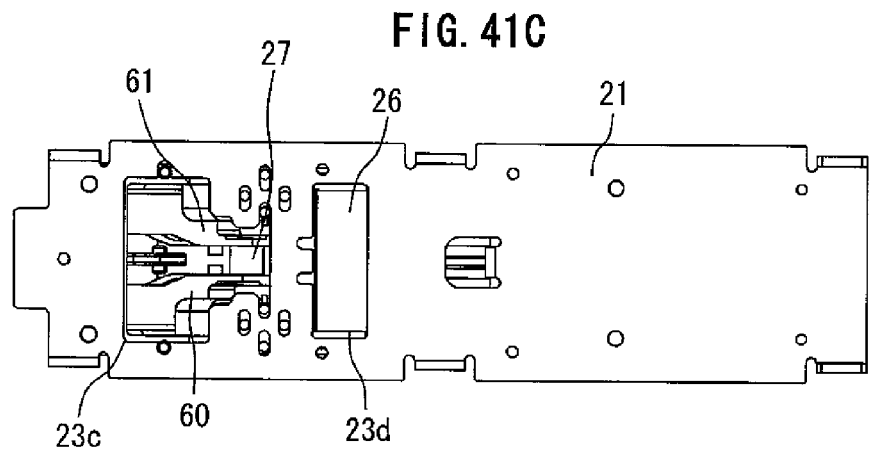
FIG. 41C is an explanatory diagram showing a constitution example of the staple bending unit.

FIG. 40, FIG. 41A, FIG. 41B and FIG. 41C are explanatory diagrams showing a constitution of a portion of the staple bending unit. FIG. 40 is a perspective view showing a constitution of a portion of the staple bending unit. FIG. 41A is a plan view showing a state in which a constitution of a portion of the staple bending unit is seen from the upper side. FIG. 41B is a cross-section view showing a constitution of a portion of the staple bending unit, and shows a V-V cross-section of FIG. 41A. FIG. 41C is a plan view showing a state in which a constitution of a portion of the staple bending unit is seen from the downward.

As shown in FIG. 40 and FIG. 41A to FIG. 41C, the staple bending unit is constituted by including a clincher unit 23 attached on the bending unit installation table 21 which is a bottom portion of the frame 8, two pushing-out units 24 and the slider 26. First, it will be explained with respect to a constitution of the clincher unit 23.

The clincher unit 23 is constituted by including a rectangular body shaped clincher holder 23a whose two adjacent faces are opened, a clincher left 60 mounted on the clincher holder 23a rotatably by a clincher shaft 23b, the clincher center 27 and a clincher right 61.

The clincher left 60 and the clincher right 61 have shapes becoming the right-left symmetry in each other, and include a bending unit and a bending unit which are protruded from the clincher holder 23a respectively, and they are attached to the clincher holder 23a in a state in which the clincher center 27 is sandwiched. Also, the clincher center 27 has a bonding portion which is protruded from the clincher holder 23a.

Also, screw coil springs, which are not shown, are provided between the clincher left 60 and the clincher center 27 and between the clincher right 61 and the clincher center 27 respectively. Thus, a state such that the clincher left 60 is biased upward with respect to the clincher center 27, and the clincher right 61 is biased upward with respect to the clincher center 27 appears.

Also, by groove portions, not shown, which are provided at the right and the left of the clincher center 27 and by convex portions, not shown, which are engaged with the right and left groove portions of the clincher center 27 and which are provided at the clincher left 60 and the clincher right 61 respectively, an upper dead point of the clincher left 60 is fixed with respect to the clincher center 27 and an upper dead point of the clincher right 61 is fixed with respect to the clincher center 27. Here, in the stapler 3, for example, the upper dead point of the clincher right 61 with respect to the clincher center 27 will be on a higher position than that of the upper dead point of the clincher left 60 with respect to the clincher center 27. Namely, in a stand-by state of the stapler 3, a bending unit 61a of the clincher right 61 is on the high position with respect to a bending unit 60a of the clincher left 60.

Also, at a position on which the clincher unit 23 of the bending unit installation table 21 is placed, there is formed a clincher opening portion 23c as shown in FIG. 41B and FIG.

41C. Further, as shown in FIG. 41B, a long hole 27*b* is provided at the clincher center 27. Here, as shown in FIG. 20, the stapler 3 is provided at the base 9 with the clincher lifter 28, as a portion of the bending unit, for supporting the clincher center 27 and for fixing the position. The clincher lifter 28 has the length in response to the base 9 in the up and down directions, and at an upper edge portion thereof, there is provided with a convex portion which is engaged with the long hole 27*b* of the clincher center 27.

As shown by an arrow J of FIG. 20, the position of the clincher center 27 is fixed by rotating the frame 8 with respect to the base 9 on the frame rotating shaft 12 and by changing the position of the convex portion of the clincher lifter 28 in the long hole 27*b* of the clincher center 27. Simultaneously, positions of the clincher left 60 and the clincher right 61 which are biased by the screw coil spring with respect to the clincher center 27 are also fixed.

Figure 42A:
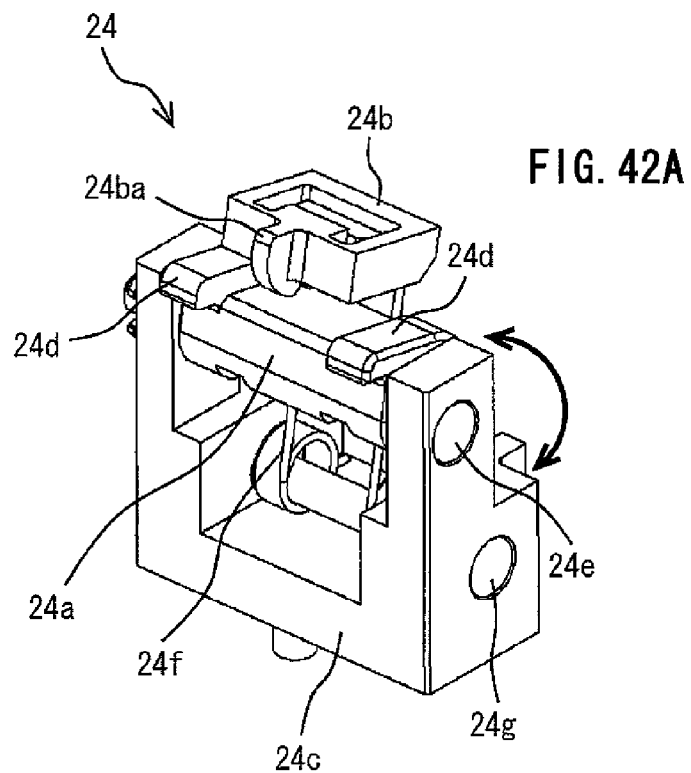
FIG. 42A is an explanatory diagram showing a constitution example of a pushing-out unit.
Figure 42B:
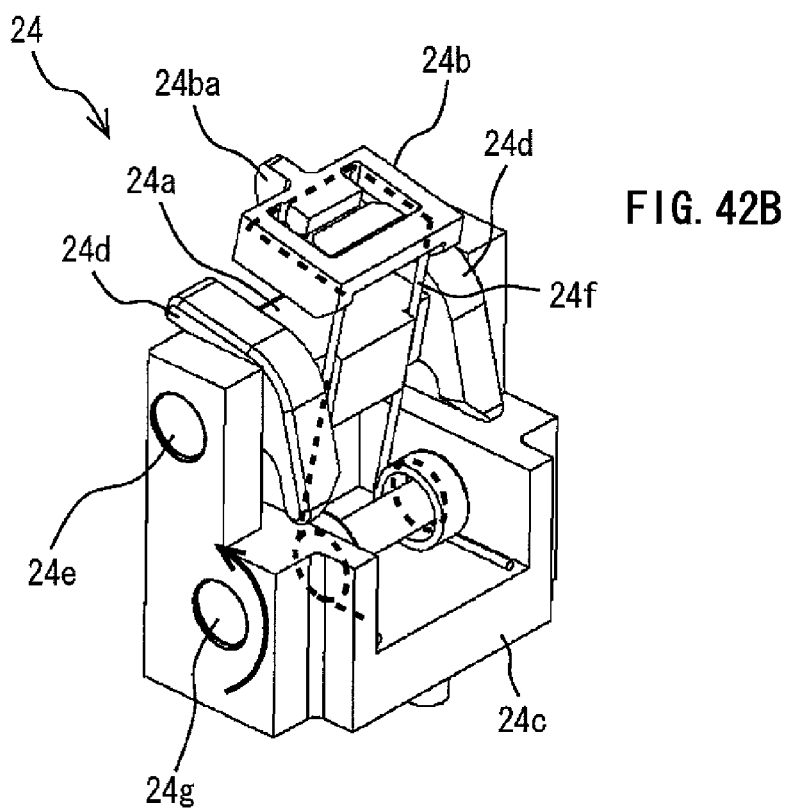
FIG. 42B is an explanatory diagram showing a constitution example of the pushing-out unit.
Figure 42C:
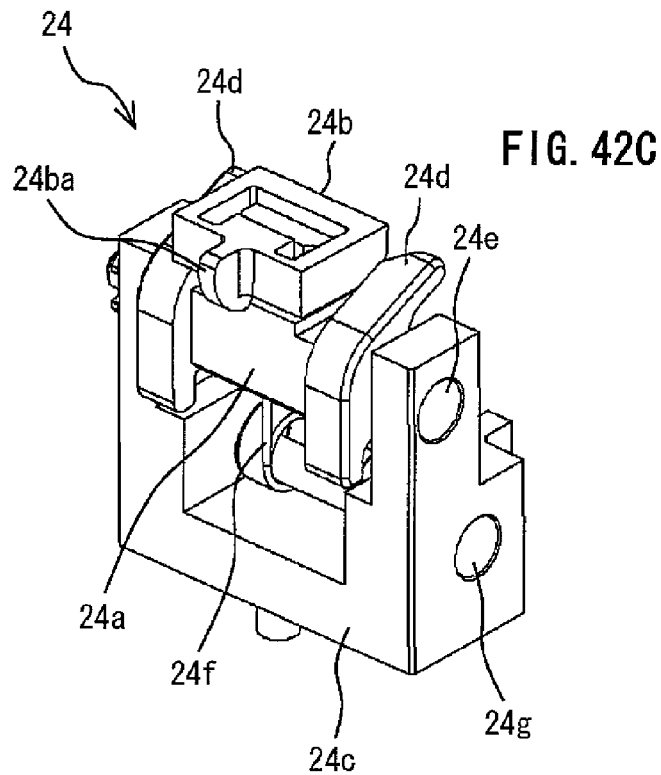
FIG. 42C is an explanatory diagram showing a constitution example of the pushing-out unit.
Figure 42D:
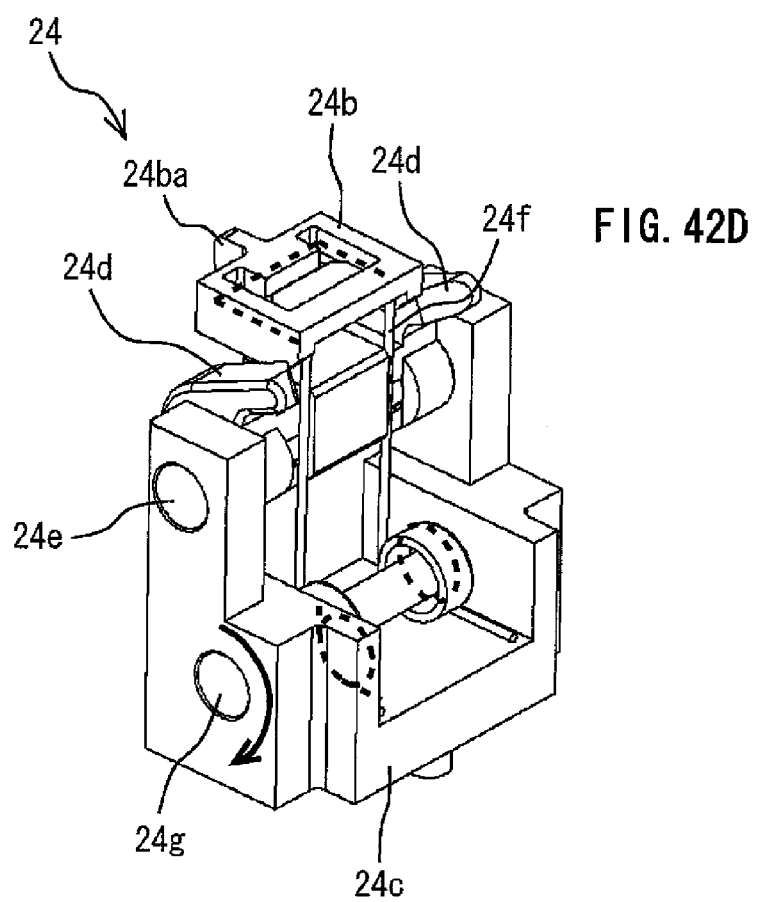
FIG. 42D is an explanatory diagram showing a constitution example of the pushing-out unit.

Next, it will be explained with respect to a constitution of each of the pushing-out units 24. Two pushing-out units 24 attached on the bending unit installation table 21 shown in FIG. 40 are ones in which the same constitution is provided. Also, the respective pushing-out units 24 are placed on the position corresponding to the driver 18. FIG. 42A, FIG. 42B, FIG. 42C and FIG. 42D are explanatory diagrams showing the constitution of each of the pushing-out units 24. FIG. 42A and FIG. 42B show a state in which a cam 24*a* and a push-out pusher 24*b*, which will be mentioned later, are at the stand-by position. FIG. 42C and FIG. 42D show a state in which the cam 24*a* and the push-out pusher 24*b*, which will be mentioned later, are at the push-out position. Also, FIG. 42A to FIG. 42D are perspective views of the pushing-out unit 24 respectively.

As shown in FIG. 42A to FIG. 42D, the pushing-out unit 24 is constituted by including a pushing-out unit-base 24*c* having a shape in which an upper portion thereof is opened, the cam 24*a* and the push-out pusher 24*b*. The cam 24*a* is provided with a claw portions 24*d* each having a curved shape at both the edges, and is mounted rotatably as shown by an arrow of FIG. 42A on the pushing-out unit-base 24*c* by a cam shaft 24*e* in the pushing-out unit-base 24*c*.

The push-out pusher 24*b* has a rectangular body formed shape, and is attached to an upper edge portion of a double torsion spring 24*f*. The double torsion spring 24*f* is attached rotatably on the pushing-out unit-base 24*c* by a double torsion spring shaft 24*g*. Thus, the push-out pusher 24*b* becomes in a state of being biased in an arrow direction shown in FIG. 42B. Also, the push-out pusher 24*b* is provided with an arc shaped push-out portion 24*ba* of thin plate in the direction in which it is biased by the double torsion spring 24*f*. This push-out portion 24*ba* has a shape insertable for the push-out hole 51*c* of the punching blade 51 shown in FIG. 32A, FIG. 32B and FIG. 32C.

By making the cam 24*a* rotate in an arrow direction of FIG. 42B in a state in which the push-out pusher 24*b* is at the stand-by position shown in FIG. 42A and FIG. 42B, the push-out pusher 24*b* which is biased by the double torsion spring 24*f*, as shown in FIG. 42C and FIG. 42D, moves to the push-out position. On the other hand, by making the cam 24*a* rotate clockwise in FIG. 42D in a state in which the push-out pusher 24*b* is at the push-out position, the double torsion spring 24*f* is pushed by the cam 24*a* and the push-out pusher 24*b* moves to the stand-by position.

Figure 43A:
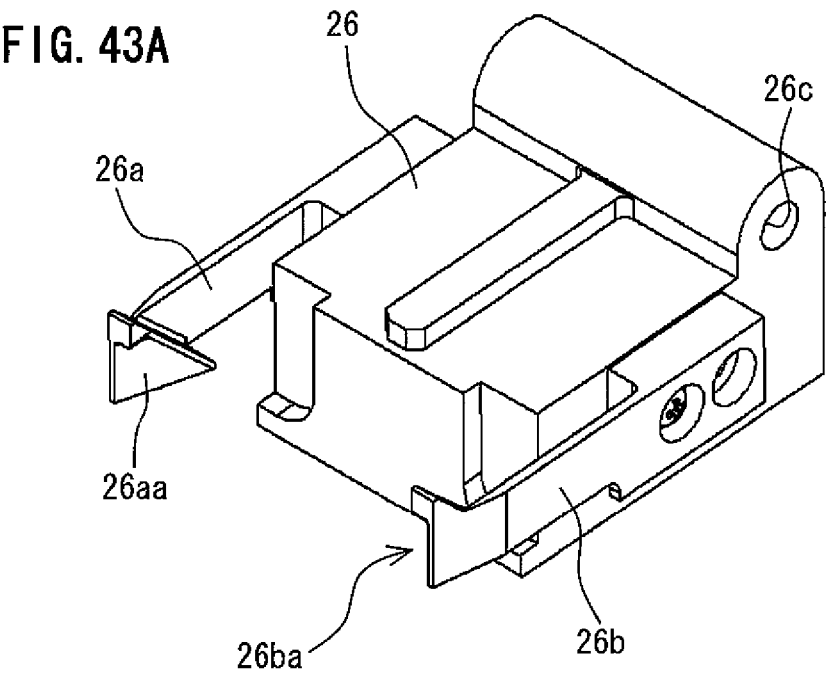
FIG. 43A is an explanatory diagram showing a constitution example of a slider.
Figure 43B:
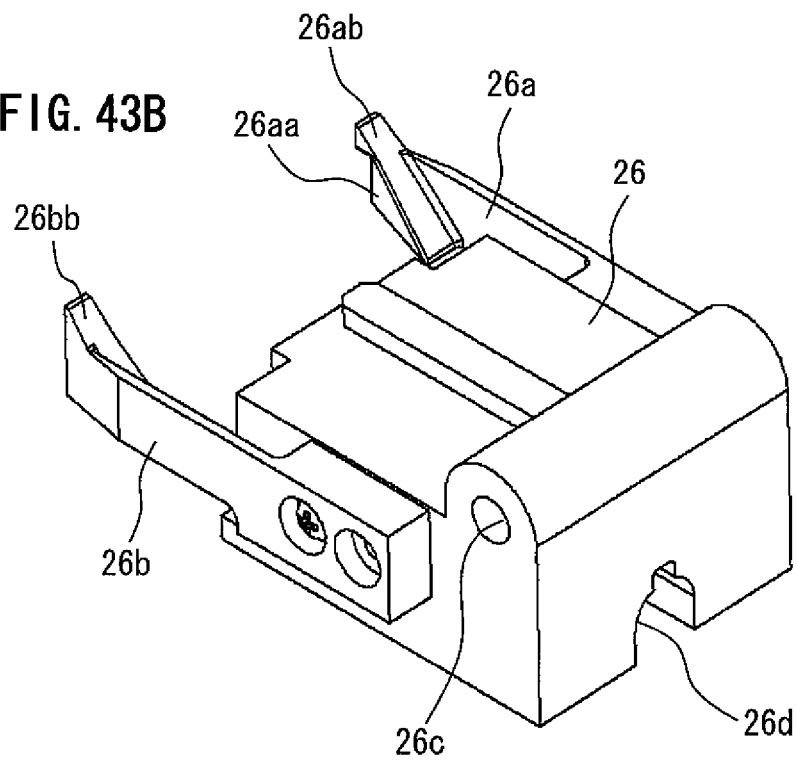
FIG. 43B is an explanatory diagram showing a constitution example of the slider.

Next, it will be explained with respect to a constitution example of a slider 26. FIG. 43A and FIG. 43B are explanatory diagrams showing a constitution example of the slider 26. FIG. 43A is a perspective view thereof showing a state in which the slider 26 is seen obliquely from the front, and FIG. 43B is a perspective view thereof showing a state in which the slider 26 is seen obliquely from the back-side.

As shown in FIG. 43A and FIG. 43B, the slider 26 has a rectangular body formed shape, and is provided with a slider arm 26*a* and a slider arm 26*b* which are extended toward the front from both the edges. The slider arm 26*a* is provided with an arm slope surface 26*aa* and an arm slope surface 26*ab* at the front edge portion. The arm slope surface 26*aa* is formed in the inside of the slider 26 and with an angle faced to the lower side and the front side. The arm slope surface 26*ab* is formed in the inside of the slider 26 and also at the rear portion of the side arm slope surface 26*aa* with an angle faced to the upper side and the back side.

The slider arm 26*b* also is provided with an arm slope surface 26*ba* and an arm slope surface 26*bb* at the front edge portion similarly as the slider arm 26*a*. The arm slope surface 26*ba* is formed in the inside of the slider 26 and also with an angle faced to the lower side and the front side. The arm slope surface 26*bb* is formed in the inside of the slider 26 and also at the rear portion of the side arm slope surface 26*ba* with an angle faced to the upper side and the back side.

Also, the slider 26 is provided with a slider shaft hole 26*c* into which a slider shaft 63 is inserted in the vicinity of the rear edge portion, and it is attached slidably forward and backward as shown by an arrow of FIG. 41A and an arrow n of FIG. 41B. In a state in which the stapler 3 is assembled, as shown in FIG. 20, the slider shaft 63 becomes in a state of being positioned in a long hole 64 of the frame 8. Here, the link 57 rotates in the direction shown by an arrow i of FIG. 18 by pushing down the handle 5 and by descending the driver main body portion 18*a*, and the slider 26 moves backward by engaging a protrusion portion 57*c* which is provided at a lower edge portion of the link 57 with the slider shaft 63 and by pushing the slider shaft 63 backward.

Further, the slider 26 is provided with a slider spring hole 26*d*, on a rear surface portion thereof, on which the slider spring 25 is placed, and becomes in a state of being biased forward with respect to the bending unit installation table 21 by the slider spring 25 in a state in which the stapler 3 is assembled. Also, as shown in FIG. 41B and FIG. 41C, at a lower portion of the slider 26 of the bending unit installation table 21, there is formed a slider hole portion 23*d* of a predetermined size.

Next, it will be explained with respect to a relationship between operations of the pushing-out unit 24 and the clincher unit 23. As shown in FIG. 40, FIG. 41A, FIG. 41B and FIG. 41C, the respective pushing-out units 24 are arranged at the position sandwiching the place in which a bending unit of the clincher left 60, a bonding portion of the clincher center 27 and a bending unit of the clincher right 61 move upward and downward. In a state in which the push-out pusher 24*b* of the each pushing-out unit 24 is at the push-out position, by rotating the clincher left 60, the clincher center 27 and the clincher right 61 in the direction shown by an arrow of FIG. 41B and by pushing the claw portion 24*d* of each of the pushing-out units 24 up by the clincher left 60 and the clincher right 61, the cam 24*a* rotates and the push-out pusher 24*b* moves to the stand-by position.

Next, it will be explained with respect to the relationship between operations of the pushing-out unit 24 and the slider 26. In a state shown in FIG. 40, FIG. 41A, FIG. 41B and FIG. 41C, the push-out pusher 24*b* of each of the pushing-out units 24 is at the stand-by position, and front edge portions of the slider arms 26*a*, 26*b* of the slider 26 are between two claw portions 24*d* of the each pushing-out unit 24. By moving the slider 26 backward from that state, the arm slope surface 26*ab* of the slider arm 26*a* and the arm slope surface 26*bb* of the slider arm 26b abut against the claw portions 24d which are positioned at a rear side of the each pushing-out unit 24, the cam 24a rotates and the push-out pusher 24b moves to the push-out position.

Also, the push-out pusher 24b of the each pushing-out unit 24 is the stand-by position, and when the slider 26 is moved forward from a state in which front edge portions of the slider arms 26a, 26b of the slider 26 are disengaged the place between two claw portions 24d of the each pushing-out unit 24 and are in the back, the arm slope surface 26aa of the slider arm 26a and the arm slope surface 26ba of the slider arm 26b abut against claw portions 24d which are positioned at the rear side of each of the pushing-out units 24, the slider arms 26a, 26b are expanded on both the sides and front edge portions of the slider arms 26a, 26b of the slider 26 become in a state of being positioned between two claw portions 24d of the respective pushing-out units 24.

(5) Constitution Example of Other Base Portion

Next, it will be explained with respect to another constitution of the base 9. The stapler 3 is provided with a slider holder 29 for supporting the slider 26. This slider holder 29 is provided at the position corresponding to the slider hole portion 23d of the bending unit installation table 21, and becomes in a state of supporting the slider 26 in a stand-by state of the stapler 3, as shown in FIG. 20. The slider 26 becomes in a state of being disengaged from the slider holder 29 by pushing down the handle 5 and by moving the slider 26 backward.

Also, as shown in FIG. 20, the stapler 3 is provided with the return springs 22 each for supporting the bending unit installation table 21 on the base 9. The bending unit installation table 21 becomes in a state of being biased clockwise in FIG. 20 by the frame rotating shaft 12 by these return springs 22.

<Operation Examples of Interlinked Staples and Stapler>

Next, it will be explained with respect to an operation for binding the binding sheets 37 by the stapler 3 used by interlinked staples 1. FIG. 44 to FIG. 51 are cross-sectional diagrams showing operations for binding the binding sheets 37 using the staple 2 by the stapler 3. FIG. 44 to FIG. 51 show the stapler 3 in respective states with respect to an h-h cross-section of FIG. 19.

Figure 44:
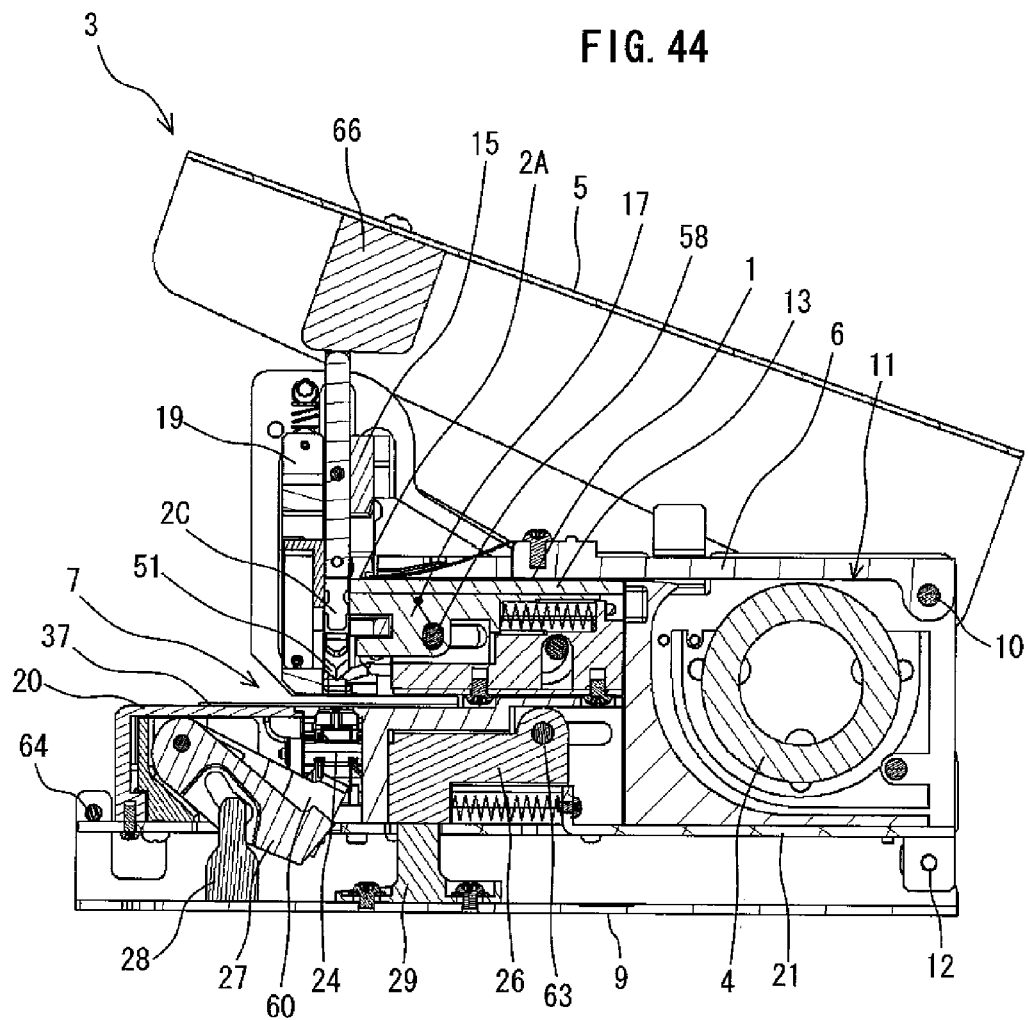
FIG. 44 is a cross-sectional diagram showing a stapler in a stand-by state thereof.

Hereinafter, it will be explained with respect to the operation for binding the binding sheets 37 using the staple 2 by the stapler 3 with reference to the drawings. FIG. 44 is an explanatory diagram showing a state of the respective portions of the stapler 3 in a stand-by state thereof.

In the stand-by state of the stapler 3 shown in FIG. 44, respective portions of the stapler 3 become in such a state as follows. In the stand-by state of the stapler 3, the roll shaped staple 4 is loaded in the staple holder 11, and as shown in FIG. 22, the interlinked staples 1 pulled out from the roll shaped staple 4 are placed on the feeding path 13 in a state in which the release coated paper 30 is peeled. Also, the release coated paper 30 peeled from the interlinked staples is placed in a state of being discharged from the release coated paper outlet 39 provided at a rear portion of the stapler 3 through the release coated paper discharge path 40.

Also, at the receiving table portion 13c of the feeding path 13 which is a lower portion of the forming plate 15, a staple 2A of the edge portion of the interlinked staples 1 is positioned. Further, in the punching blade 51 of the driver 18, a staple 2C shaped into a shape in which both the edges are bent to one direction is positioned.

Also, in the stand-by state of the stapler 3, the paper-sheet pusher 19 is biased upward with respect to the frame 8 by the tension spring 55, and is positioned at an upper edge portion which is fixed by the convex portion 19f and the side groove 54. The driver 18 is biased upward with respect to the paper-sheet pusher 19 by the screw coil spring 56, and is positioned at an upper edge portion which is fixed by the convex portion 18g and the side groove 53. The forming plate 15 is positioned at an upper edge portion which is fixed by the convex portion 15d and the side groove 50 by the protrusion pin 18d of the driver 18.

Further, in the stand-by state of the stapler 3, the pusher 17 is biased forward by the pusher spring 16, and the staple pushing unit 17a become in a state of being attached in contact with the punching blades 51 of the driver 18. Also, the slider 26 is biased forward by the slider spring 25 and becomes in a state of being put on the slider holder 29 which is provided at the base 9.

Also, in the stand-by state of the stapler 3, the bending unit installation table 21 which becomes a bottom portion of the frame 8 is biased upward by the return springs 22 of the base 9, and a front edge portion of the bending unit installation table 21 becomes in a state of being attached in contact with a shaft 64 which is fixed at base 9.

Figure 45:
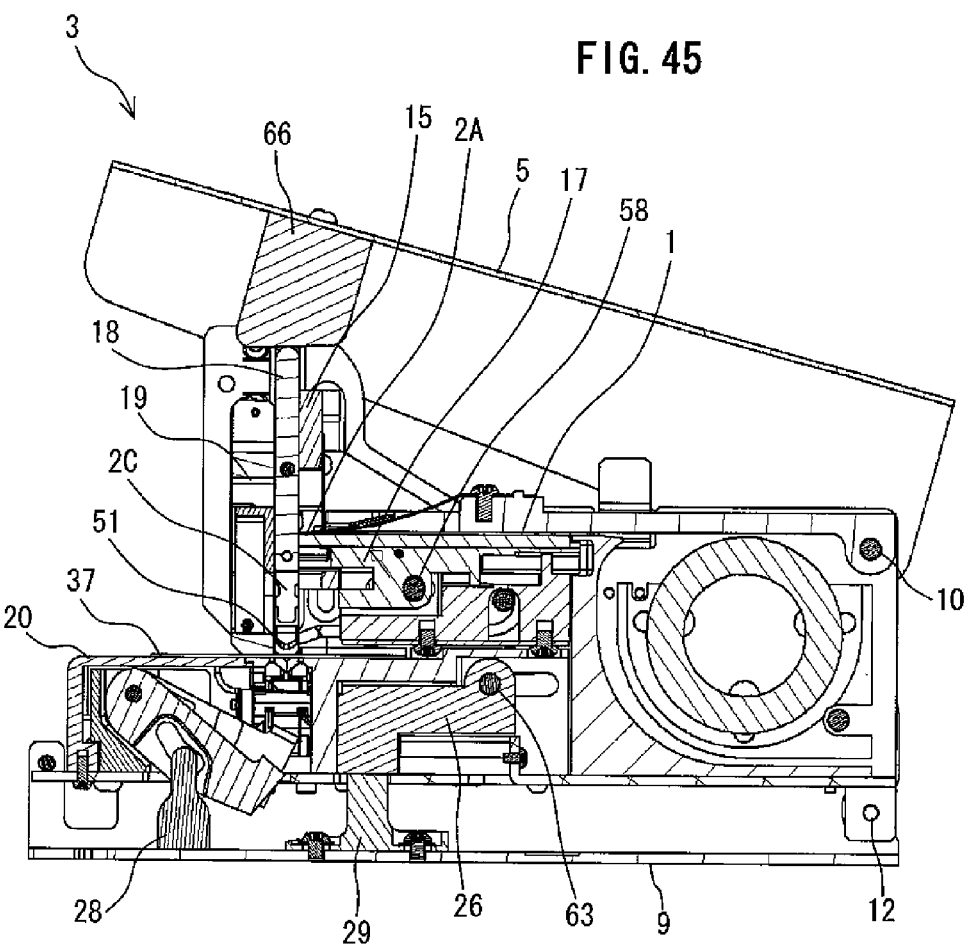
FIG. 45 is a cross-sectional diagram showing a stapler in a state in which a forming plate starts its operation.

FIG. 45 is an explanatory diagram showing a state of the respective portions of the stapler 3 in a state in which the paper-sheet pusher 19 is placed on the table 20 and actuation of the forming plate 15 starts. The handle 5 rotates counterclockwise in FIG. 45 on the handle & staple cover rotating shaft 10 by pushing down the handle 5 from the stand-by state shown in FIG. 44, and the driver 18 is pushed down by the driver pusher 66.

Consequently, by pushing down the driver 18, the paper-sheet pusher 19 which is biased by the screw coil spring 56 is also pushed down downward, and as shown in FIG. 45, the binding sheets 37 on the table 20 becomes in a state of being held down by the paper-sheet pusher unit 19d of the paper-sheet pusher 19.

Also, the punching blades 51 attached to the driver 18 pass through the binding sheets 37 which are placed on the table 20 and which are held down by the paper-sheet pusher 19.

Also, by pushing down the driver 18 further, the links 57 rotates further in the direction shown by an arrow i of FIG. 18, the pusher shaft 58 engaged with the long holes 57a is pushed backward and the pusher 17 moves backward further. Thus, the lower edge portion 15d to the forming plate 15 shown in FIG. 25 becomes in a state of being disengaged from the L-shaped arm 17d of the pusher 17. At that time, an engagement with respect to the feeding holes 32 of the interlinked staples 1 of the feeding claws 44 attached with the pusher 17 is disengaged, and the feeding claws 44 move backward.

Further, the protrusion pins 18d of the driver 18 move in the V-grooves 46 of the forming plate 15, and arrives at the lower edge portions 46a of the V-grooves 46. The forming plate 15 starts descending together with the driver 18 in a state in which the protrusion pins 18d are engaged with the lower edge portions 46a of the V-grooves 46 by descending the driver 18 further after the protrusion pins 18d of the driver 18 have reached at the lower edge portions 46a of the V-grooves 46.

Figure 46:
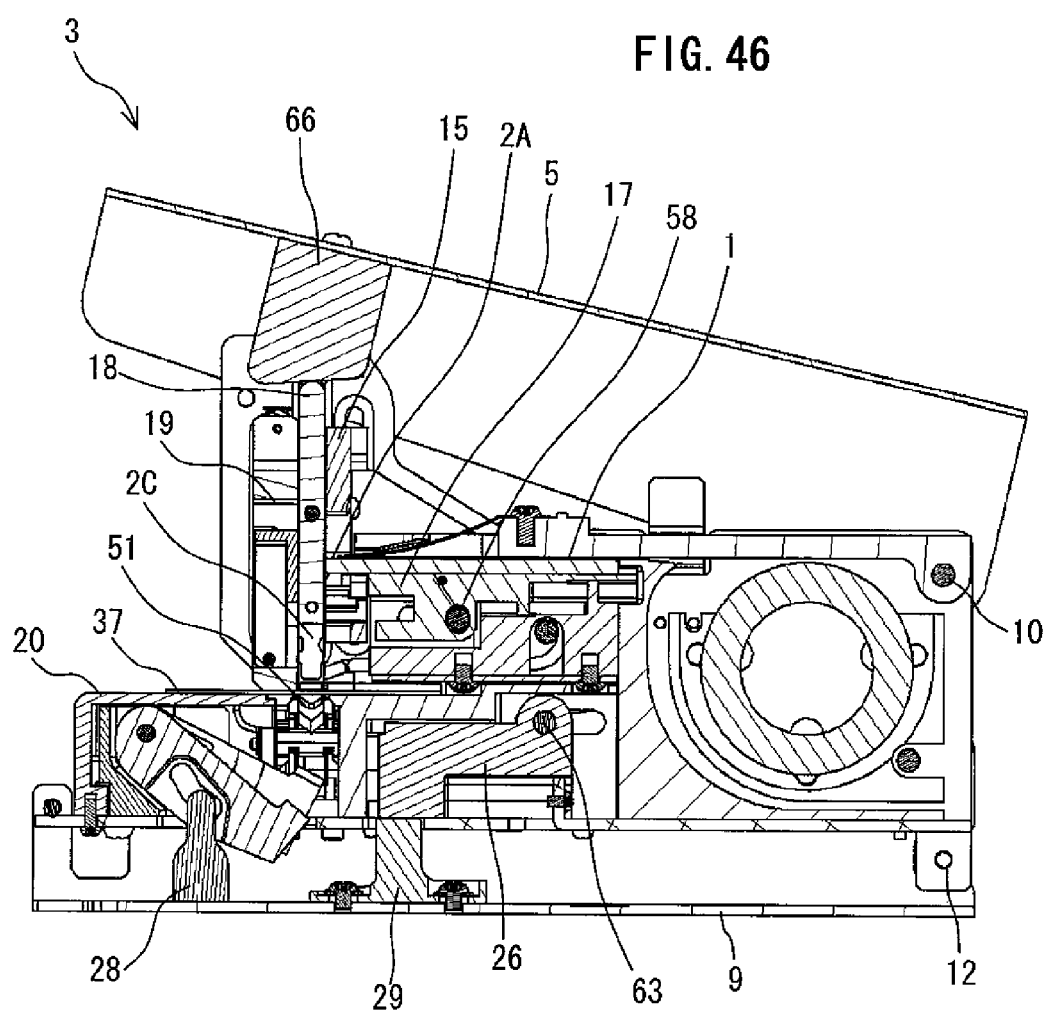
FIG. 46 is a cross-sectional diagram showing a stapler in a state in which shaping of a staple starts.

FIG. 46 is an explanatory diagram showing a state of the respective portions of the stapler 3 in a state in which the staple 2A is cut off, the movement of the slider 26 starts and shaping of the staple 2A starts. The handle 5 rotates counterclockwise in FIG. 46 on the handle & staple cover rotating shaft 10 by pushing down the handle 5 further from a state shown in FIG. 45, and the driver 18 is pushed down further by the driver pusher 66. Thus, as shown in FIG. 46, the punching blades 51 attached to the driver 18 further pass through the binding sheets 37 which are placed on the table 20 and which are held down by the paper-sheet pusher 19.

Also, the forming plate 15 descends together with the driver 18 in a state in which the protrusion pins 18*d* are engaged with the lower edge portions 46*a* of the V-grooves 46 by descending the driver 18. Thus, as shown in FIG. 36A to FIG. 36C, the staple interlinking portions 34 by which the staple 2A positioned at a leading portion of the interlinked staples 1 is linked with the staple 2B are cut off by the cutting blades 49 which are attached to the forming plate 15.

Figure 37A:
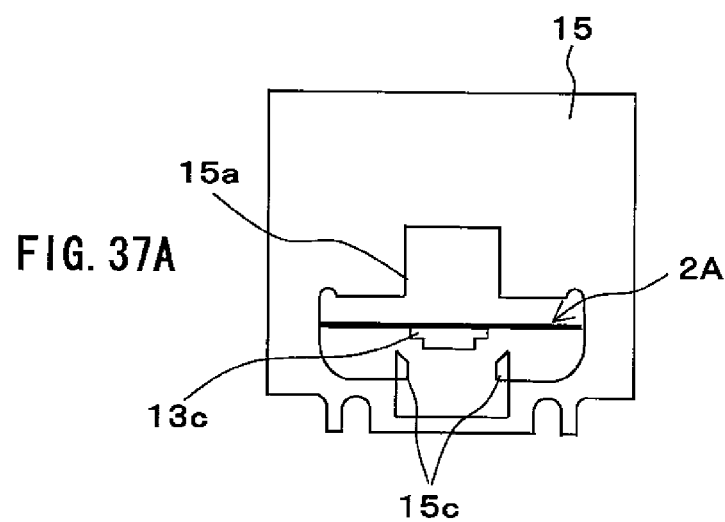
FIG. 37A is an explanatory diagram showing the staple shaping method.
Figure 37B:
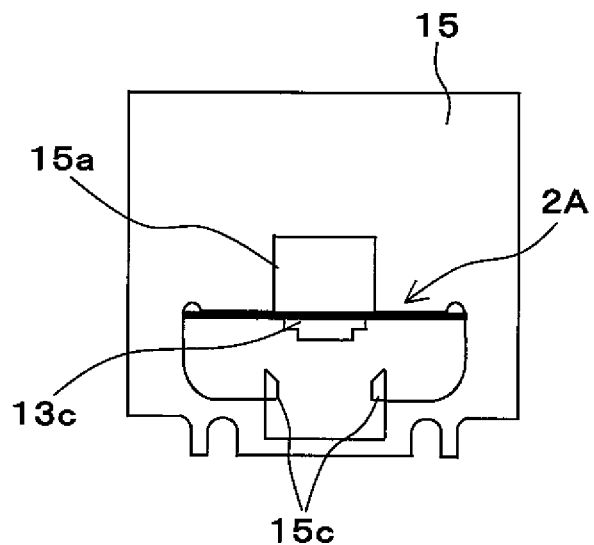
FIG. 37B is an explanatory diagram showing the staple shaping method.
Figure 37C:
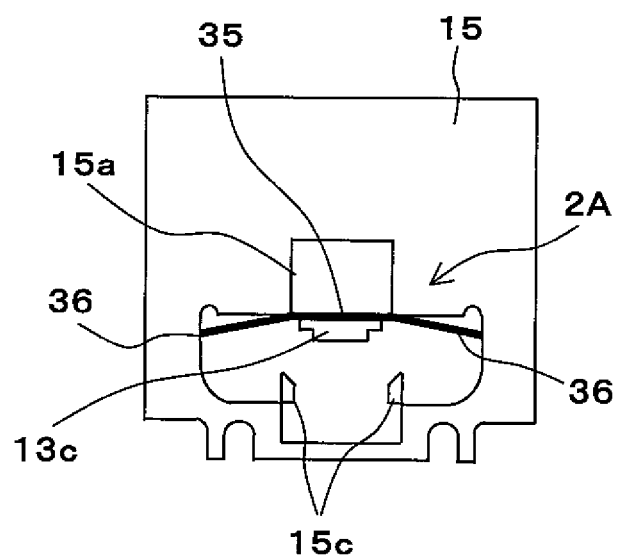
FIG. 37C is an explanatory diagram showing the staple shaping method.

Also, the forming plate 15 descends together with the driver 18 in a state in which the protrusion pins 18*d* are engaged with the lower edge portions 46*a* of the V-grooves 46. Thus, as shown in FIG. 37A to FIG. 37C, shaping of the staple 2A which is placed on the receiving table portion 13*c* starts by the staple shaping unit 15*a* of the forming plate 15.

By pushing down the driver 18 further, the links 57 rotate in the direction shown by an arrow i of FIG. 18 and the slider 26 moves backward together with the slider shaft 63 which is engaged with the protrusion portion 57*c* of each of the links 57. Thus, the slider arm 26*a* and the slider arm 26*b* of the slider 26 abut against the claw portions 24*d* which are positioned on the rear side of the respective pushing-out units 24 respectively, and the cam 24*a* rotates as shown by an arrow of FIG. 42A. Thus, the push-out pusher 24*b* of each of the pushing-out units 24 rotates in the direction of the push-out position from the stand-by position. Thus, the push-out portion 24*ba* of each of the push-out pushers 24*b* becomes in a state of abutting against the outside surface of each of the punching blades 51 passing through the binding sheets 37.

Figure 47:
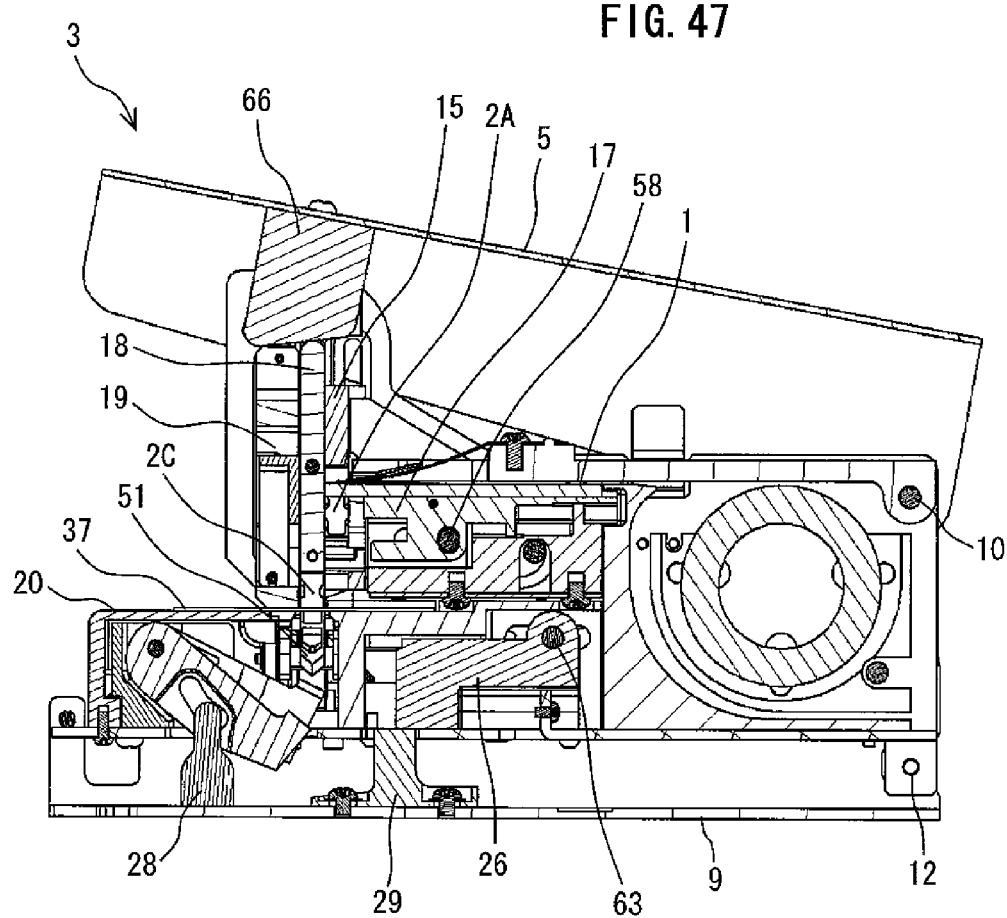
FIG. 47 is a cross-sectional diagram showing a stapler in a state in which shaping of a staple is completed.

FIG. 47 is an explanatory diagram showing a state of the respective portions of the stapler 3 in a state in which shaping of the staple 2A is completed. By pushing down the handle 5 further from a state shown in FIG. 46, the handle 5 rotates counterclockwise in FIG. 47 on the handle & staple cover rotating shaft 10, and the driver 18 is pushed down further by the driver pusher 66. Thus, as shown in FIG. 47, the punching blades 51 which are attached to the driver 18 further pass through the binding sheets 37 which are placed on the table 20 and which are held down by the paper-sheet pusher 19, and both the leg portions 36 of the staple 2C which are positioned in the punching blades 51 pass through the binding sheets 37.

Also, the forming plate 15 descends together with the driver 18 in a state in which the protrusion pins 18*d* are engaged with the lower edge portions 46*a* of the V-grooves 46 by descending the driver 18. Thus, the lower edge portion 15*d* of the forming plate 15 is contacted with a predetermined portion of the frame 8, and the forming plate 15 descends until the position in which the forming plate 15 does not descend with respect to the frame 8. Thus, as shown in FIG. 38A, the staple 2A placed on the receiving table portion 13*c* is shaped into a shape in which the crown portion 35 and both the leg portions 36 are provided and both the edges are bent to one direction by the staple shaping unit 15*a* of the forming plate 15.

Also, the links 57 rotate further in the direction shown by an arrow i of FIG. 18 by pushing down the driver 18 further, and the slider 26 moves backward further together with the slider shaft 63 which is engaged with the protrusion portions 57*c* of the links 57.

Figure 48:
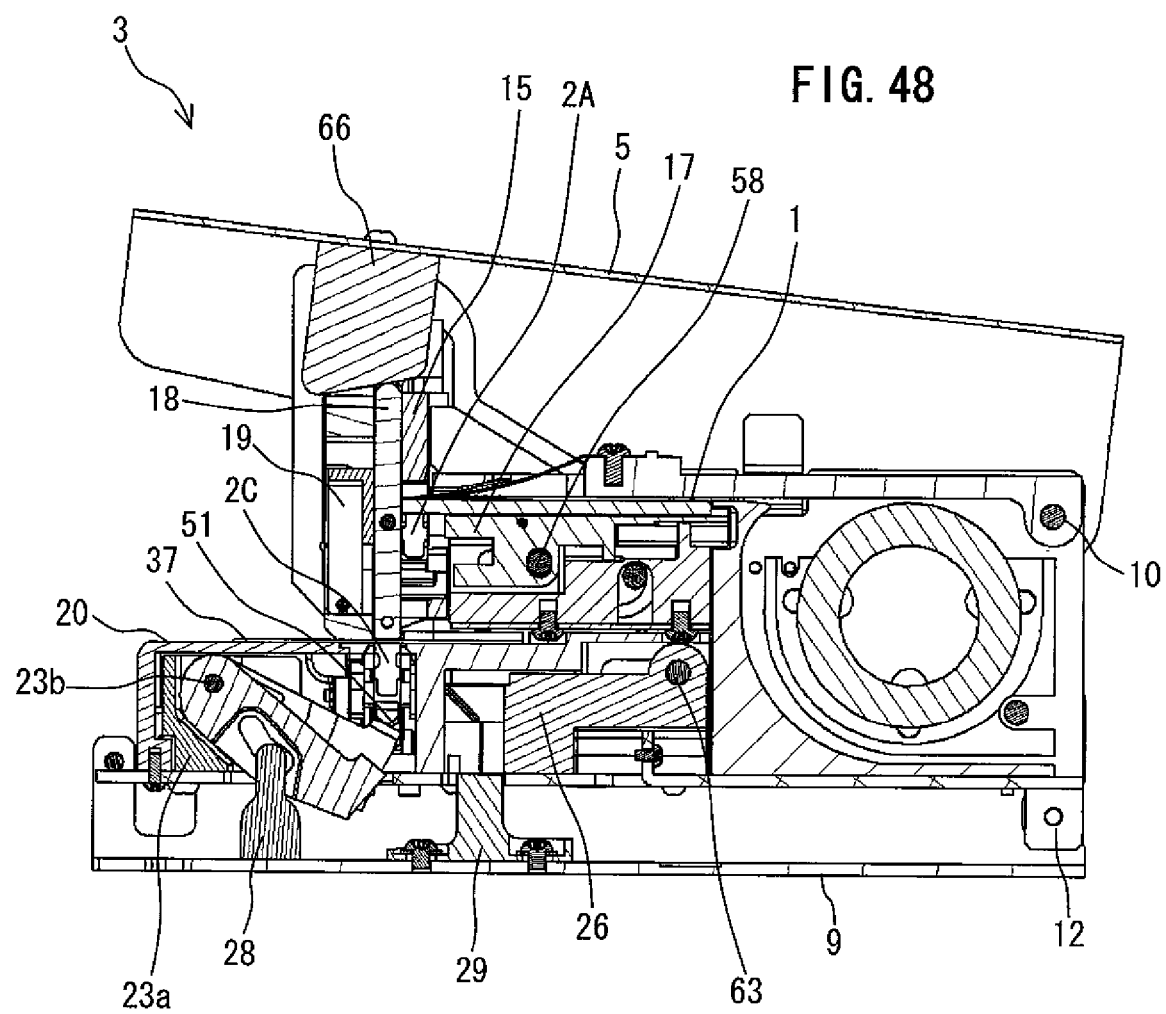
FIG. 48 is a cross-sectional diagram showing a stapler in a state in which passing-through of a staple is completed and a slider is disengaged from a slider holder.

FIG. 48 is an explanatory diagram showing a state of the respective portions of the stapler 3 in a state in which passing-through of the staple 2C is completed and the slider 26 is disengaged from the slider holder 29. By pushing down the handle 5 further from a state shown in FIG. 47, the handle 5 rotates counterclockwise in FIG. 48 on the handle & staple cover rotating shaft 10, and the driver 18 is pushed down further by the driver pusher 66. Thus, as shown in FIG. 48, the punching blades 51 which are attached to the driver 18 further pass through the binding sheets 37 which are placed on the table 20 and which are held down by the paper-sheet pusher 19, and both the leg portions 36 of the staple 2C which are positioned in the punching blades 51 pass through the binding sheets 37 perfectly.

Also, the push-out portions 24*ba* of the respective push-out pushers 24*b* in a state of abutting against the surfaces of the outsides of the respective punching blades 51, which are biased by the respective double torsion springs 24*f*, are inserted into the push-out holes 51*c* of the respective punching blades 51. Thus, both the leg portions 36 of the staple 2A become in a state of being apart from the respective punching blades 51 by pushing the leg portions inside by the respective push-out portions 24*ba* and by bending them.

Also, the protrusion pins 18*d* move in the V-grooves 48 from the V-grooves 47 by descending the driver 18. Further, the links 57 rotate further in the direction shown by an arrow i of FIG. 18, and by moving the slider 26 together with the slider shaft 63 which is engaged with the protrusion portions 57*c* of the links 57 backward further, as shown in FIG. 48, the slider 26 becomes in a state of being disengaged from the slider holder 29. Furthermore, the front edge portions of the slider arms 26*a* and 26*b* become in a state of being disengaged backward from a position between the respective claw portions 24*d* of the respective pushing-out units 24.

Figure 49:
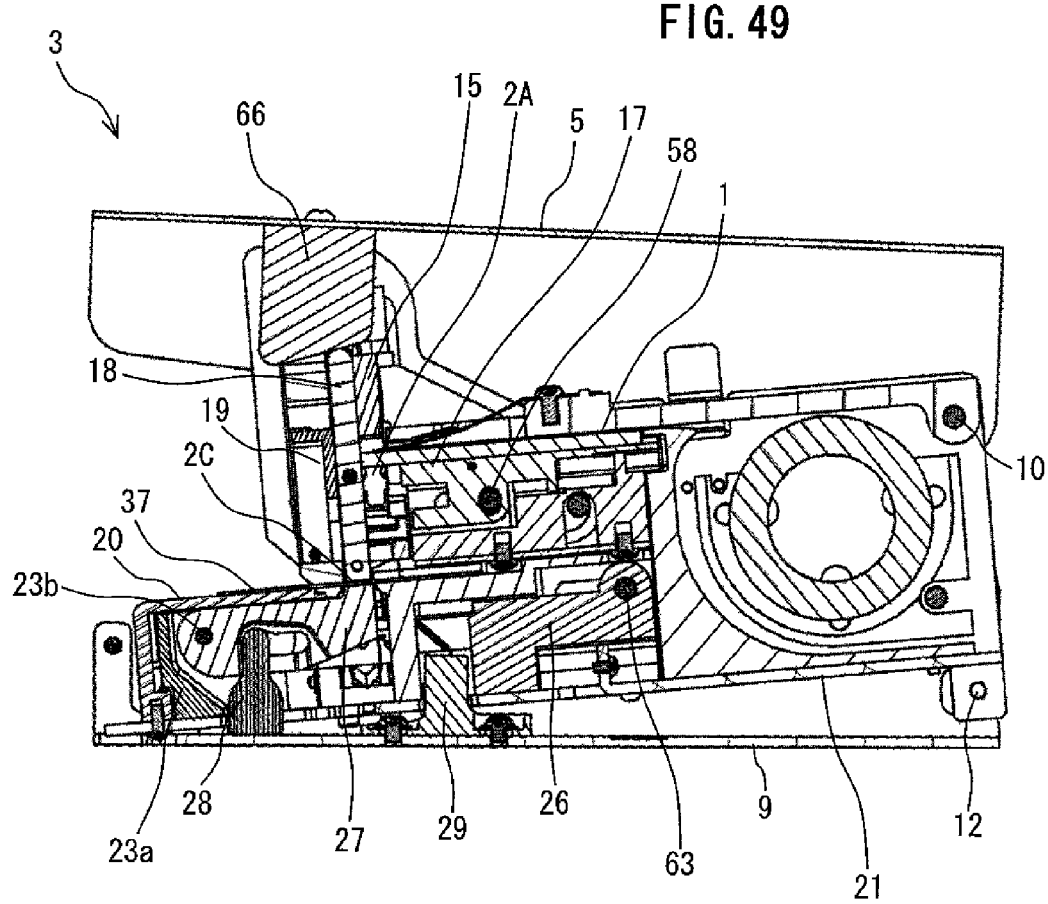
FIG. 49 is a cross-sectional diagram showing a stapler in a state in which clinch of a staple is completed.

FIG. 49 is an explanatory diagram showing a state of respective portions of the stapler 3 in a state in which clinch of the staple 2C is completed. By pushing down the handle 5 further from a state shown in FIG. 48, the frame 8 rotates counterclockwise in FIG. 49 with respect to the base 9 on the frame rotating shaft 12, and as shown in FIG. 49, the bending unit installation table 21 which is a bottom portion of the frame 8 becomes in a state of being contacted with the base 9. It should be noted that it is not possible to push down the handle 5 further from a state in which the bending unit installation table 21 is contacted with the base 9.

Consequently, the clincher center 27 rotates on the clincher shaft 23*b* depending on the clincher lifter 28 and becomes in a state of being lifted upward with respect to the clincher holder 23*a*. By lifting up the clincher center 27 upward with respect to the clincher holder 23*a*, the clincher left 60 and the clincher right 61 which are biased upward with respect to the clincher center 27 by the screw coil spring also rotate on the clincher shaft 23*b*, and are lifted upward with respect to the clincher holder 23*a*.

Here, in the clincher right 61, an upper dead point thereof with respect to the clincher center 27 is provided more upward than that of the clincher left 60. Consequently, by rotating the clincher center 27 on the clincher shaft 23*b* and lifting it upward, the leg portion 36 of the right side of the staple 2C is bent perfectly toward the inside along the inside of the binding sheets 37 by the clincher left 61 and becomes in a state of being retained.

Thereafter, by rotating the clincher center 27 on the clincher shaft 23*b* and lifting it upward further, the leg portion 36 of the left side of the staple 2C is bent perfectly toward the inside along the inside of the binding sheets 37 by the clincher left 60 and becomes in a state of being retained.

Thereafter, by rotating the clincher center 27 on the clincher shaft 23*b* and lifting it upward further, as shown in FIG. 49, overlapping portions of both the leg portions 36 of the staple 2C become in a state of being held down by a bonding portion of a tip of the clincher center 27. Thus, as shown in FIG. 3, it become in a state of being bonded between the adhesion portion 31*b* of the leg portion 36 of the right side of the staple 2C and the leg portion 36 of the left side thereof and between the adhesion portion 31a of the leg portion 36 of the left side and the binding sheets 37, respectively.

Figure 50:
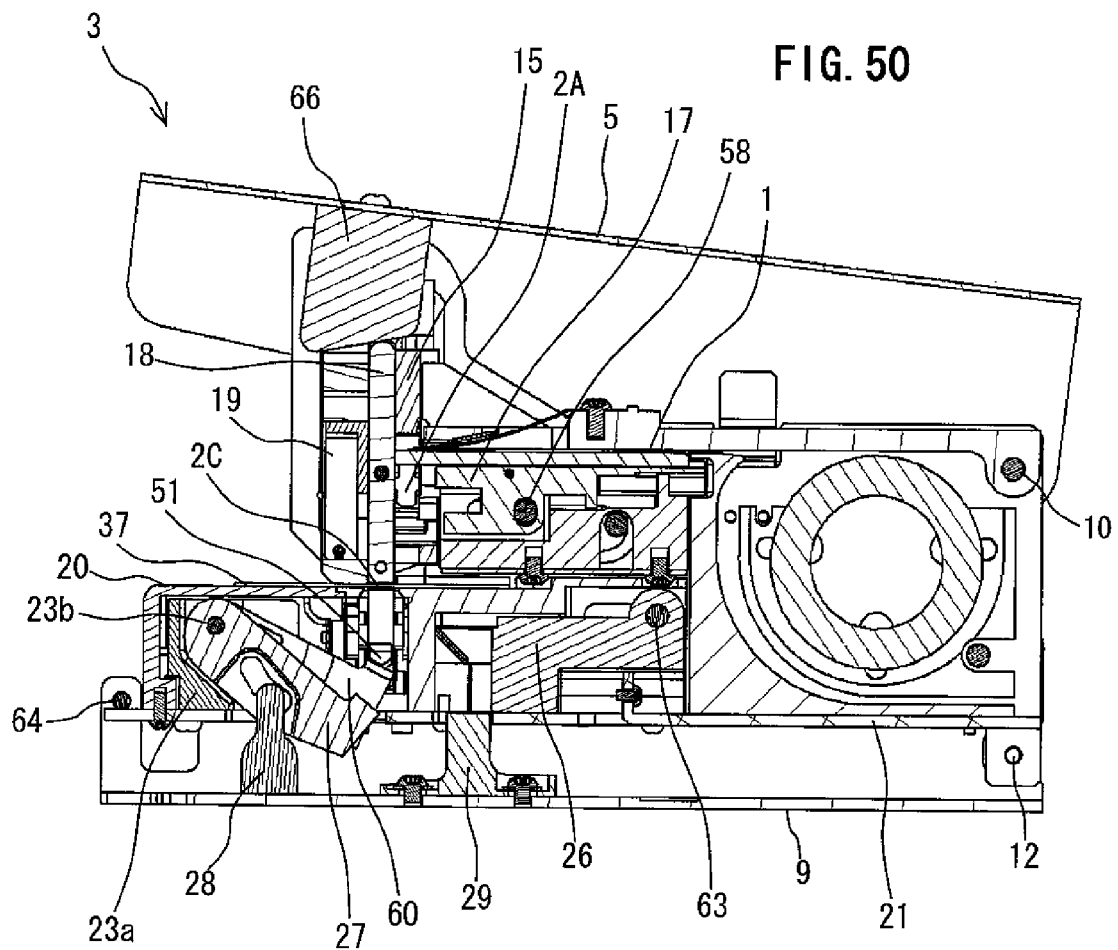
FIG. 50 is a cross-sectional diagram showing a stapler in a state in which return of a frame is completed and return of a driver starts.

FIG. 50 is an explanatory diagram showing a state of the respective portions of the stapler 3 in a state in which return of the frame 8 is completed and return of the driver 18 starts. By releasing the push down of the handle 5 depending on a user from a state shown in FIG. 49, first, the frame 8 rotates clockwise in FIG. 50 with respect to the base 9 on the frame rotating shaft 12 by the return springs 22 which are provided at the base 9 shown in FIG. 18.

Consequently, the front edge portion of the bending unit installation table 21 abuts against the shaft 64 which is fixed at the base 9 and the frame 8 and the base 9 become the same position relationship as that of a stand-by state shown in FIG. 44. Also, the clincher center 27 is pulled down with respect to the clincher holder 23a by the clincher lifter 28, and the clincher holder 23a, the clincher left 60, the clincher center 27 and the clincher right 61 become the same position relationship as that of a stand-by state shown in FIG. 44.

Also, the frame 8 rotates on the frame rotating shaft 12 depending on the return springs 22 and the front edge portion of the bending unit installation table 21 abuts against the shaft 64 and thereafter, the driver 18 starts moving upward by the screw coil spring 56 provided between the driver 18 and the paper-sheet pusher 19 as shown in FIG. 24B.

Figure 51:
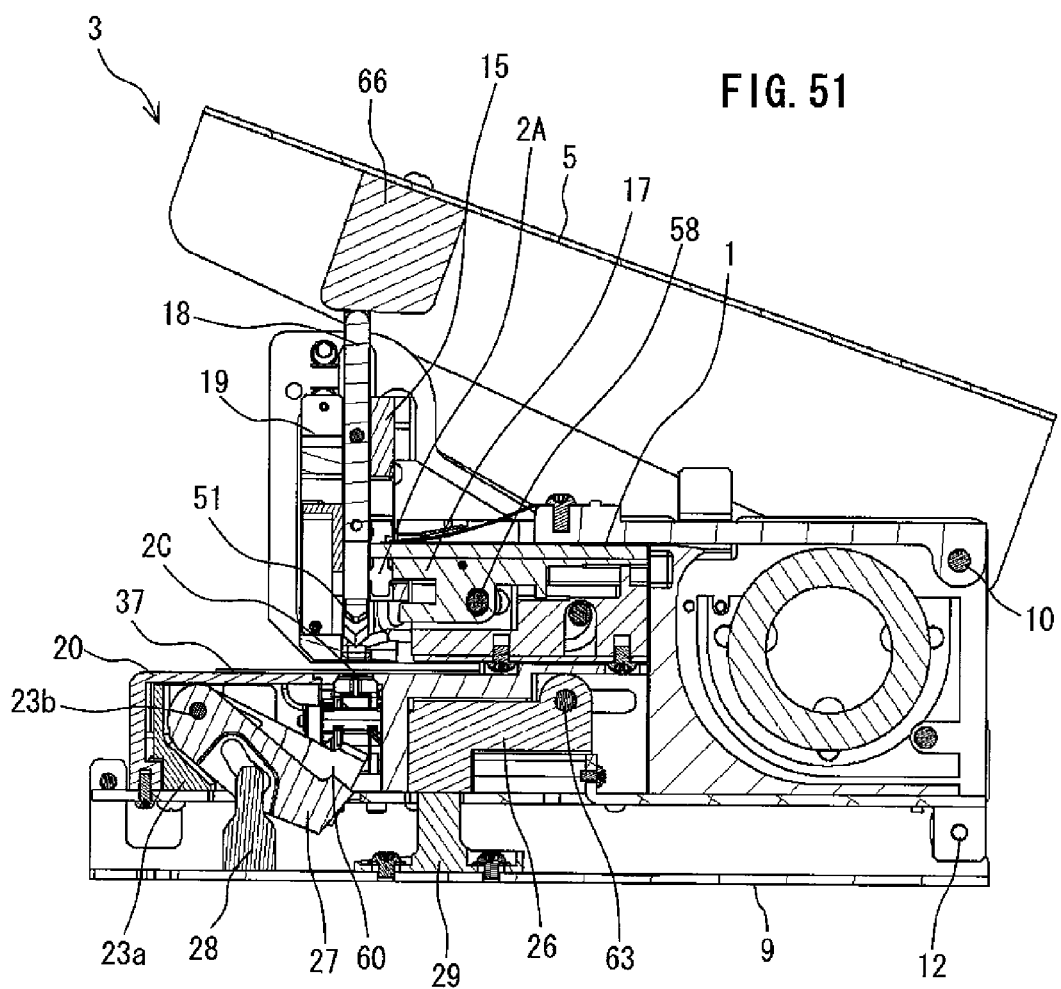
FIG. 51 is a cross-sectional diagram showing a stapler in a state just before return of a pusher.

FIG. 51 is an explanatory diagram showing a state of the respective portions of the stapler 3 in a state just before return of the pusher 17. First, the driver 18 moves upward by the screw coil spring 56 from a state shown in FIG. 50.

Consequently, the protrusion pins 18d move upward in the V-grooves 48 the protrusion pins 18d becomes in a state of being engaged at an upper edge portion of the V-grooves 48 and the driver 18 moves upward and at the same time, the forming plate 15 moves upward too.

Also, the links 57 rotate in the reverse direction of an arrow i of FIG. 18 by moving the driver 18 upward. Thus, the protrusion portions 57c of the links 57 which push the slider shaft 63 backward move in the reverse direction of the arrow i and the slider 26 which is biased by the slider spring 25 starts moving forward.

Thereafter, in a state in which the protrusion pins 18d are engaged with upper edges in the V-grooves 48, the driver 18 moves upward and at the same time, the forming plate 15 moves upward too. Thus, as shown in FIG. 38B, the tip portions of both the leg portions 36 of the staple 2A become in a state of being retained by the spread-retainers 15c of the forming plate 15.

Also, by moving the driver 18 upward, the links 57 rotate further in the reverse direction of the arrow i of FIG. 18, the protrusion portions 57c of the links 57 which hold down the slider shaft 63 moves further in the reverse direction of the arrow i and the slider 26 which is biased by the slider spring 25 moves forward further.

Thereafter, in a state in which the protrusion pins 18d are engaged with an upper ends in the V-grooves 48, the driver 18 moves upward and at the same time, the forming plate 15 moves up to an upper edge portion thereof. Thus, as shown in FIG. 38C, the tip portions of both the leg portions 36 of the staple 2A become in a state of being retained perfectly by the spread-retainers 15c of the forming plate 15.

Thereafter, the protrusion pins 18d move upward from the V-grooves 48 to the V-grooves 46 through the flat portions 47 by moving the driver 18 upward. Also, by moving the driver 18 upward, the links 57 rotate further in the reverse direction of the arrow i of FIG. 18, the protrusion portions 57c of the links 57 which hold down the slider shaft 63 move further in the reverse direction of the arrow i and the slider 26 which is biased by the slider spring 25 moves to the same position as that of the stand-by state shown by FIG. 44.

Further, the pusher 17 which is biased by the pusher spring 16 starts moving forward by moving the long holes 57a of the links 57 which hold down the pusher shaft 58. Thus, as shown in FIG. 35E, the interlinked staples 1 are fed forward by the feeding claws 44. At that time, as shown in FIG. 22, the release coated paper 30 is peeled by the peeling block 38 from the interlinked staples 1 pulled out from the roll shaped staple 4 which is loaded in the staple holder 11. Also, the peeled release coated paper 30 is discharged from the release coated paper outlet 39 by way of the release coated paper discharge path 40. Also, the staple 2A is pushed out between the respective punching blades 51 of the driver 18 by the staple pushing unit 17a of the pusher 17 which is not shown in FIG. 35E.

Further subsequently, the protrusion pins 18d move upward up to predetermined positions in the V-grooves 46 by moving the driver 18 upward. The driver 18 ascends to a predetermined position by the screw coil spring 56 and thereafter, the lifting upward of the paper-sheet pusher 19 and the frame 8 with respect to the driver 18 starts by the tension spring 55 shown in FIG. 20, which is provided between the frame 8 and the paper-sheet pusher 19.

Further, the links 57 rotate further in the opposite direction of the arrow i of FIG. 18 by moving the driver 18 upward, and the pusher 17 which is biased by the pusher spring 16 moves to the same position as that of the stand-by state shown by FIG. 44 by moving the long holes 57a of the links 57 which holds down the pusher shaft 58.

According to the operation of the respective portions of the stapler 3 as mentioned above, the binding sheets 37 which are placed on the table 20 in the paper-sheet insertion port are bound by the staple 2.

INDUSTRIAL APPLICABILITY

The present invention is applied to interlinked staples in which straight shaped staples are interlinked and to a staple cartridge in which the interlinked staples are housed detachably with respect to a stapler.

The invention claimed is:

1. Interlinked staples comprising a plurality of paper-made staples, each of which is elongated and is of approximately straight configuration and has two longitudinal edges and first and second leg portions at opposite respective ends thereof, the staples being disposed substantially parallel to each other and adjacent staples of the assembly being mutually interlinked at interlinking portions, whereby for binding a plurality of binding sheets the leg portions of a staple are bent in a first direction, inserted through the binding sheets, and bent in a second direction along the binding sheets to be mutually bonded, wherein each of the staples has the interlinking portions in the vicinity of the ends thereof and a slit that splits into the adjacent staples between the interlinking portions, wherein the first leg portion of each staple has an adhesion portion in the vicinity of the opposite end thereof for mutually bonding the leg portions when the leg portions are bent in the second direction, wherein each staple has a hole between the slit and the interlinking portion, wherein each staple is tapered at each end towards the tips of the staple, and wherein the respective interlinking portions are cut from the hole to a space displaced at an external side of the hole, the space being adjacent to each of the interlinked portions and between the ends of adjacent staples of the interlinked staples, along a longitudinal direction of the interlinked staples.

2. A staple cartridge for releasable attachment to a stapler, the staple cartridge comprising:
   a staple housing unit for housing a roll of interlinked staples; and
   a staple pulling out port from which the roll of interlinked staples is pulled out from the staple housing unit,
   the interlinked staples including a plurality of paper-made staples, each of which is elongated, is of approximately straight configuration and has two longitudinal edges and first and second leg portions at opposite respective ends thereof, the staples being disposed substantially parallel to each other and adjacent staples of the assembly being mutually interlinked at respective longitudinal edges,
   whereby for binding a plurality of binding sheets the leg portions of each of the staples are bent in a first direction, inserted through the binding sheets, and bent in a second direction along the binding sheets to be mutually bonded,
   wherein each of the staples has the interlinking portions in the vicinity of the ends thereof and a slit that splits into the adjacent staples between the interlinking portions,
   wherein the first leg portion of each staple has an adhesion portion in the vicinity of the opposite end thereof for mutually bonding the leg portions when the leg portions are bent in the second direction,
   wherein each staple is tapered at each end towards the tips of the staple,
   wherein each staple has a hole between the slit and the interlinking portion, and
   wherein the respective interlinking portions are cut from the hole to a space displaced at an external side of the hole, the space being adjacent to each of the interlinked portions and between the ends of adjacent staples of the interlinked staples, along a longitudinal direction of the interlinked staples.

3. The staple cartridge according to claim 2, wherein the staple pulling out port is configured so as to face a feeding path which has a width corresponding to a length of each of the staples in the interlinked staples, the feeding path including a feeding path groove which extends along a feeding direction of the interlinked staples and is provided at a position of an end of the feeding path in response to the adhesion portion.

* * * * *